United States Patent [19]

Kamei et al.

[11] Patent Number: 5,485,288
[45] Date of Patent: Jan. 16, 1996

[54] IMAGE PROCESSING APPARATUS FOR CONVERTING A COLOR IMAGE INTO A PATTERN IMAGE WITH A SYNTHESIZED GRADATION IMAGE INCREASING IN DENSITY CLOSER TO CONTOUR PORTIONS OF THE PATTERN IMAGE

[75] Inventors: Masafumi Kamei; Yoshiyuki Suzuki; Shizuo Hasegawa, all of Tokyo; Hiroyuki Ichikawa, Kawasaki; Yoshihiro Funamizu, Soka; Akio Itoh, Machida; Yoshinori Abe, Tama, all of Japan

[73] Assignee: Canon Kabushiki Kaisha, Tokyo, Japan

[21] Appl. No.: 843,725

[22] Filed: Feb. 28, 1992

[30] Foreign Application Priority Data

| Mar. 1, 1991 | [JP] | Japan | 3-059656 |
| May 29, 1991 | [JP] | Japan | 3-153940 |
| Nov. 7, 1991 | [JP] | Japan | 3-319865 |

[51] Int. Cl.⁶ .............................. H04N 1/56; H04N 1/40; H04N 1/409; G06T 5/00
[52] U.S. Cl. .......................... 358/530; 358/447; 358/448; 382/165; 382/266
[58] Field of Search .................... 358/75, 79, 81, 358/464, 462, 447, 452, 453, 450, 448, 465, 537, 538, 530, 540, 532; 382/165, 266, 268, 284; 348/597

[56] References Cited

U.S. PATENT DOCUMENTS

| 4,308,553 | 12/1981 | Roetling | 358/534 |
| 4,369,461 | 1/1983 | Tamura | 358/500 |
| 4,616,262 | 10/1986 | Toriumi et al. | 348/597 |
| 5,021,876 | 6/1991 | Kurita et al. | 358/530 |
| 5,032,928 | 7/1991 | Sakai et al. | 358/448 |
| 5,079,625 | 1/1992 | Kitamura et al. | 358/537 |
| 5,086,484 | 2/1992 | Katayama et al. | 358/465 |

FOREIGN PATENT DOCUMENTS

| 174809 | 3/1986 | European Pat. Off. | G09G 1/16 |
| 349780 | 4/1990 | European Pat. Off. | H04N 1/46 |
| 363146 | 4/1990 | European Pat. Off. | H04N 1/46 |
| 3802736 | 8/1988 | Germany | H04N 1/46 |

OTHER PUBLICATIONS

IBM Technical Disclosure Bulletin, 31(3), pp. 224–227 (Aug. 1988).

*Primary Examiner*—Scott A. Rogers
*Attorney, Agent, or Firm*—Fitzpatrick, Cella, Harper & Scinto

[57] ABSTRACT

An image processing apparatus for converting color images into monochromatic pattern images. The image processing apparatus includes: means for detecting the area of a color image; means for converting a color image into a monochromatic pattern image; and control means for varying such image processing in accordance with the result of detection made by the means for detecting the area. When a thin line is detected in a color area, the method of processing is determined based on the width of the detected thin line. For example, when the width of the thin line is smaller than a predetermined value, the area of such thin line may be outputted as a plain image instead of a pattern image so that it may easily be seen or recognized. The contour of a color area may be made conspicuous by combining a plain image and a pattern image.

10 Claims, 62 Drawing Sheets

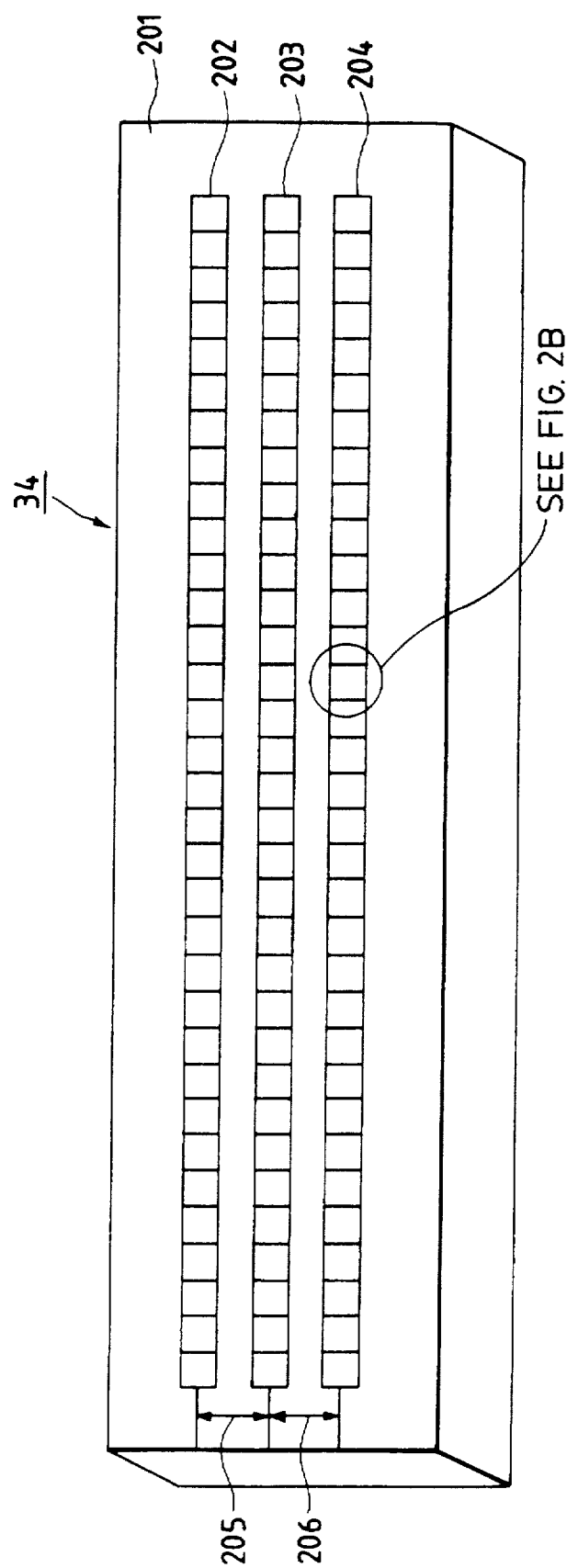
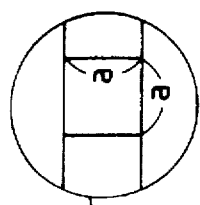
FIG. 2A
FIG. 2B

SUBORDINATE ADDRESS

| SUPERORDINATE ADDRESS | 0 | 1 | 2 | 3 | 4 | 5 | 6 | 7 |
|---|---|---|---|---|---|---|---|---|
| 0 | 1 | 0 | 1 | 0 | 1 | 0 | 1 | 0 |
| 1 | 0 | 1 | 0 | 1 | 0 | 1 | 0 | 1 |
| 2 | 1 | 0 | 1 | 0 | 1 | 0 | 1 | 0 |
| 3 | 0 | 1 | 0 | 1 | 0 | 1 | 0 | 1 |
| 4 | 1 | 0 | 1 | 0 | 1 | 0 | 1 | 0 |

| I1 | I2 | I3 | I4 | O1 | O2 |
|----|----|----|----|----|----|
| 1  | 0  | ×  | ×  | 0  | 0  |
| 1  | 1  | 0  | ×  | 0  | 1  |
| 1  | 1  | 1  | 0  | 1  | 0  |
| 1  | 1  | 1  | 1  | 1  | 1  |
| 0  | ×  | ×  | ×  | ×  | ×  |

× : 0 OR 1

ORANGE :

YELLOW :

BROWN :

BLUE :

GREEN :

RED :

COLOR-PATTERN
CORRESPONDENCE

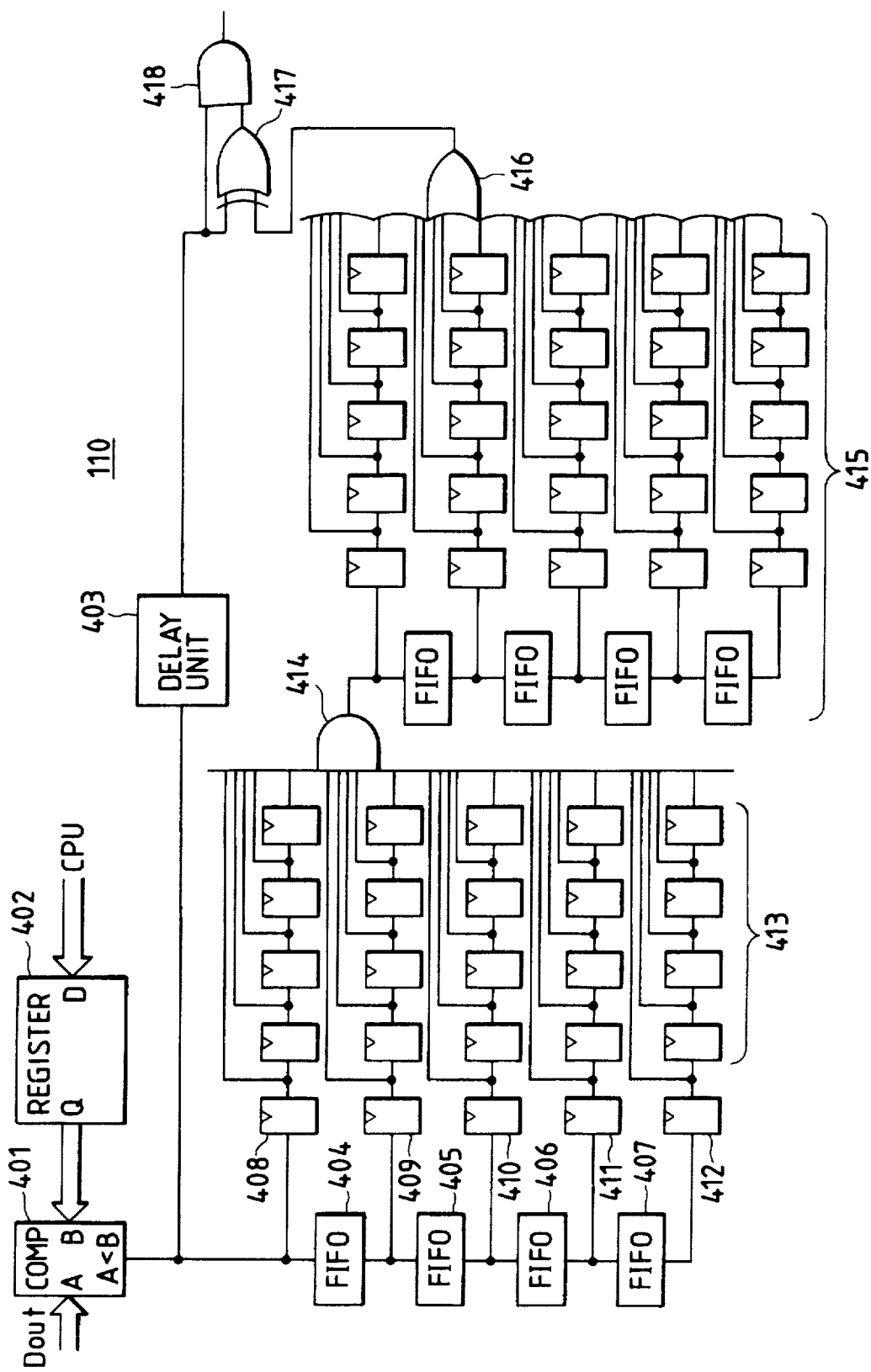

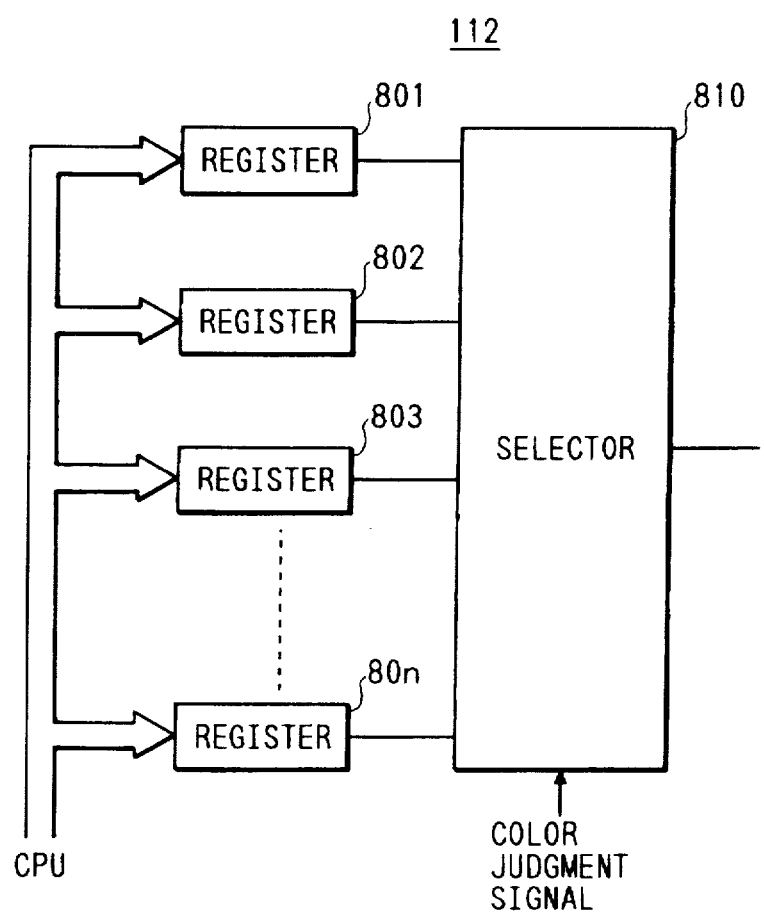

| LINE WIDTH OF INPUT PIXEL | c1 | c2 | c3 | c4 |
|---|---|---|---|---|
| 1~2 PIXELS | 1 | 0 | 0 | 0 |
| 3~4 PIXELS | 0 | 1 | 0 | 0 |
| 5~6 PIXELS | 0 | 0 | 1 | 0 |
| 7~8 PIXELS | 0 | 0 | 0 | 1 |
| 9~ PIXELS | 0 | 0 | 0 | 0 |

FIG. 60

| c1 | c2 | c3 | c4 | COEFFICIENT REGISTER FOR PATTERN | COEFFICIENT REGISTER FOR FIXED DENSITY |
|---|---|---|---|---|---|
| 1 | 0 | 0 | 0 | $\alpha$ (=0) | $\varepsilon$ (=1) |
| 0 | 1 | 0 | 0 | $\beta$ | $\delta$ |
| 0 | 0 | 1 | 0 | $\gamma$ | $\gamma$ |
| 0 | 0 | 0 | 1 | $\delta$ | $\beta$ |
| 0 | 0 | 0 | 0 | $\varepsilon$ (=1) | $\alpha$ (=0) |

$\alpha + \varepsilon = 1, \beta + \gamma = 1, 2\gamma = 1 \quad \alpha < \beta < \gamma < \delta < \varepsilon$

FIG. 63

| d1 | d2 | d3 | d4 | JUDGED RESULT |
|---|---|---|---|---|
| 1 | 0 | 0 | 0 | FIRST PIXEL FROM CONTOUR |
| 0 | 1 | 0 | 0 | SECOND PIXEL FROM CONTOUR |
| 0 | 0 | 1 | 0 | THIRD PIXEL FROM CONTOUR |
| 0 | 0 | 0 | 1 | FOURTH PIXEL FROM CONTOUR |
| 0 | 0 | 0 | 0 | OTHER |

FIG. 64

| | FIXED DENSITY | PATTERN DENSITY |
|---|---|---|
| FIRST PIXEL FROM CONTOUR | 100% | 0% |
| SECOND PIXEL FROM CONTOUR | 75 | 25 |
| THIRD PIXEL FROM CONTOUR | 50 | 50 |
| FOURTH PIXEL FROM CONTOUR | 25 | 75 |
| OTHER | 0 | 100 |

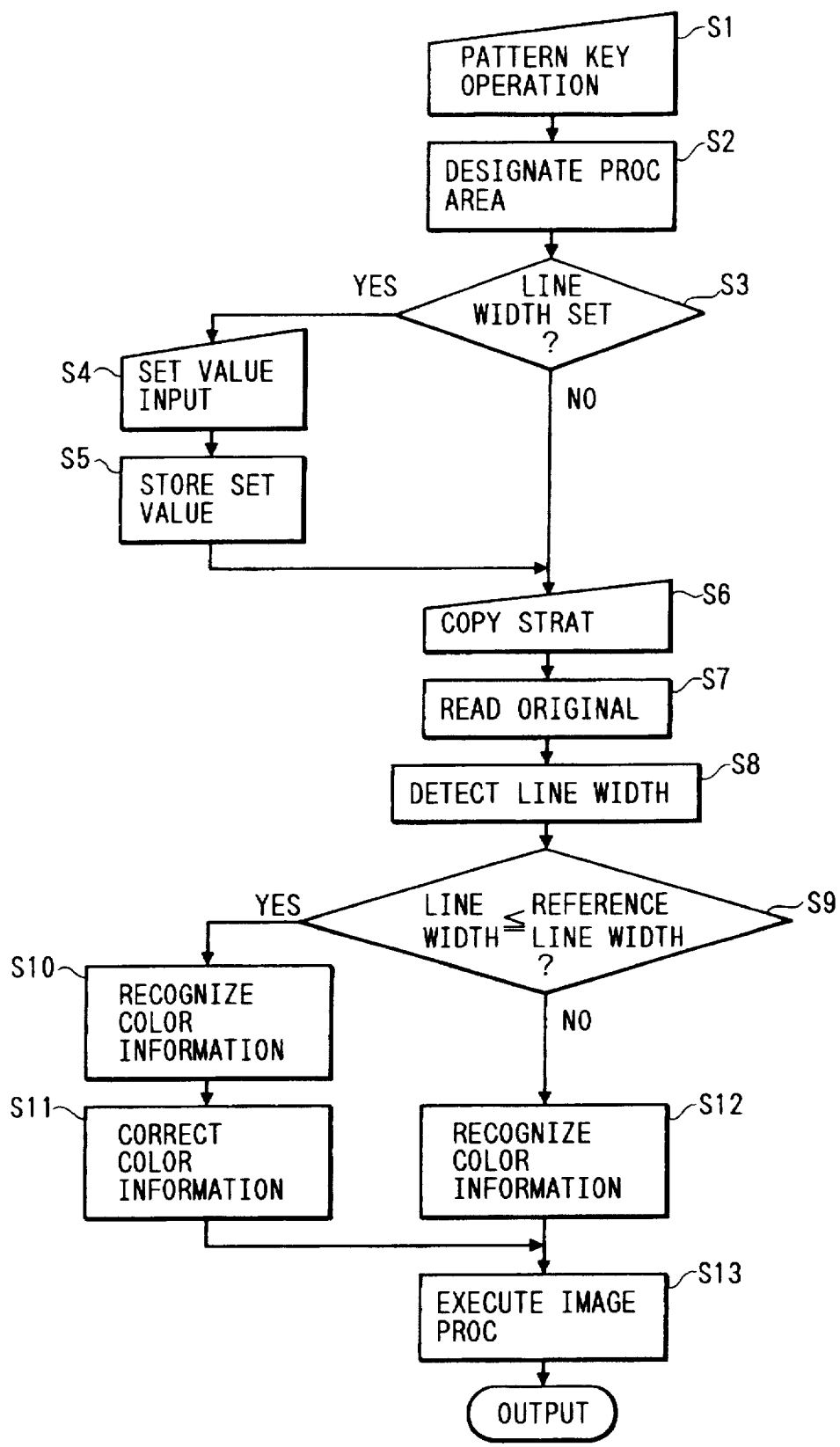

IMAGE PROCESSING APPARATUS FOR CONVERTING A COLOR IMAGE INTO A PATTERN IMAGE WITH A SYNTHESIZED GRADATION IMAGE INCREASING IN DENSITY CLOSER TO CONTOUR PORTIONS OF THE PATTERN IMAGE

BACKGROUND OF THE INVENTION

1. Field of the Invention

The present invention relates to image processing apparatus to which color images are inputted and from which black and white images are outputted.

2. Related Background Art

An image processing apparatus has recently been proposed, in which an original image containing colors is read, the colored areas of the image are converted into black and white patterned images corresponding to the colors of the original, and the converted images are printed out.

However, even when the colored image in the original comprises only a small area such as thin lines depicted in red color, the above described image processing apparatus will necessarily convert the red thin lines into a pattern corresponding to the color of red. If for example the pattern corresponding to red is of slanting lines, a red thin line will probably be represented as dots. The image presented in these dots are not easy to see for the user, and the fact that the original image comprises red thin lines will not be recognized.

SUMMARY OF THE INVENTION

An object of the present invention is to provide an improved image processing apparatus.

Another object of the present invention is to provide an image processing apparatus to which an image containing colors is inputted and from which a black and white image identifying its colors is outputted.

Still another object of the present invention is to provide an image processing apparatus capable of producing processed images which are easy to see.

Further objects and features of the present invention will be apparent from the following specification and the drawings.

BRIEF DESCRIPTION OF THE DRAWINGS

FIG. 2 is a view showing the detail of CCD 34 as shown in FIG. 1;

FIG. 45 is a detailed block diagram of thin line detection circuit 110 as shown in FIG. 38;

FIG. 46 is a diagram showing the operation of thin line detection circuit 110 as shown in FIG. 45;

FIG. 47 is a detailed block diagram of fixed value generation circuit 112 as shown in FIG. 38;

FIG. 59 shows the result of line width judgement of thin line detection unit 3203;

FIG. 60 shows set values of the coefficient registers in fixed density selection unit 3204 and pattern density selection unit 3205;

FIG. 63 shows the position-based judged result of the position detection section;

FIG. 64 shows the synthetic ratios of fixed density and pattern density;

FIG. 71 is a flowchart for explaining the operation of the present embodiment;

DESCRIPTION OF PREFERRED EMBODIMENTS

Embodiments of the present invention will now be described with reference to the drawings.

Figure 1:
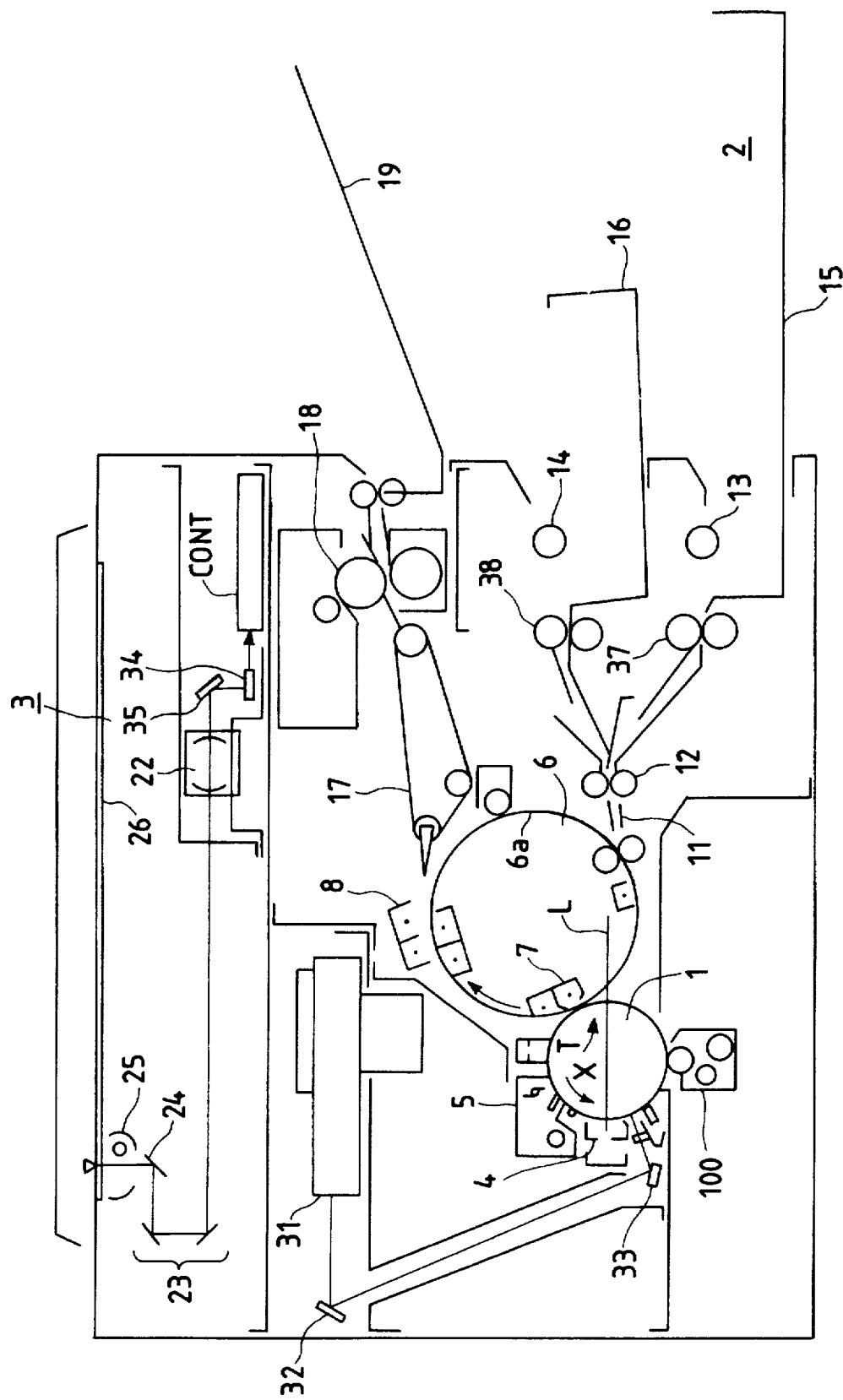
FIG. 1 is a view showing the construction of an image processing apparatus according to an embodiment of the present invention.

FIG. 1 shows the construction of an image processing apparatus-according to an embodiment of the present invention. A photosensitive layer for electrophotography is formed on the surface of a photosensitive drum 1 which is rotatable counterclockwise as indicated by X. On the circumference of the photosensitive drum 1, a primary charged body 4, a developer 100, a transfer device 6 and a cleaning device 5 are located in that order in the counterclockwise direction X.

An image read unit 3 is provided at the upper portion of the box body to read the original image on a platen glass 26 on which an original is to be placed. This image read unit 3 comprises the platen glass 26, a halogen lamp 25 for illuminating the original, scan mirrors 23, 24, an image formation lens 22, RGB color separation filter 35, CCD 34 and others. The halogen lamp 25 is movable in a sub-scan direction integrally with the scan mirrors 23, 24 at a predetermined speed. The original image having passed through the image formation lens 22 is separated into color components by the RGB separation filter 35 to be converted into electrical signals by CCD 34 and is processed as an image by an image processing unit CONT.

The signal processed by the image processing unit CONT is emitted as a modulated laser beam by a laser scanner unit 31, such laser beam being reflected by fixed mirrors 32, 33. It is guided onto the photosensitive drum 1 between the primary charged body 4 and the developer 100 so that its electrostatic latent image will be formed on the photosensitive drum 1. It should be noted that the laser scanner unit 31 is constituted for example by a rotary polygon mirror of f-θ lens.

FIG. 2 shows the construction of CCD 34. CCD 34 is constructed by a 3-line solid image pickup element array 201. All of substrates 202, 203, 204 corresponding to three lines are arranged along a main scan direction, and they are separated by distances 205, 206 in sub-scan direction. It should be noted that the distances 205, 206 are determined in accordance with field angle.

Figure 3:
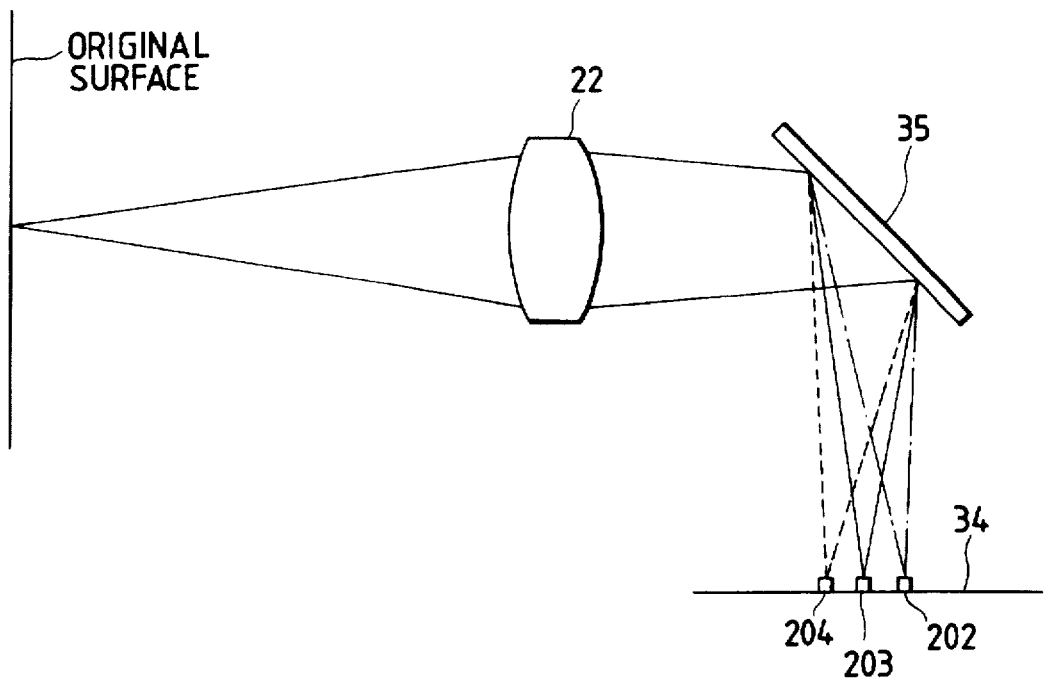
FIG. 3 is a view explaining the principle for reading an image by means of color separation.
Figure 4:
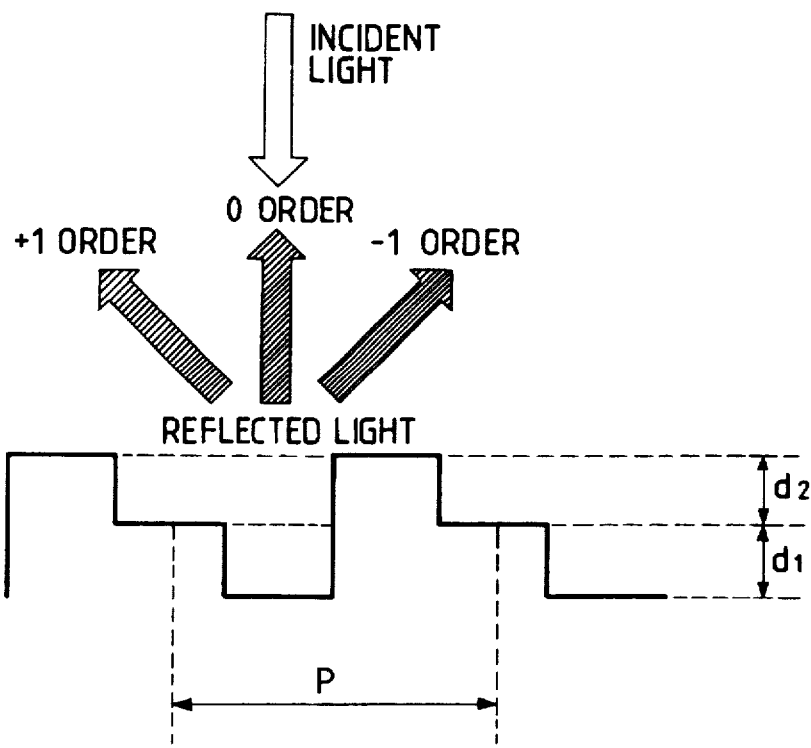
FIG. 4 is a diagram showing the construction of RGB separation filter 35 as shown in FIG. 1.

FIG. 3 illustrates the principle based on which the original image is read by means of color separation using RGB separation filter 35 and CCD 34. The image of the original placed on the platen glass 26 is scanned in the sub-scan direction by mirrors (not shown) or the like located between the platen glass 26 and the image formation lens 22. After formed into an image by the image formation lens 22, it is separated into three colors of luminous fluxes by the RGB separation filter 35 formed of a blazed diffraction grating for trichromatic separation so as to be formed into an image on the reading surface of CCD 34. Here, as shown in FIG. 4, the unidimensional blazed diffraction grating for trichromatic separation, used as the RGB separation filter 35, is constructed such that a steps-like grating is repeated cyclically at pitch P in the direction of color separation. For example, when cyclical pitch P=60 µm, grating thickness d1=d2=3100 µm, refractive index of medium=1.5 are set, the incident light will be separated into three directions upon reflection as its chromatic components are diffracted.

Figure 5:
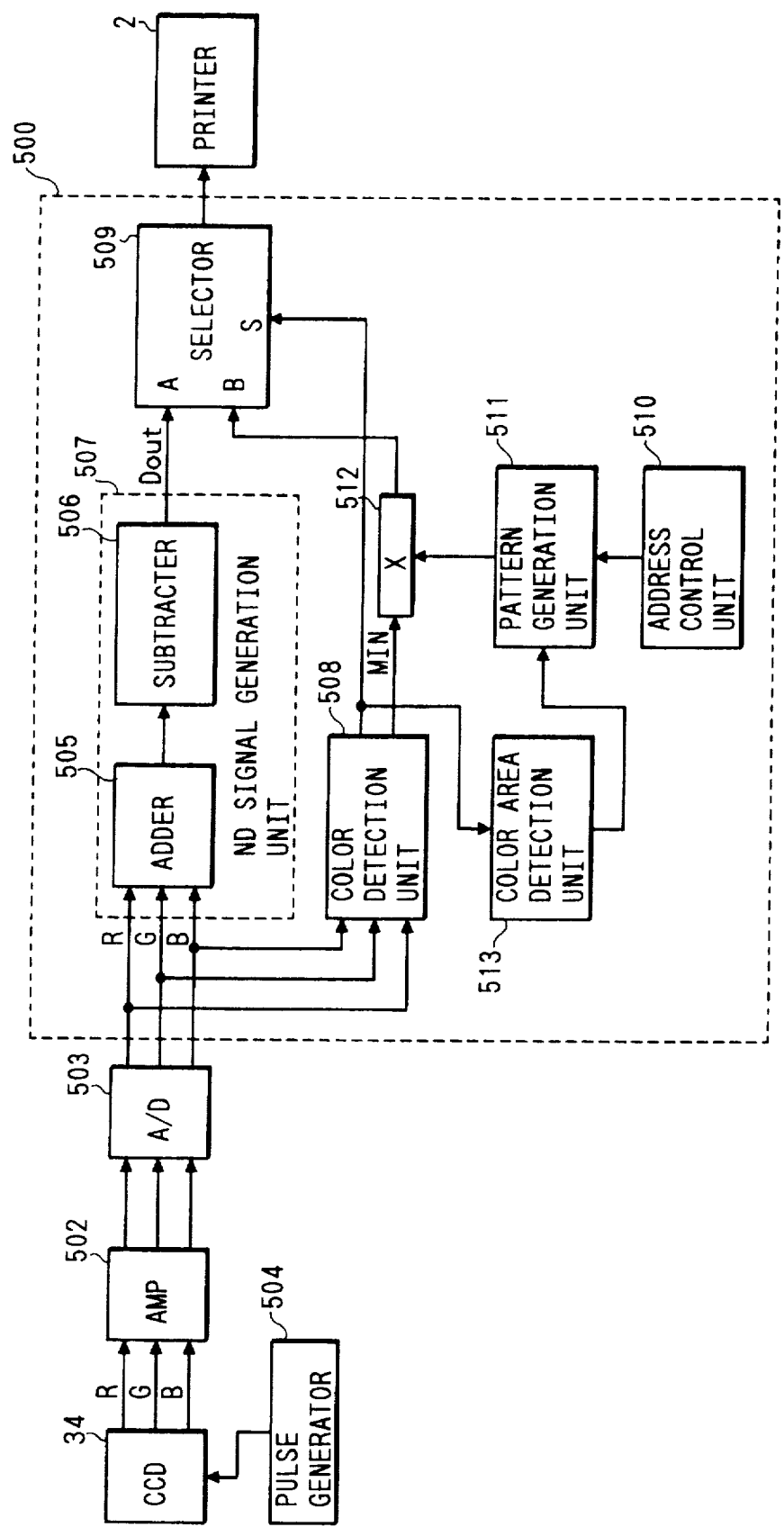
FIG. 5 is a block diagram of an image processing apparatus according to an embodiment.

FIG. 5 is a block diagram of the image processing unit CONT as shown in FIG. 1. As described above, after passing through the image formation lens 22, the original image is color-separated by RGB color separation filter 35 and is converted into electrical signals by a pulse generator 504 and CCD 34. Each of the color signals is then amplified by an amplifier circuit 502 to a predetermined level and converted into a digital signal by an A/D converter 503 to be inputted into an image processing unit 500. In the image processing unit 500, the RGB signals is inputted into an ND (luminance) signal generation unit 507 for the generation of monochromatic image data and inputted into a color detection unit 508 for the detection of color components of the original image in a manner as shown in detail in FIG. 6 and FIG. 7.

In the ND signal generation unit 507, the color signals of RGB are added by an adder 505 and then subtracted to ⅓ by an subtracter 506 to provide a luminance signal Dout. In particular, a calculation as expressed by the following formula is performed in the ND signal generation unit 507. Note that, instead of the calculation based on the following formula, a weight may be given to each color as needed.

$$Dout=(Rin+Gin+Bin)/3$$

In the color detection unit 508 as shown in FIG. 5, hue signals are used to detect the color components of the original image. The reason for this is to detect accurate color components when, for the same color, the degree of chroma and luminosity are different. Since each input data of R, G, B is of 8 bits resulting in information on $2^{24}$ colors, the size of the circuit will be enormous if processing is to be performed as it is. Thus a circuit as shown in FIG. 6 is used.

Figure 6:
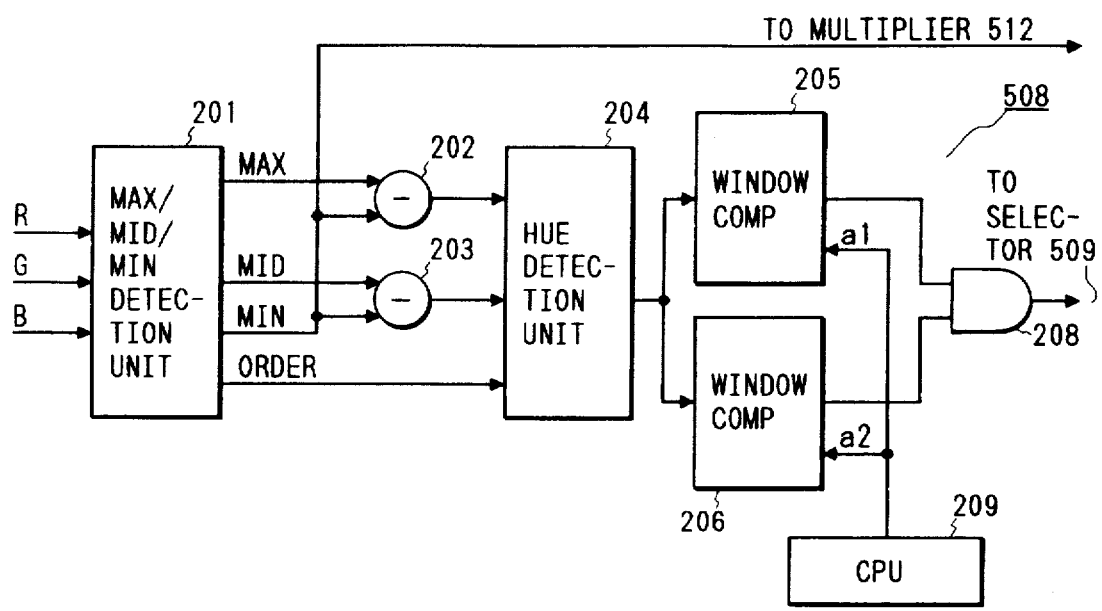
FIG. 6 is a diagram showing the detail of a color detection unit 508 as shown in FIG. 5.

FIG. 6 is a block diagram showing the detail of the color detection unit 508. A max/mid/min detection unit 201 is constituted by: three comparators each for comparing two of the RGB signals; a decoder for decoding the judged result by each comparator; and a gate circuit which provides codes for maximum value "max", middle value "mid" and minimum value "min" based on output signal of the decoder. Further the max/mid/min detection unit 201 provides an order signal of maximum value "max", middle value "mid" and minimum value "min". Note that the minimum value signal min is delivered to a multiplier 512 as shown in FIG. 5.

Figure 7:
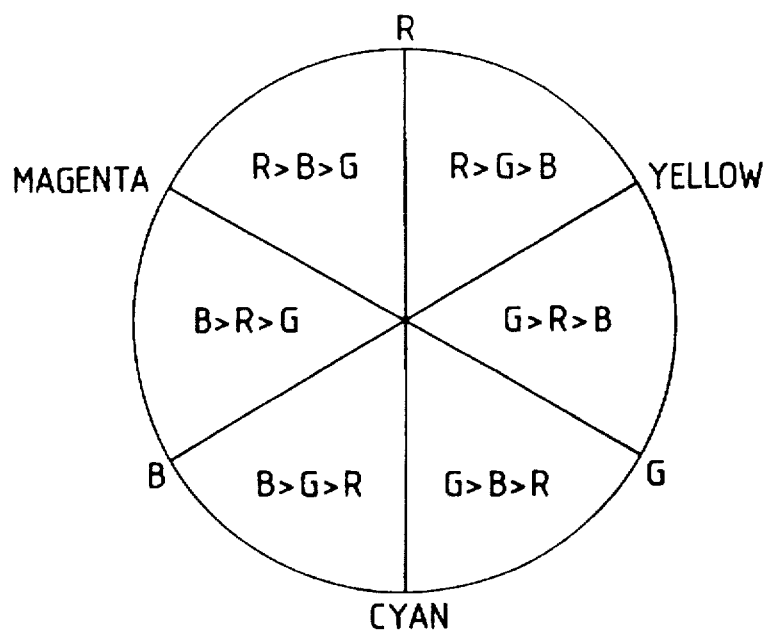
FIG. 7 is diagram explaining the color detecting operation of the color detection unit 508.

Here, since color space is represented by hue, luminosity and chroma as known for example by Munsell's color solid, each data of R, G, B must be converted into a plane, i.e., into a two-dimensional data. By thus using the fact that the common portion of R, G, B, i.e., the minimum values min (R, G, B) is achromatic, the minimum value min (R, G, B) is subtracted from each data of R, G, B to use the remaining information as chromatic color. Such converted plane may be represented in a manner as shown in FIG. 7 according to the order of magnitude of R, G, B by dividing 0° to 360° into 6 regions, i.e., in the regions of R>G>B, R>B>G, G>B>R, G>R>B, B>G>R, B>R>G.

The difference between the maximum value max and the minimum value min is calculated in a subtracter 202 as shown in FIG. 6, and the difference between the middle value mid and minimum value min is calculated in a subtracter 203. A hue detection unit 204 at the next stage has a look-up table formed for example of a ROM so that the value of hue may be read from the look-up table on the basis of: the difference between the maximum value max and the minimum value min; the difference between the middle value mid and the minimum value min; and the order signal of the maximum value max, middle value mid, and the minimum value min.

This value of hue is compared by the window comparators 205, 206 with their respective reference values a1, a2 which have been provided from CPU 209, the results of the comparison being outputted from the window comparators 205, 206, respectively. It should be noted that these reference values a1, a2 are set to the window comparators 205, 206 by CPU 209 in the form corrected by desired offset value from the hue data in accordance with input data. The window comparator 205 outputs data "1" when input hue data<reference value a1, while the window comparator 206 outputs data "1" when input hue data> reference value a2. Accordingly, an AND gate 208 at the subsequent stage will output data "1" to a control terminal S of a selector 509 when reference value a2< input hue data<reference value a1.

At the selector 509 as shown in FIG. 5, the luminance signal Dout and the output signal from the multiplier 512 are selectively outputted. The signal of the multiplier 512 is generated from the signal from an address control unit 510 and a pattern generation unit 511, and the output signal of the color detection unit 508.

Figure 8:
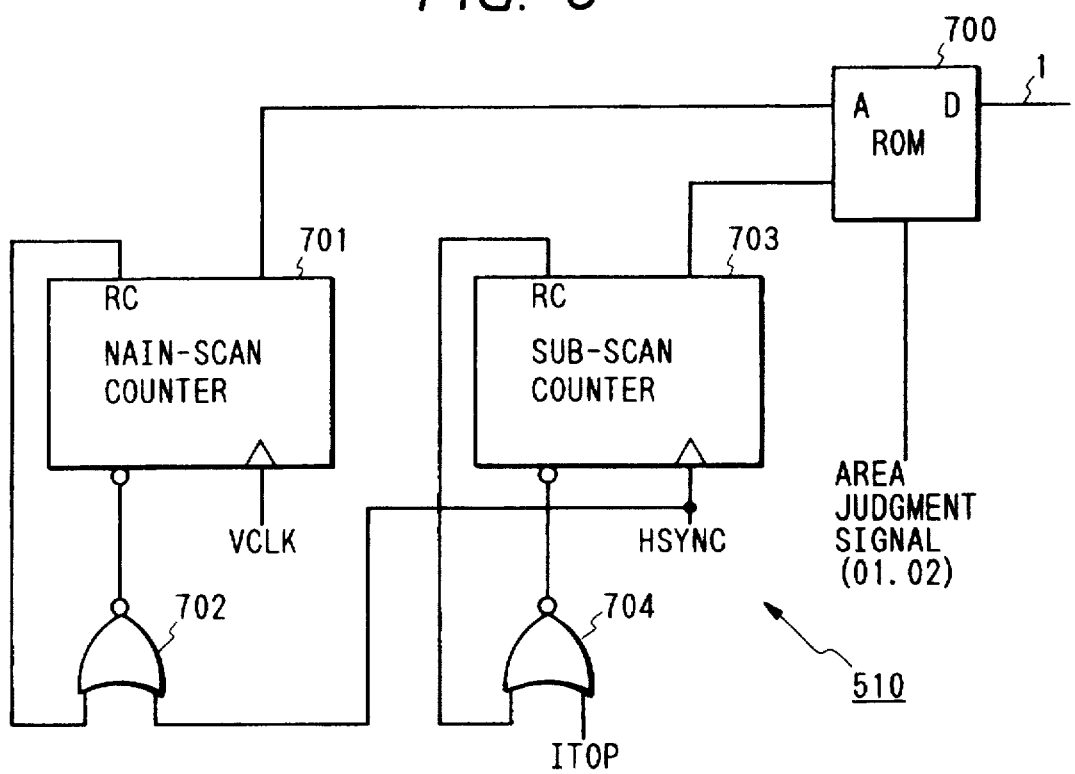
FIG. 8 is a diagram showing the detail of pattern generation unit 511 and address control unit 510 as shown in FIG. 5.
Figures 9A, 9B:
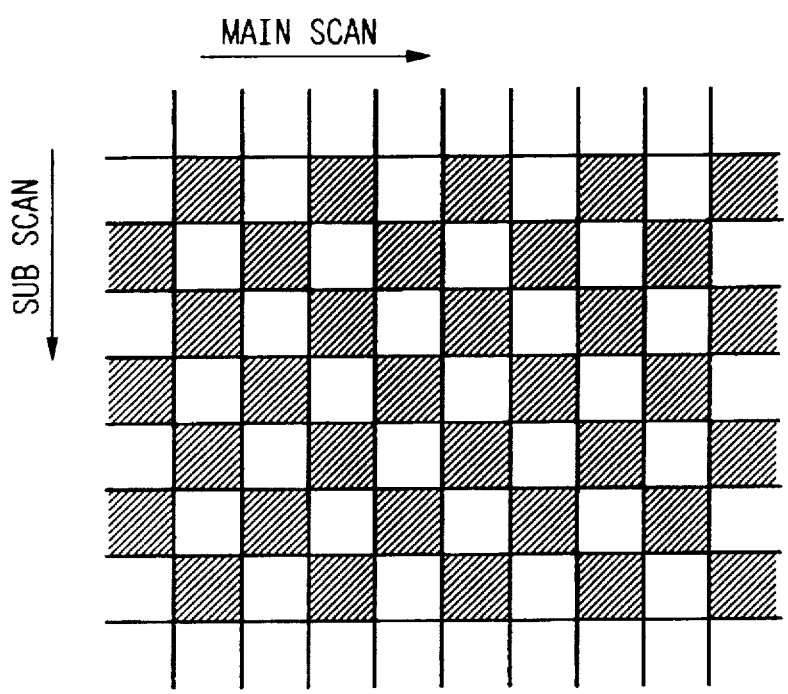
FIGS. 9A and 9B are diagrams explaining one of the patterns generated by the pattern generation unit 511.

FIG. 8 shows the detailed construction of the address control unit 510 and pattern generation unit 511. The pattern generation unit 511 is constructed by a ROM 700 in which dot data for pattern are previously stored at addresses consisting of superordinate address and subordinate address in a manner as shown in FIGS. 9A and 9B. Further, area judgment signal of a color area detection unit 513 is used as the superordinate address of ROM 700, while the output signal of the address control unit 510 is used as subordinate address.

Figures 10, 12:
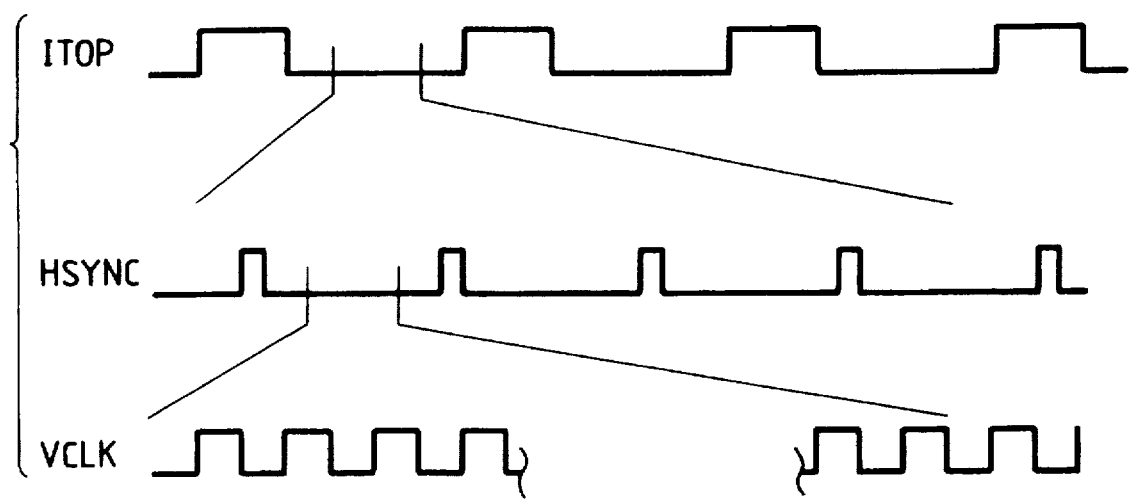
FIG. 10 is a timing chart of the address control unit 510.
FIG. 12 is a diagram showing the relationship between input and output of decoder 308.

A main scan counter 701 of an address control unit 510 counts a pixel clock signal VCLK in synchronism with a horizontal synchronous signal HSYNC and outputs an address of ROM 700. A sub-scan counter 703 counts the horizontal synchronous signal HSYNC in synchronism with a signal ITOP which is at low logic level when the image read unit 3 is reading the original image, and outputs an address to ROM 700. FIG. 10 is a timing chart of the respective signals.

Multiplier 512 of FIG. 5 performs a multiplication of the minimum value signal from the hue detection unit 508, i.e., the darkest signal min (R, G, B) and the dot data read from ROM 700 and the result will be provided to the selector 509. It should be noted that the reason for using the darkest signal min (R, G, B) lies in the fact that the color luminance signal Dout generated from ND signal varies in signal level according to colors, and its signal level for colors such as yellow is thus caused to approach the level of white to result an absence of the original's image data. Accordingly, the luminance signal Dout is selected by the selector 509 when reference value a2< input hue data< reference value a1, while the output signal of the multiplier 512 is selected for the other cases, the result being output to a driver circuit (not shown) of the laser scanner unit 31 as shown in FIG. 1.

Figure 11:
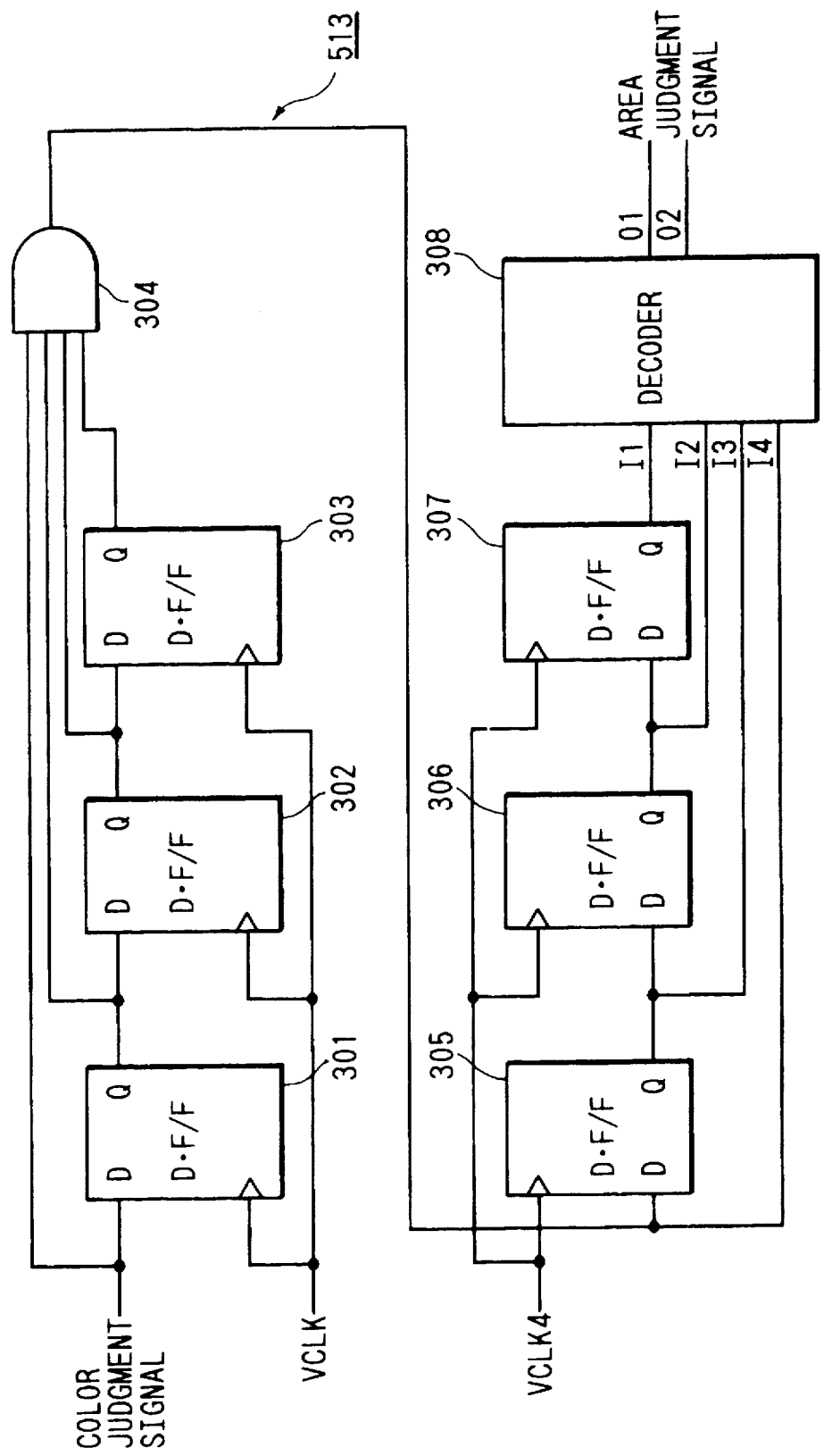
FIG. 11 is a view showing the detail of color area detection unit 513 as shown in FIG. 5.

FIG. 11 is a detailed block diagram of the color area detection unit 513. Color judgment signal of the color detection unit 508 is sequentially delayed in synchronism with image clock VCLK by D flip-flops (D·F/F) 301, 302, 303 shown in the upper half of the figure, and the color judgment signal and each of the output signals of D·F/F 301, 302, 303 are inputted into a 4-input AND gate 304. Thus, the output signal of the 4-input AND gate 304 will be "1" when the color judgment signal is "1" for four consecutive pixels.

The output signal of 4-input AND gate 304 is delayed by clock VCLK4 which is a ¼ frequency divided clock of the image clock VCLK by means of D·F/F 305, 306, 307 as shown in the lower half of the figure, and output signal I4 of the AND gate 304 and output signals I3 to I1 respectively of D·F/F 305, 306, 307 are input into a decoder 308.

When as shown in FIG. 12 the input signals are I1=1, I2=0, I3=X, I4=X, the decoder 308 judges as that color signal succeeds for four consecutive pixels and outputs area judgment signal O1=0, O2=0. Further, the decoder 308 judges as that: color signal succeeds for eight consecutive pixels and outputs area judgment signal O1=0, O2=1 when I1=1, I2=1, I3=0, I4=X; color signal succeeds for twelve consecutive pixels and outputs area judgment signal O1=1, O2=0 when I1=1, I2=1, I3=1, I4=0; and color signal succeeds for sixteen consecutive pixels and outputs area judgment signal O1=1, O2=1 when I1=1, I2=1, I3=1, I4=1. Furthermore, when the input signal I1=0, the area judgment signal of the decoder 308 is optional because the corresponding pixel is not a color signal.

It should be noted that, while the present embodiment has been described by defining four pixels as a unitary basic succession, the unit of basic succession may be set at will by changing the number of stages of D·F/F 301, 302, 303 shown in the upper half of the figure. The size of judgment area may also be set at will by changing the number of stages of D·F/F 305, 306, 307 in the lower half of the figure.

According to the above described color area detection unit 513, a pattern corresponding to the case where color signal succeeds: consecutively for four pixels; consecutively for eight pixels; consecutively for twelve pixels; or consecutively for sixteen pixels is read from ROM 700 in the pattern generation unit 511.

Accordingly, with the image processing apparatus of the above described embodiment, pattern is changed in accordance with the color judgment signal corresponding to each of the cases as shown in FIGS. 13A, 13B, 13C, 13D where color signal succeeds: consecutively for four pixels; consecutively for eight pixels; consecutively for twelve pixels; and consecutively for sixteen pixels. Reading is thus possible even when a small character is patterned.

Figure 14:
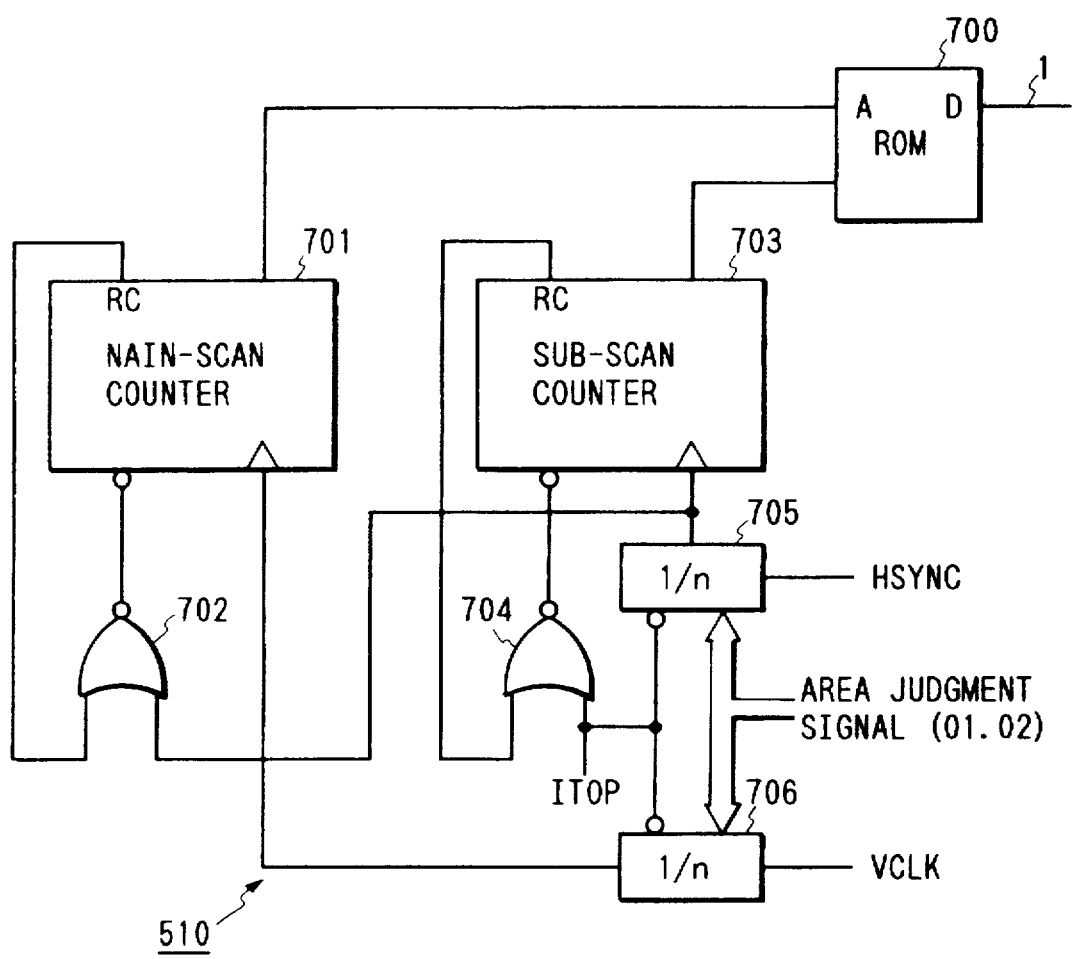
FIG. 14 is a block diagram showing the detail of address control unit 510 and pattern generation unit 511 as shown in FIG. 5.

Another embodiment will now be described. FIG. 14 is a block diagram showing the detailed construction of the address control section 510 as shown in FIG. 5. The like components as in FIG. 8 are denoted by like numerals. While in the above described embodiment the type of pattern is changed according to the size of a color area, this embodiment is designed such that the pitch of pattern is changed according to the size of color area.

Area judgment signal (O1, O2) of the color area detection unit 513 is inputted into frequency dividers 705, 706 as a frequency dividing rate control signal. The frequency dividers 705, 706 are constructed to divide the frequency of horizontal synchronous signal HSYNC and image clock signal VCLK, respectively, into: ¼ when O1=O2=0; ½ when O1=0, O2=1; ¼ when O1=1, O2=0; or ⅛ when O1=1, O2=1.

Main-scan counter 701 outputs a superordinate address of ROM 700 by counting the frequency-divided signal of image clock signal VCLK in synchronism with the frequency divided signal of horizontal synchronous signal HSYNC. Further, the sub-scan counter 703 outputs a sub-ordinate address of ROM 111 by counting the frequency of horizontal synchronous signal HSYNC in synchronism with ITOP signal which is at low logic level when the image read unit 3 as shown in FIG. 1 is reading the original image.

Figure 13A:
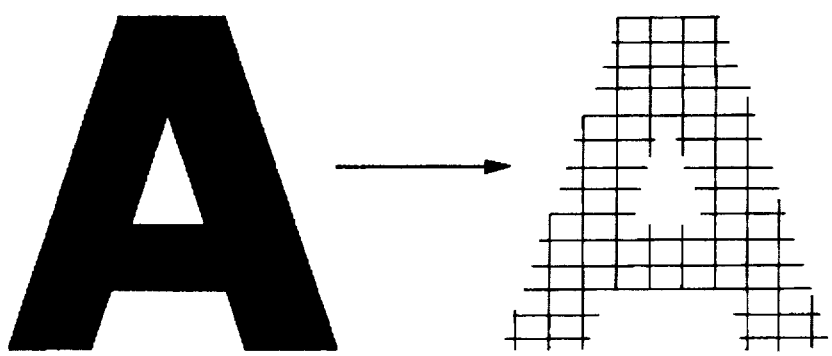
FIGS. 13A to 13E are each a view explaining an original input image and a processed pattern image.
Figure 13B:
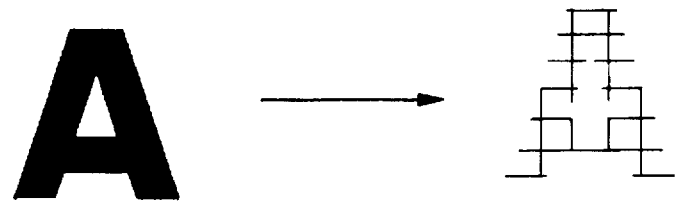
Figure 13C:

According to the image processing apparatus of this embodiment, therefore, the cycle of output pattern of ROM 700 will be larger when detection area. is larger. The pitch of pattern may thus be changed in accordance with the size of color area. It is possible to make smaller the capacity of ROM 700 and to perform patterning at a pitch corresponding to detected area as shown in FIGS. 13A, 13C. Thus the patterned character may also be read.

Figure 13D:
Figure 15:
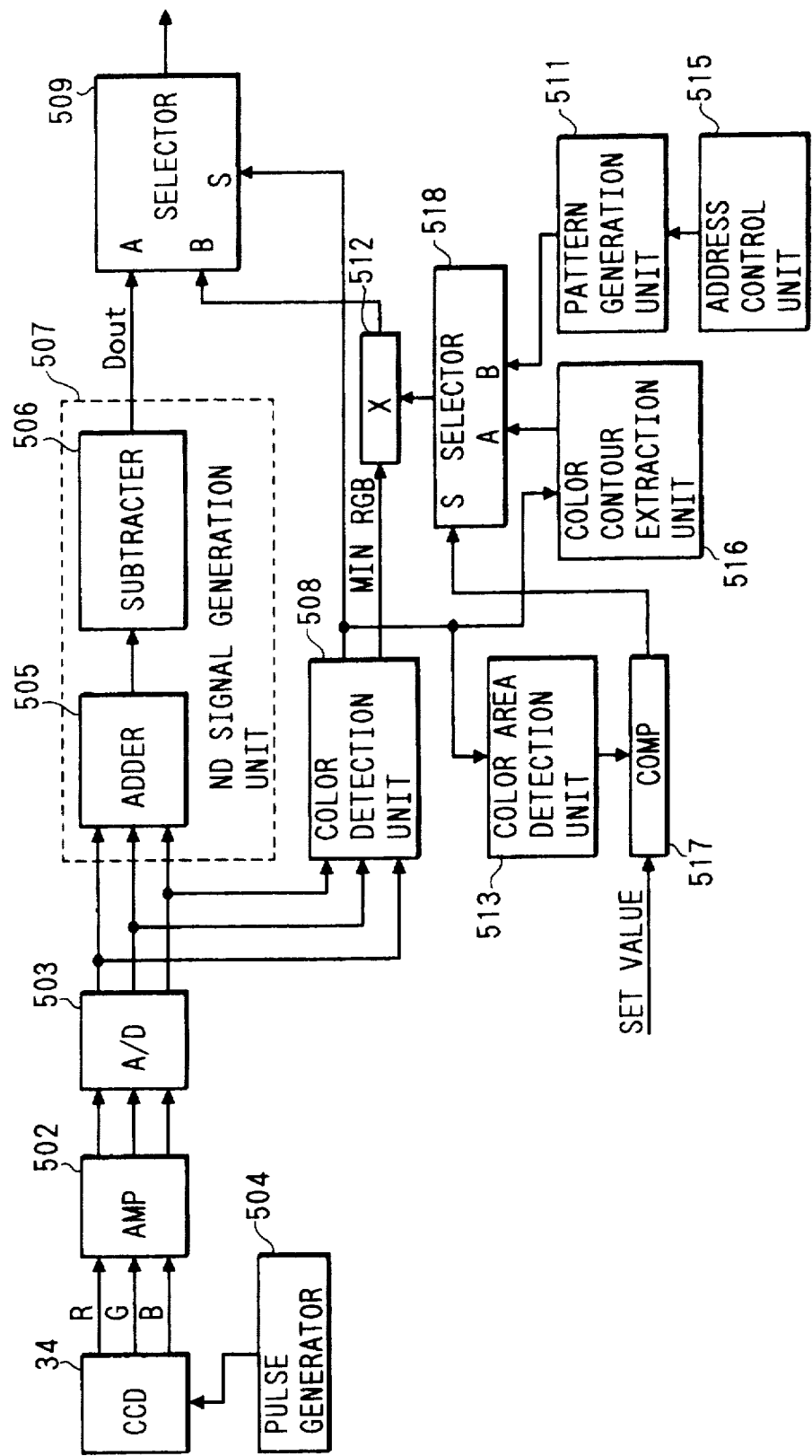
FIG. 15 is a block diagram of an image processing apparatus according to another embodiment of the present invention.

Another embodiment will now be described. FIG. 15 is a block diagram of an image processing apparatus of the present embodiment. The like components as in FIG. 5 are denoted by like numerals. While in the foregoing embodiments type or pitch of the pattern of characters is changed, there will be cases where a small character is hard to be discriminated as shown in FIG. 13D. In this embodiment, therefore, instead of using pattern, outlines are formed by means of contouring when the size of color area is smaller than a predetermined value.

Color judgment signal from the color detection unit 508 is input to the color area detection unit 513 which judges the size of color area and is also input to a color contour extraction unit 516 which extracts the contour of characters. A comparator 517 makes a comparison between area judgment signal from the color area detection unit 513 and set value and outputs the result as the control signal of the selector 518. The color contour extraction unit 516 extracts the contour of characters from the color judgment signal from the color detection unit 508 in a manner as will be described later, and provides it to an input terminal A of the selector 518. A pattern from the above-described pattern generation unit 511 is input to an input terminal B of the selector 518.

The detailed operation of the color contour extraction unit 516 will now be described. Since the color judgment signal from the color detection unit 508 is a binary signal, it is possible to extract the contour of a character by means of exclusive-OR of the relevant pixel and its peripheral pixels. In particular, when the relevant pixel is set as g(Xn, Ym), the extraction signal C(Xn, Ym) will be obtained from the following formula. Note that, in the following formula, a symbol "^" indicates an EXCLUSIVE-OR operation and a symbol "|" indicates an OR operation.

$$C(Xn, Ym) = \{g(Xn, Ym) \char`\^ g(Xn + 1, Ym + 1)\}$$
$$| \{g(Xn, Ym) \char`\^ g(Xn, Ym + 1)\}$$
$$| \{g(Xn, Ym) \char`\^ g(Xn - 1, Ym + 1)\}$$
$$| \{g(Xn, Ym) \char`\^ g(Xn + 1, Ym)\}$$
$$| \{g(Xn, Ym) \char`\^ g(Xn - 1, Ym)\}$$
$$| \{g(Xn, Ym) \char`\^ g(Xn + 1, Ym - 1)\}$$
$$| \{g(Xn, Ym) \char`\^ g(Xn, Ym - 1)\}$$
$$| \{g(Xn, Ym) \char`\^ g(Xn - 1, Ym - 1)\}$$

Figure 13E:

Since, according to an image processing apparatus of the above described embodiment, an outlined character is formed by means of contouring when the size of color area is smaller than a predetermined value, it is possible as shown in FIG. 13E to discriminate a small character even under a pattern processing state.

Figure 16:
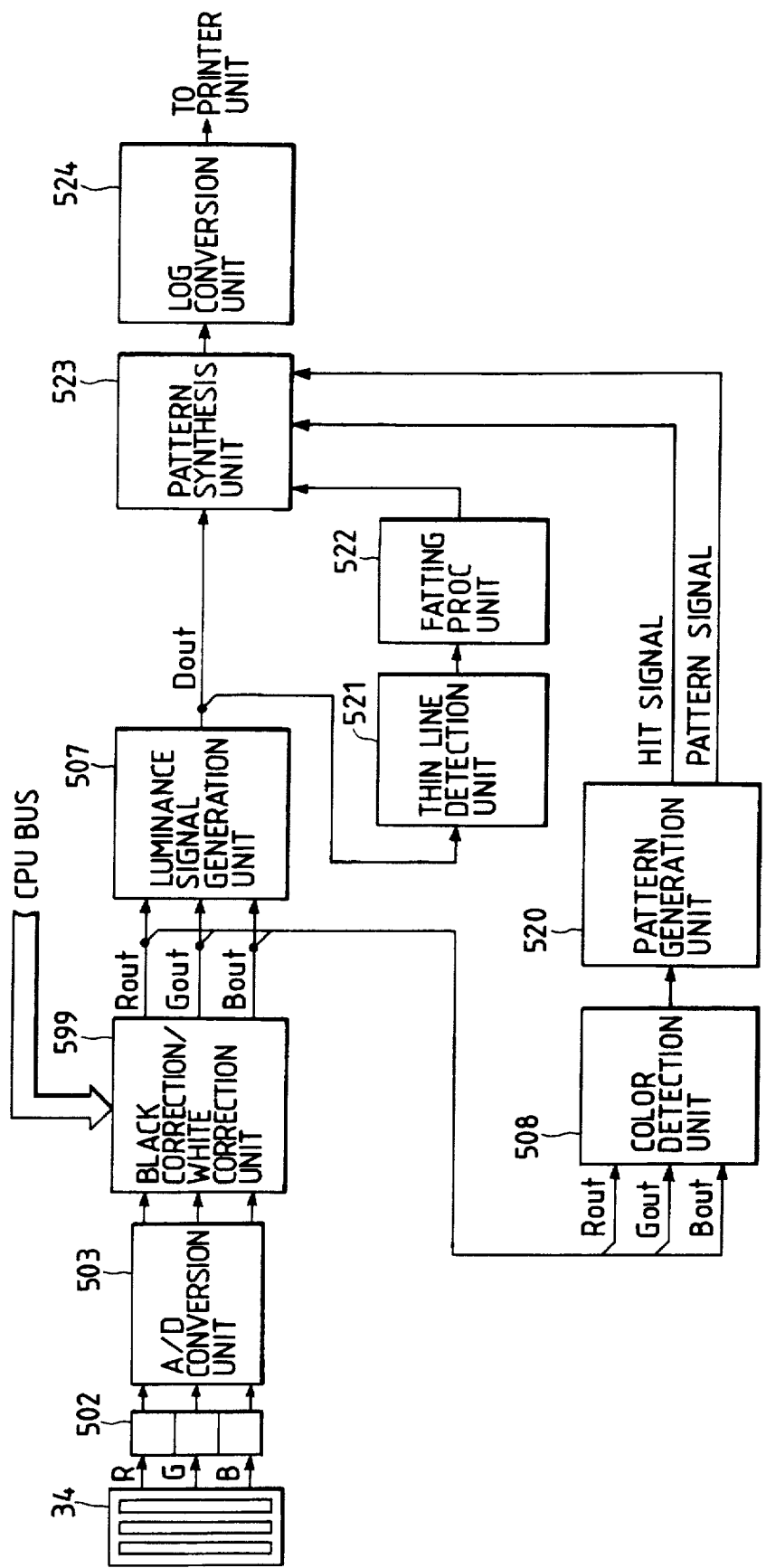
FIG. 16 is a block diagram of an image processing apparatus according to another embodiment of the present invention.
Figure 17:
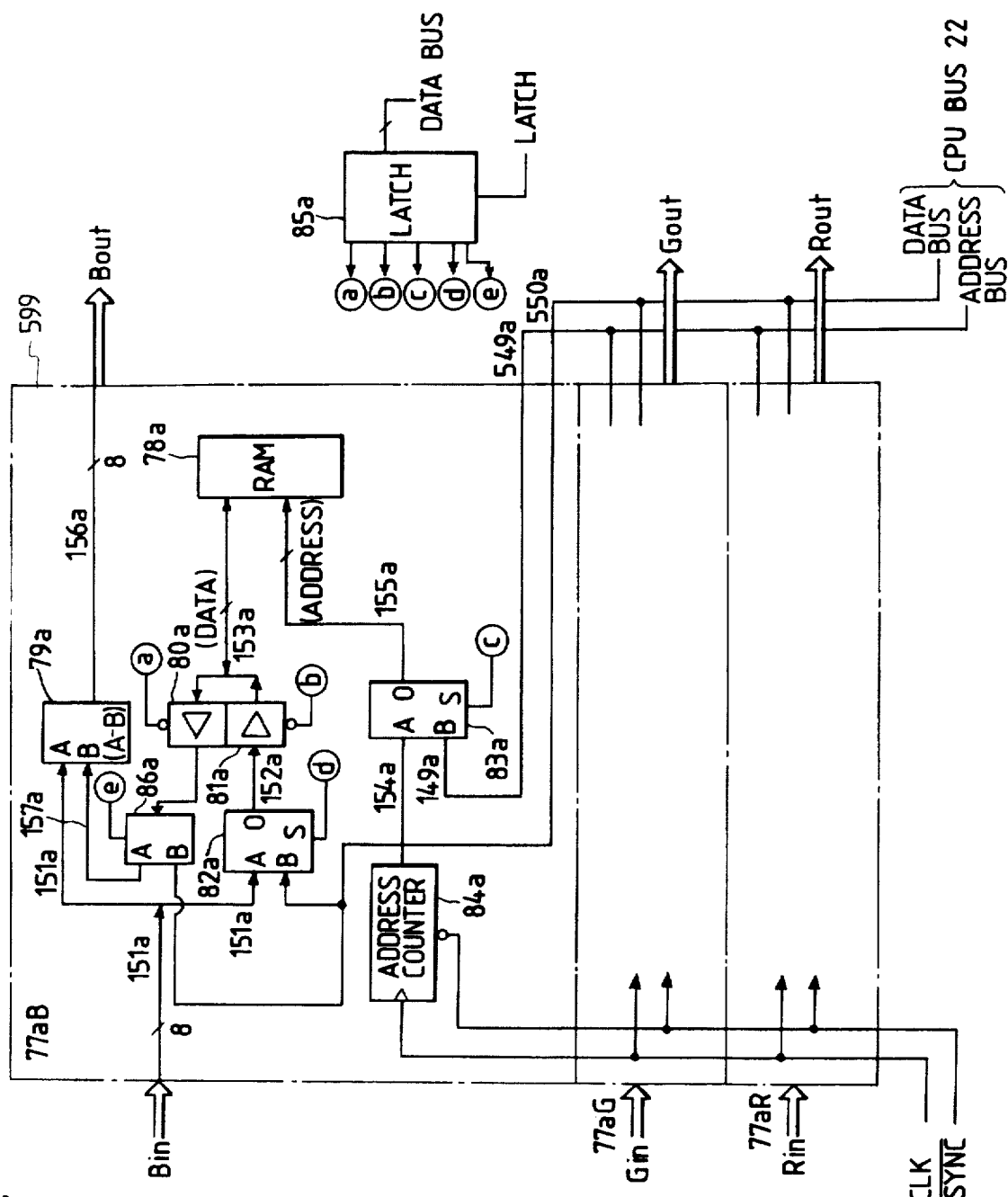
FIG. 17 is a block diagram showing the detail of the black-correction unit of black-correction/white-correction unit 599 as shown in FIG. 16.
Figure 18A:
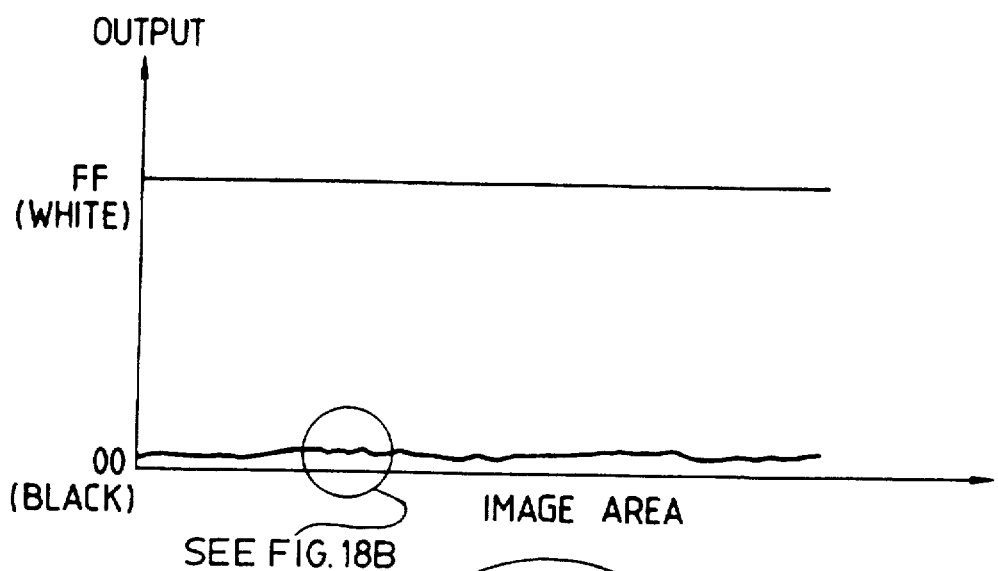
FIG. 18 is a diagram showing data related to black-correction unit as shown in FIG. 17.
Figure 18B:
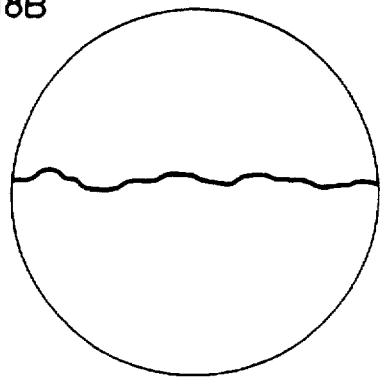
Figure 20:
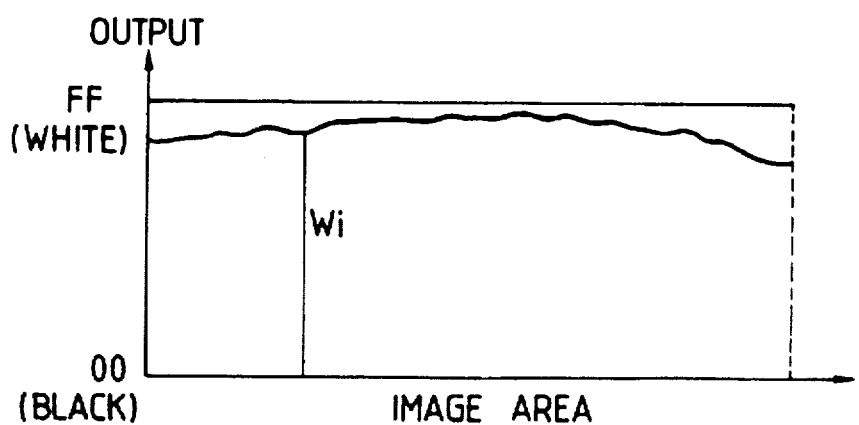
FIG. 20 is a diagram showing data related to white-correction unit as shown in FIG. 19.
Figure 19:
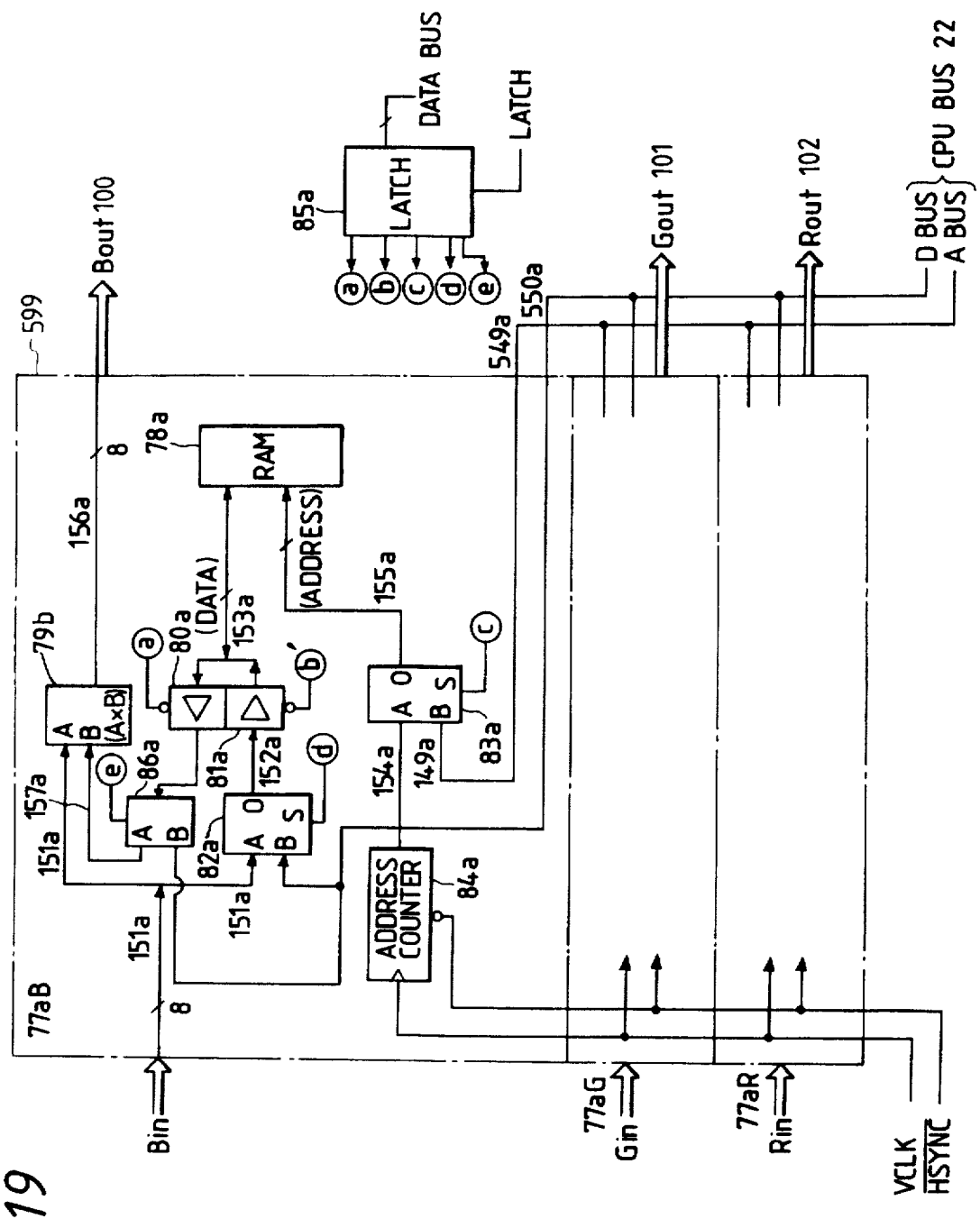
FIG. 19 is a block diagram showing the detail of the white-correction unit of black-correction/white-correction unit 599 as shown in FIG. 16.
Figure 21:
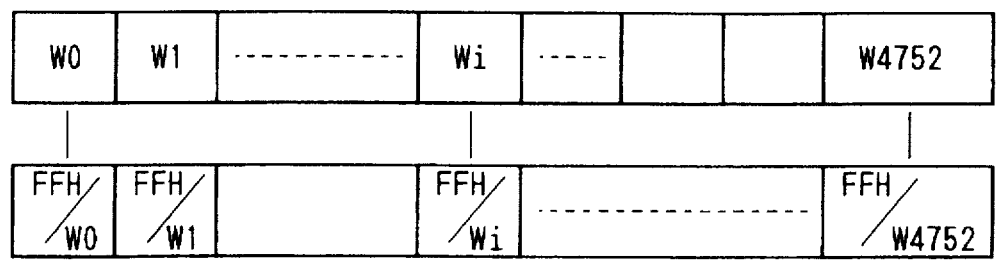
FIG. 21 is a diagram showing data related to white-correction unit as shown in FIG. 19.
Figure 22:
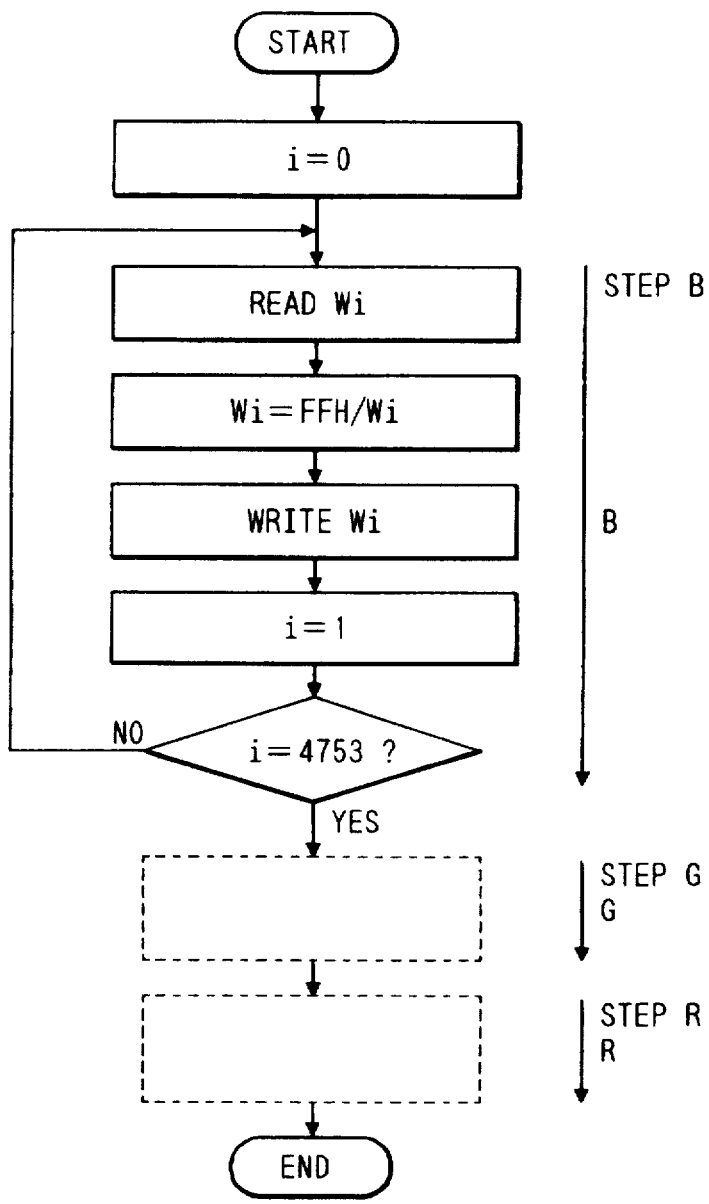
FIG. 22 is a flowchart showing the operation of white-correction unit as shown in FIG. 19.
Figure 23:
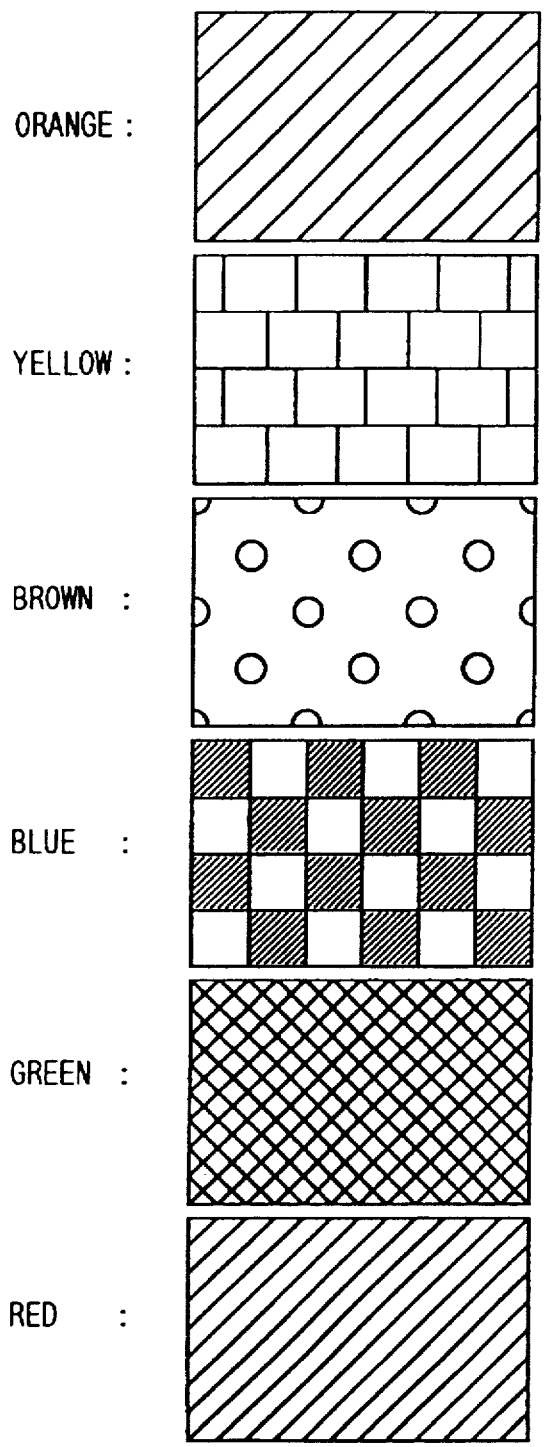
FIG. 23 is a view showing generated patterns of the pattern generation unit 511 as shown in FIG. 16.
Figure 24:
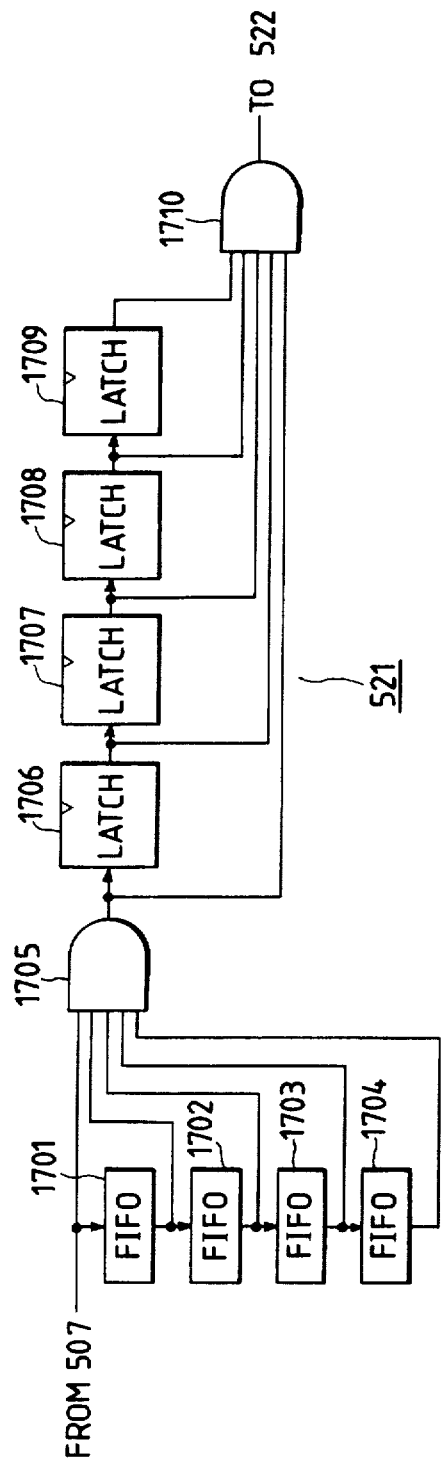
FIG. 24 is a detailed block diagram of thin line detection unit 521 as shown in FIG. 16.
Figure 25:
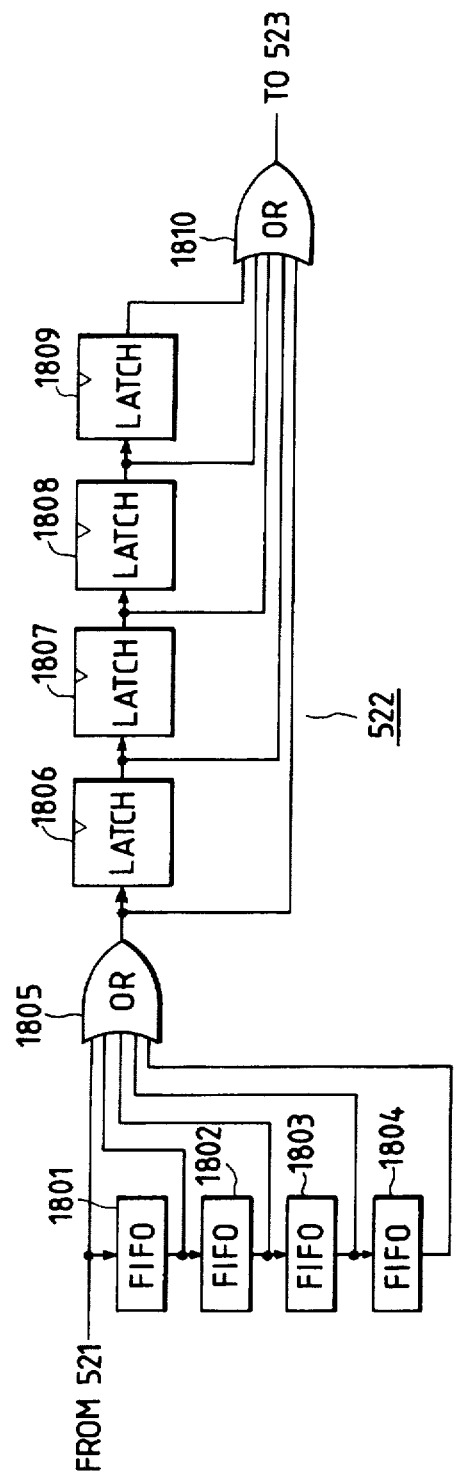
FIG. 25 is a detailed block diagram of fatting process unit 522 as shown in FIG. 16.

Another embodiment will now be described with reference to FIG. 1, FIG. 16 to FIG. 28. FIG. 16 is a block diagram of an image processing apparatus according to the present embodiment; FIG. 17 is a block diagram showing the detailed construction of a black correction unit 599 of a black-correction/white-correction unit as shown in FIG. 16; FIG. 18 shows data of the black correction unit 599 as shown in FIG. 17; FIG. 19 is a block diagram showing the detailed construction of a white correction unit 599 of a black-correction/white-correction unit as shown in FIG. 16; FIG. 20 and FIG. 21 shows data of the white correction unit 599 as shown in FIG. 19; FIG. 22 is a flowchart showing the operation of the white correction unit as shown in FIG. 19; FIG. 23 shows generated pattern of a pattern generation circuit as shown in FIG. 16; FIG. 24 is a block diagram showing the detailed construction of a thin line detection circuit as shown in FIG. 16; FIG. 25 is a block diagram showing the detailed construction of a fatting circuit as shown in FIG. 16; FIG. 26 shows the operation of the fatting circuit as shown in FIG. 25; FIG. 27 is a block diagram showing the detailed construction a pattern synthesis circuit as shown in FIG. 16; and FIG. 28 shows the operation of the pattern synthesis circuit as shown in FIG. 27.

Referring to FIG. 16, each of the color signals converted by CCD 34 is amplified to a predetermined level by an amplifier circuit 502 and is converted into a digital signal by an A/D converter 503. Next, in the present embodiment, a correction of black level and a correction of white level (shading correction) are performed by the black-correction/white-correction unit 599, and luminance signal Dout is then outputted by ND signal generation unit 507 from the digital image signals after the black correction and white correction. Further, the signals corrected by the black-correction/white-correction unit 599 are input to a thin line detection unit 521.

The detailed construction of the black-correction/white-correction unit 599 will now be described with reference to FIG. 17 and FIG. 18. Since variance or the like among pixels is large as shown in FIG. 18 when the amount of light inputted to CCD 34 is minimal, line or nonuniformity will occur in the data portion of the image if outputted as an image as it is. Thus, in a black reference value read mode prior to reading the original image, the mirror 24 of the image read unit 3 as shown in FIG. 1 is first moved to the position of a black color plate (not shown) having a uniform density and positioned at the non-image region of the front end portion of the platen, and the exposure lamp 25 is lit to read from CCD 34 the reflected light from the original image so that signals Bin, Gin, Rin separated into each color component are read into the black correction unit 599 as shown in FIG. 17. Since, in FIG. 17, a green circuit 77aG and a red circuit 77aR are of the same construction as the blue circuit 77aB, they are omitted.

In FIG. 17, the blue signal Bin corresponding to one line of black color is stored into RAM 78a by way of a data line 151, input terminal A of a selector 82a, a data line 152a, a gate 81a, and a data line 153a. In this case, of the selector 82a the input terminal A is selected by control signal D from a latch 85a; the gate 80a is closed by control signal a; the gate 81a is opened by control signal d; and of the selector 83a for address, the input terminal A is selected by control signal c. Therefore, the address by which an address counter 84a counts the image signal VCLK after its initialization by means of a reversed signal of the horizontal synchronous signal SYNC is applied to RAM 78a via the selector 83a, the address line 155a, and the blue signal Bin corresponding to one line is stored in RAM 78.

When actually reading an image, the blue signal Bin corresponding to one line which has been stored in RAM 78a is read out and is input to the input terminal B of the subtracter 79a via the data line 153a, the gate 80a, a terminal A of the selector 86a, and the data line 157a. On the other hand, the blue signal of the actual original image is input to the input terminal A of the subtracter 79a. In this case, the gate 80a is opened by control signal a; the gate 81a is closed by control signal b; and the terminal A is selected at the selector 86a by control signal e.

Accordingly, the output signal of the subtracter 79a, i.e., the output signal Bout of the blue circuit 77aB of the black correction unit is corrected by subtracting the blue signal for the reference black color from the blue signal of the actual original image. Output signals Gout, Rout respectively of the green circuit 77aG and the red circuit 77aR are also corrected in their black components in a similar manner. Note that, when the terminals B respectively of the selectors 82a, 83a, 86a are selected, a CPU (not shown) may access by way of an address bus and a data bus.

The detailed construction of the white correction unit of the black-correction/white-correction unit 599 will now be described with reference to FIG. 19. In this white correction unit, a multiplier 79b is used instead of the subtracter 79a of the black correction unit as shown in FIG. 17, the other portions being identical to those shown in FIG. 17. First, in a white reference value reading mode prior to reading the original image, the mirror 24 of the original image read unit 3 as shown in FIG. 1 is moved to the position of white color plate (not shown), and the exposure lamp 25 is lit to read into RAM 78a the signals Bin, Gin, Rin of each color component corresponding to one line.

Here, if the width of main-scan direction of the white color plate is for example of the A4 size, 4752 (=16×297 mm) pixels when supposing 16 pel/mm, i.e., the capacity of RAM 78a is 4752 bytes. Further, data Wi (i=1 to 4752) of the "i"th pixel of the white color plate as shown in FIG. 20 will be stored in RAM 78 in manner as shown in FIG. 21.

The operation of the white correction unit will now be described with reference to FIG. 22. First, for data Wi of "i"th pixel of the white color plate, the read value Di of a normal image will be corrected to data D0 (= Di×FFH/Wi). Thus, firstly, the gate 80 is opened, the gate 81 is closed, and the terminals B of the selectors 83a, 86a are selected respectively by control signals a to c, e of the latch 85 as shown in FIG. 19 so that CPU is accessible via the address bus and the data bus.

When CPU calculates coefficient FFH/Wi for each color by performing blue processing (step B), green processing (step G), red processing (step R) as shown in FIG. 22, the gate 80 is closed, the gate 81 is opened, each of the B terminals of the selectors 83a, 82a is selected respectively by control signals a to d. Thus, coefficient FFH/Wi for each color calculated by CPU will be stored in RAM 78.

When reading the actual image, coefficient FFH/Wi for each color stored in RAM 78a is read out and is input to the input terminal B of the multiplier 79b via the data line 153a, the gate 80a, the terminal A of selector 86a, and the data line 157. Further, the blue signal Bin of the actual original image is input to the input terminal A of the multiplier 79b. In this case, the gate 80 is opened by control signal a; the gate 81 is closed by control signal b; and the terminal A is selected at the selector 86a by control signal e.

Accordingly, the output signal of the multiplier 79b, i.e., the output signal Bout of the blue circuit 77aB of the black correction unit is corrected by means of multiplying the blue signal of the actual original image by coefficient FFH/Wi. Further, the output signals Gout, Rout respectively of the green circuit 77aG and the red circuit 77aR are also corrected in their white components in a similar manner.

Luminance (ND) signal generation unit 507 as shown in FIG. 16 is identical to that in the foregoing embodiment. A color detection unit 508 of the present embodiment outputs a 5-bit color judgment signal, and dot pattern which varies according to each color as shown in FIG. 23 is previously stored in the ROM of the pattern generation circuit 520. Each dot pattern is constituted by 16×16 dots, and a total of 13 bits, 5-bit color judgment signal and 4 bits each for the aforementioned main-scan counters 701, 703, is used as read address. A pattern to be read out from the pattern generation circuit 520 has a data length of 8 bits, of which most significant bit MSB is designed to be "1" at all times and is used as HIT signal which will be described later.

The detailed construction of a thin line detection unit 521 as shown in FIG. 16 will now be described with reference to FIG. 24. The thin line detection unit 521 uses a 5×5 matrix. The luminance signal Dout of the luminance signal generation unit 507 is input to FIFO (first-in first-out) memories 1701 to 1704 with a delay sequentially by each line, and is also input to a 5-input AND gate 1705 together with the output signals of FIFO memories 1701 to 1704. The output signal of the AND gate 1705 is latched by latch circuits 1706 to 1709 sequentially by each pixel and is input to a 5-input AND gate 1710 together with the signals latched by the latch circuits 1706 to 1709.

That is, with this thin line detection unit 521, the output signal of the AND gate 1710 becomes "0" for the case of a line thinner than five pixels, whereby a line equal to or more than five pixels is not detected as a thin line.

FIG. 25 shows the detailed construction of a fatting process unit 522 as shown in FIG. 16. The fatting process unit 522 also uses a 5×5 matrix in a similar manner as the thin line detection unit 521 at the previous stage. The detection signal of the thin line detection unit 521 is input to FIFO memories 1801 to 1804 with a delay sequentially by each line, and is input to a 5-input OR gate 1805 together with the output signals of FIFO memories 1801 to 1804. The output signal of OR gate 1805 is latched by latch circuits 1806 to 1809 sequentially by each pixel, and is also input to a 5-input OR gate 1810 together with the signals latched by the latch circuits 1806 to 1809.

Figure 26A:
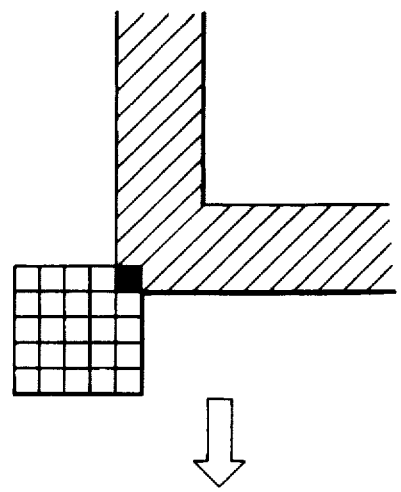
FIGS. 26A and 26B are views showing the operation of fatting process unit 522 of FIG. 25.
Figure 26B:
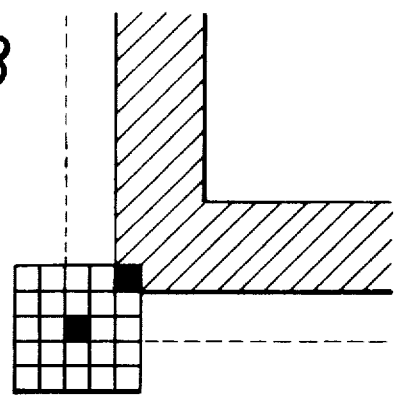
Figure 27:
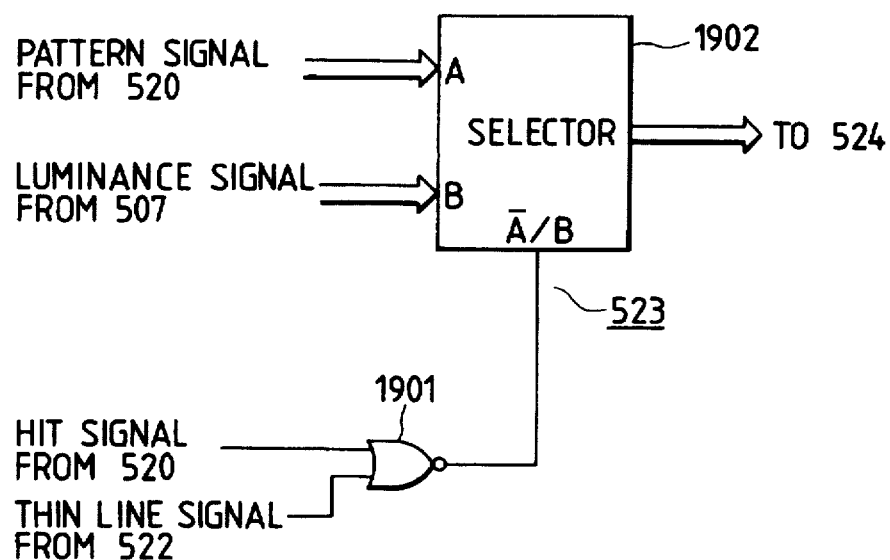
FIG. 27 is a view showing the construction of pattern synthesis unit 523 as shown in FIG. 16.

That is, with this fatting process circuit 522, when as shown in FIG. 26A at least one pixel within a 5×5 matrix is black, the line image indicated by the slants will be fatted by, as shown in FIG. 26B, assuming that from the line image indicated by the slants to the center pixel of the 5×5 matrix is black.

The detailed construction of a pattern synthesis unit 523 as shown in FIG. 16 will now be described with reference to FIG. 27. The luminance signal Dout of the luminance signal generation unit 507 and the pattern signal from the pattern generation unit 520 are input to the input terminals B, A of a selector 1902, respectively. HIT signal from the pattern generation unit 520 and the thin line signal from the fatting circuit 522 are input to NOR gate 1901. Further, the output signal of NOR gate 1901 is input to the selector 1902 as a selection control signal.

In this pattern synthesis circuit 523, the output signal of NOR gate 1901 becomes "0" when HIT signal is "1" or when the thin line signal is "1" so that the pattern signal from the pattern generation circuit 520 is selected by the selector 902. On the other hand, when both HIT signal and the thin line signal are "0", the output signal of NOR gate 1901 becomes "1" so that the luminance signal Dout of the luminance signal generation unit 507 is selected by the selector 1902.

Figure 28A:
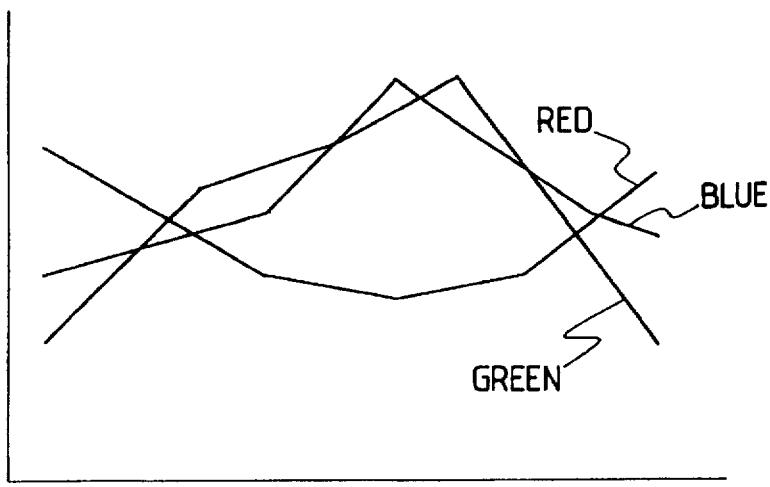
FIGS. 28A and 28B are views showing an output image in an embodiment.
Figure 28B:
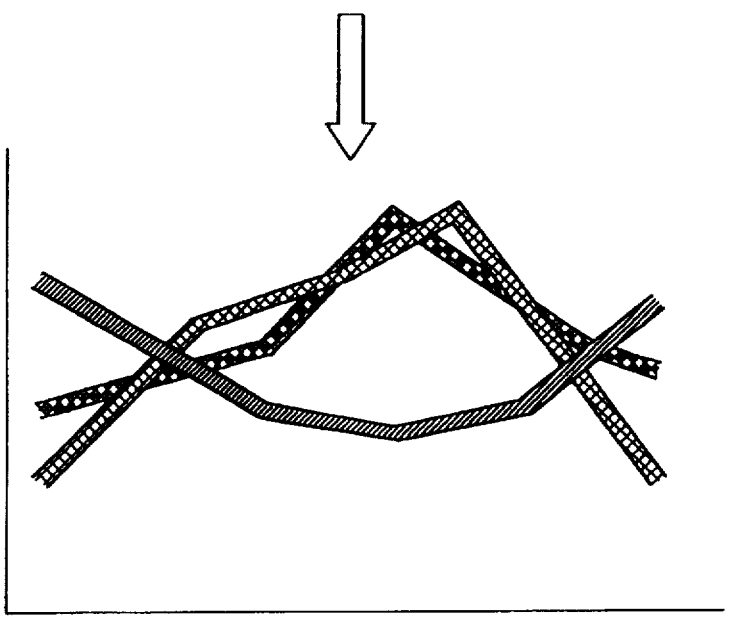

A line graph of the original which is written in red, blue and green as shown in FIG. 28A is patterned in a fatted manner as shown in FIG. 28B by HIT signal and the thin line signal. The output signal of the pattern synthesis circuit 523 is converted into a density signal from luminance by a LOG conversion unit 524 as shown in FIG. 16 to be outputted to a printer for example of a digital copying machine, an image scanner, a facsimile or the like. It should be noted that the LOG conversion unit 524 has a look-up table constituted for example by a ROM and converts luminance into density based on such table.

Since, in this way, a color image written in thin lines are fatted when they are to be patterned, it is possible to record an image which is easy to see even when the thin lines are patterned.

Figure 29:
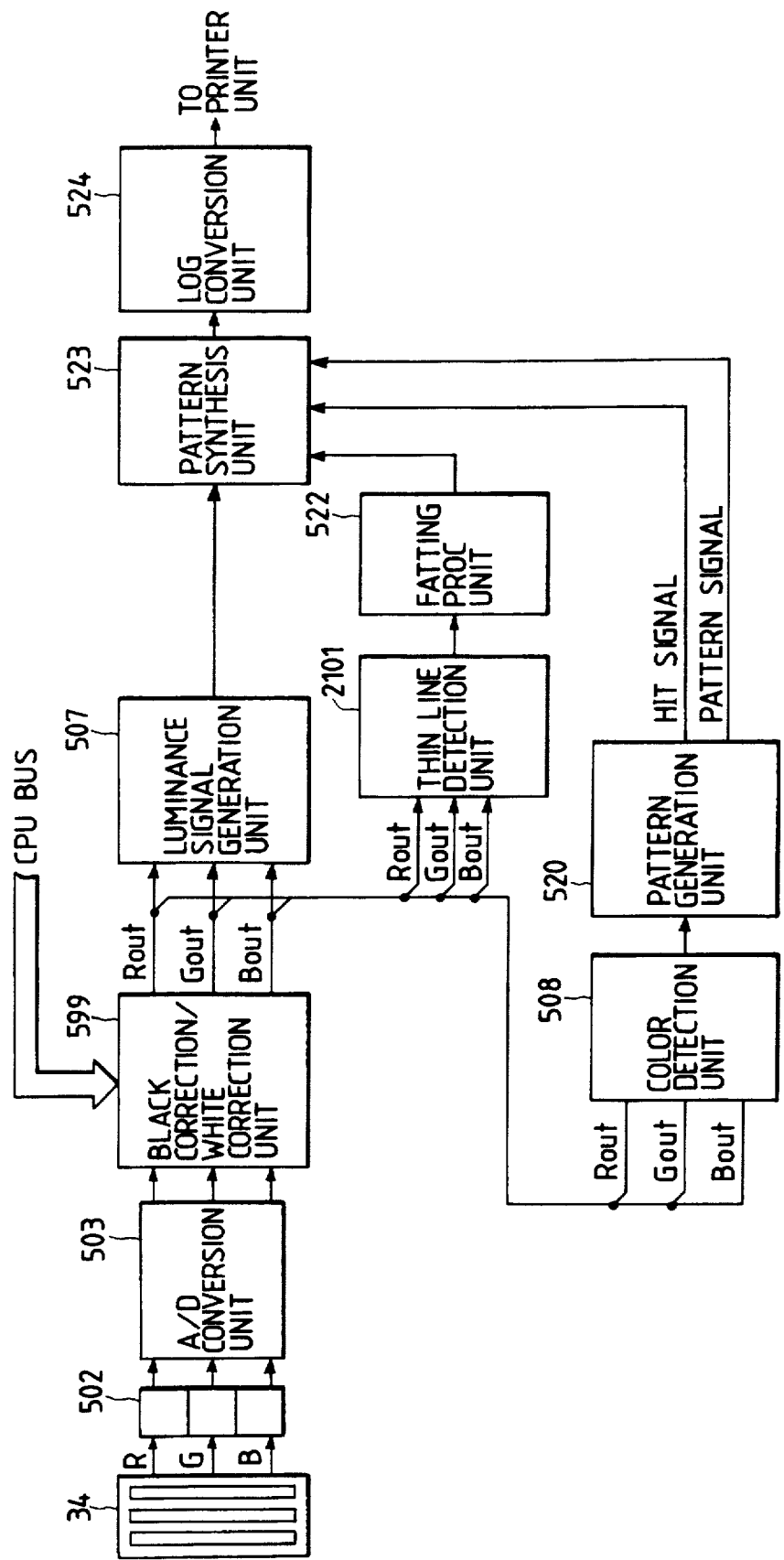
FIG. 29 is a block diagram of an image processing apparatus according to another embodiment of the present invention.
Figure 30:
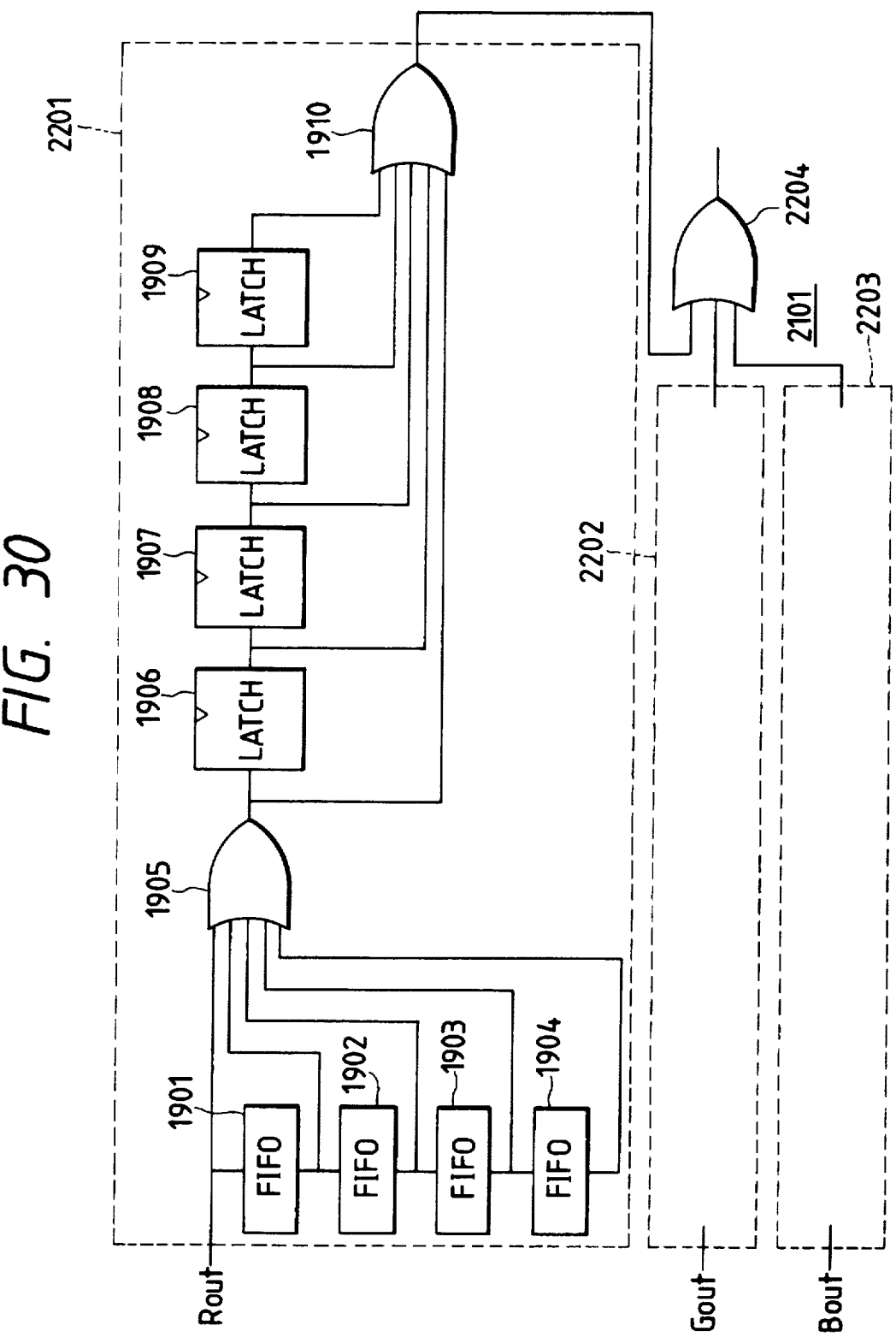
FIG. 30 is a detailed block diagram of thin line detection unit 2101 as shown in FIG. 29.

Another embodiment will now be described with reference to FIG. 29 and FIG. 30. FIG. 29 is a block diagram of an image processing apparatus of the present embodiment. FIG. 30 is a block diagram showing the detailed construction of a thin line detection unit as shown in FIG. 29. While, in the foregoing embodiment as shown in FIG. 16, the thin line detection unit 521 is constructed to make a detection based on the luminance signal Dout of the luminance signal generation unit 507, it is constructed in this embodiment such that a thin line is detected by the signals Rout, Gout, Bout of the black-correction/white-correction unit 599 as shown in FIG. 29.

Referring to FIG. 30, a red thin line detection circuit 2201, a green thin line detection circuit 2202, and a blue thin line detection unit 2202 have an identical construction with each other. Red signal Rout is input to FIFO memories 1901 to 1904 with a delay sequentially by each line, and is input to a 5-input OR gate 1905 together with the output signals of FIFO memories 1901 to 1904. The output signal of the OR gate 1905 is latched by latch circuits 1906 to 1909 sequentially by each pixel and is also input to a 5-input OR gate 1910 together with the signals latched by the latch circuits 1906 to 1909. The output signal of each OR gate 1910 of the red thin line detection circuit 2201, the green thin line detection circuit 2202, and the blue thin line detection circuit 2203 is input to 3-input OR gate 2204 to detect a thin line.

Figure 31:
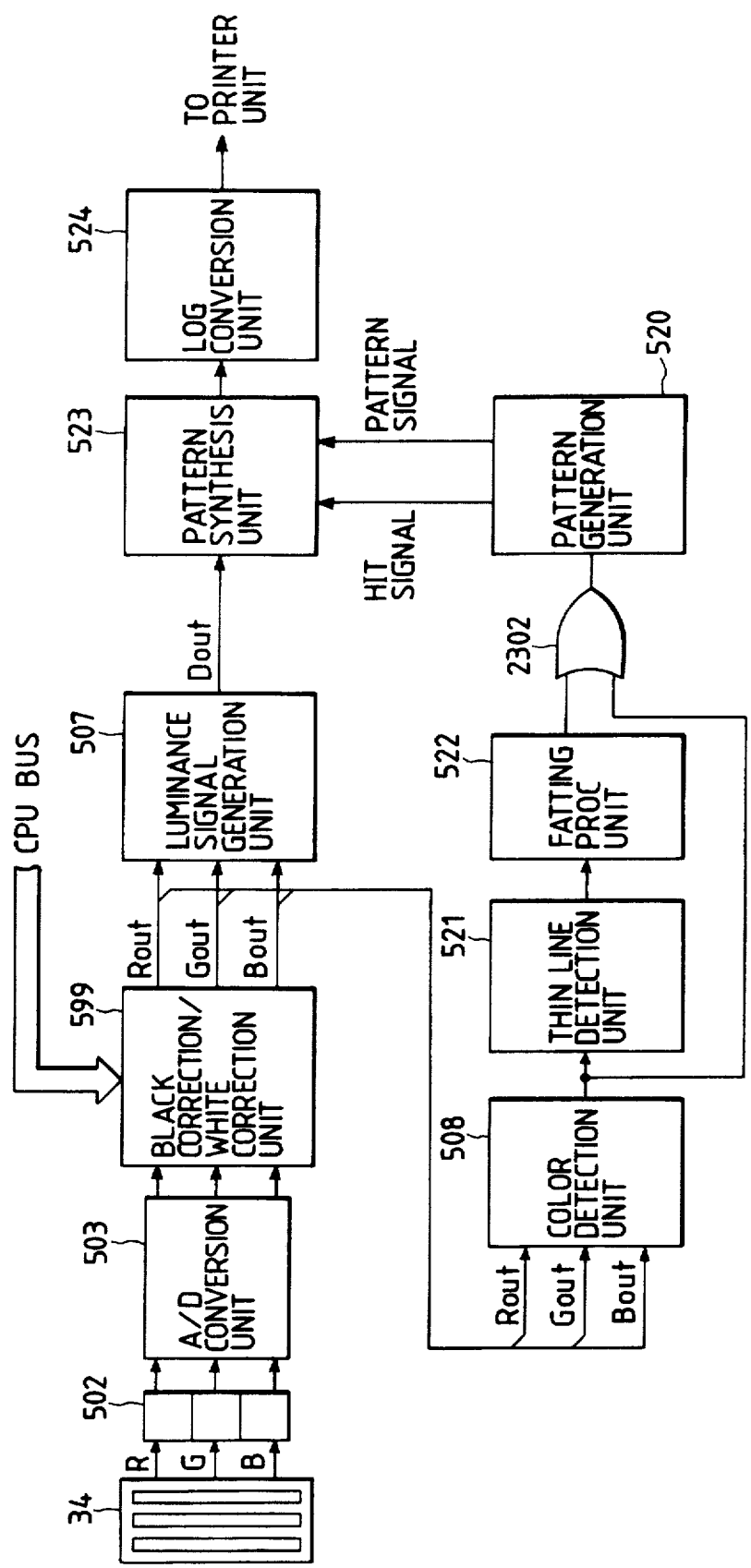
FIG. 31 is a block diagram of an image processing apparatus according to another embodiment of the present invention.

FIG. 31 is a block diagram of an image processing apparatus of another embodiment. In this embodiment, the construction is such that: a thin line detection circuit 521 detects a thin line by color judgment signal from a color detection unit 508; such thin line is fatted by a fatting process circuit 522; color judgment signal of the color detection unit 508 and the output signal of the fatting process circuit 522 are then input to OR gate 2302; and, by using the resulted disjunction signal, HIT signal and pattern corresponding to desired hue are read out from the pattern generation circuit 520.

Figure 32:
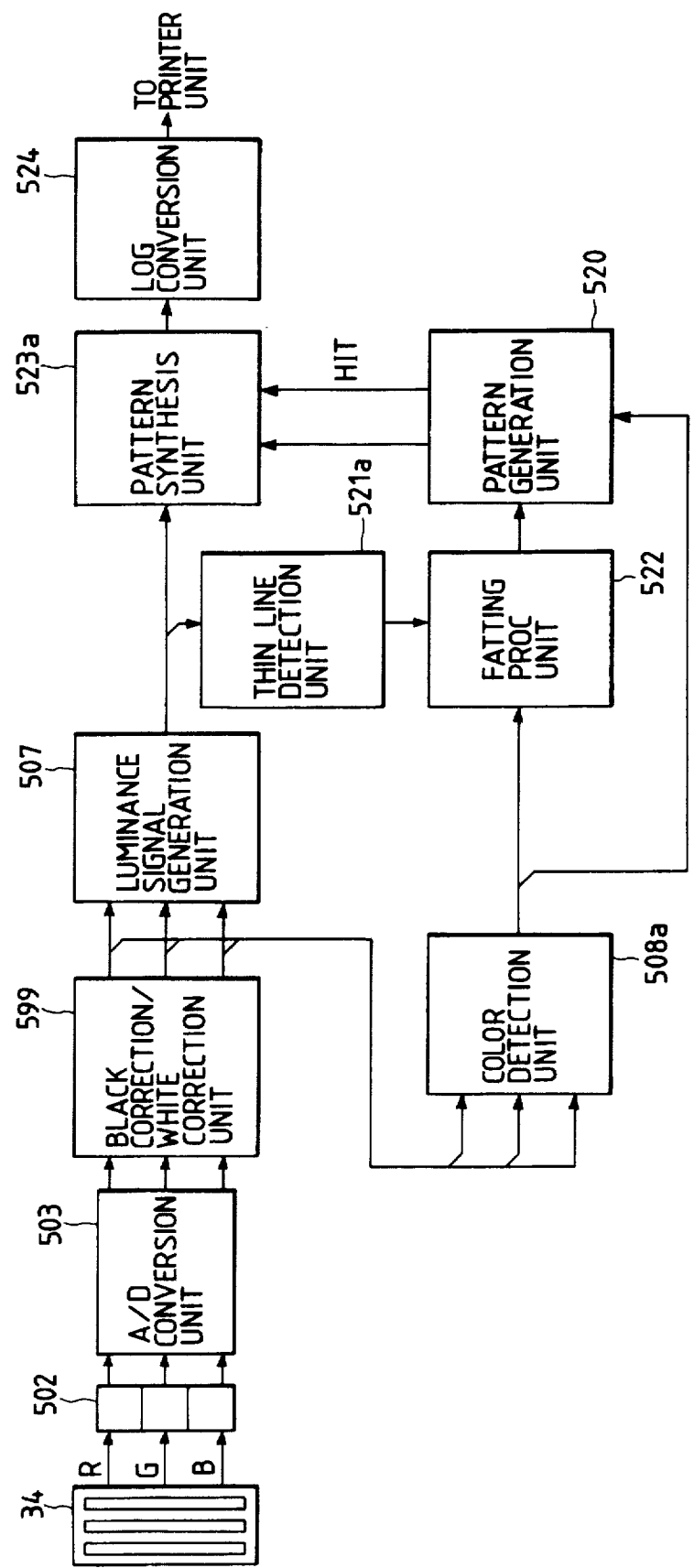
FIG. 32 is a block diagram of an image processing apparatus according to another embodiment of the present invention.
Figure 33:
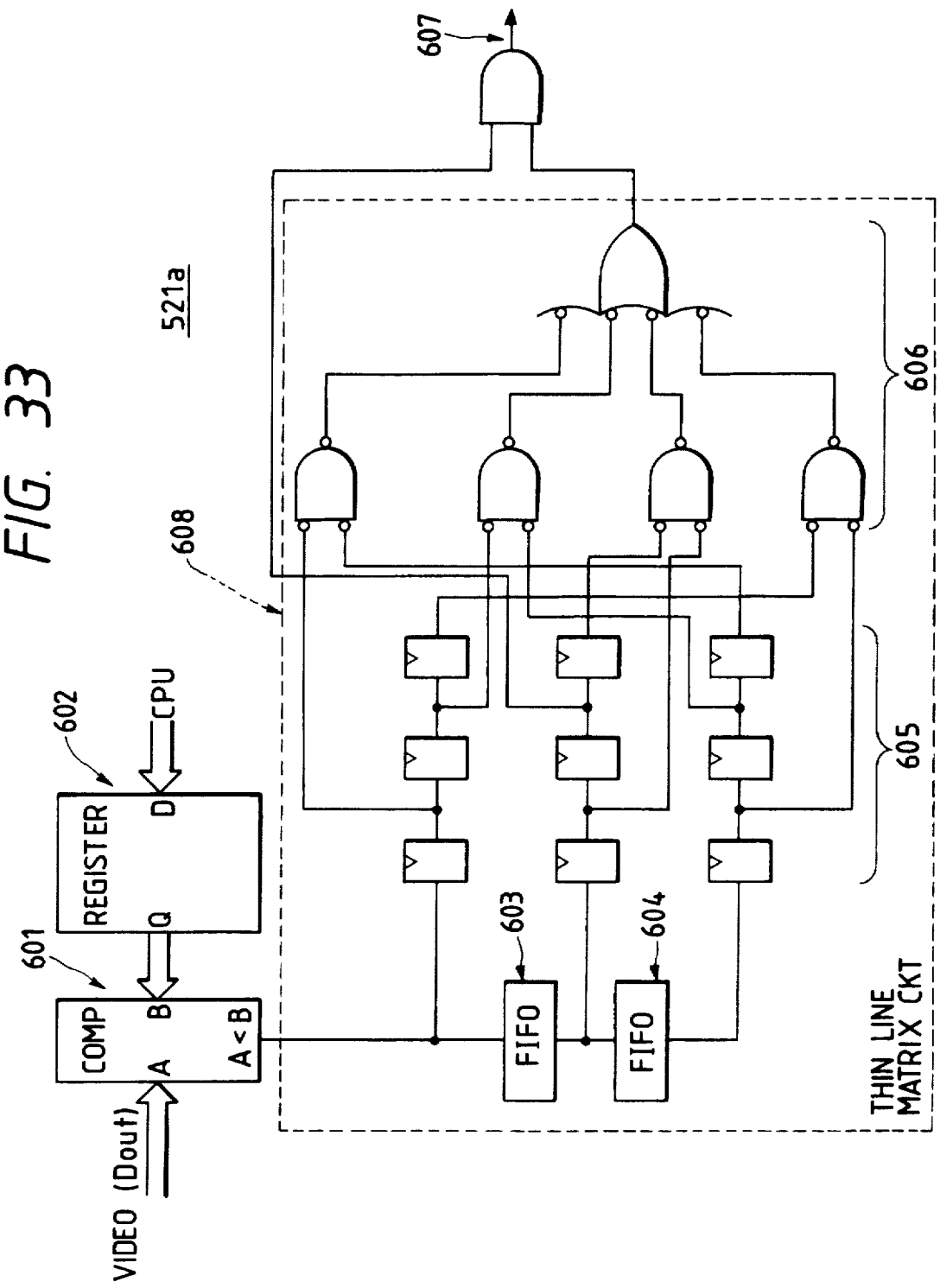
FIG. 33 is a detailed block diagram of thin line detection unit 521 as shown in FIG. 32.
Figure 34A:
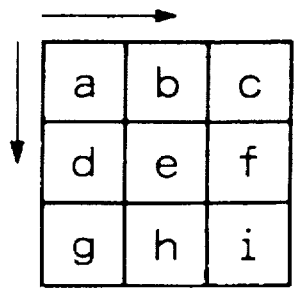
FIGS. 34A to 34E are diagrams showing the operation of thin line matrix circuit 608 as shown in FIG. 33.
Figure 34B:
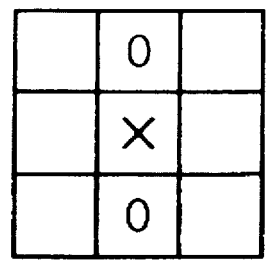
Figure 34C:
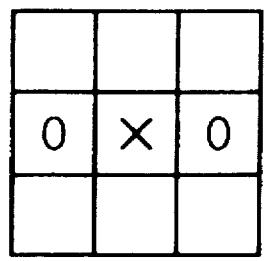
Figure 34D:
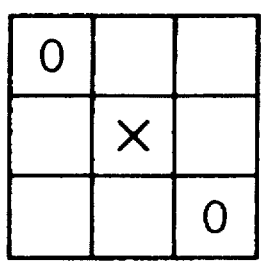
Figure 34E:
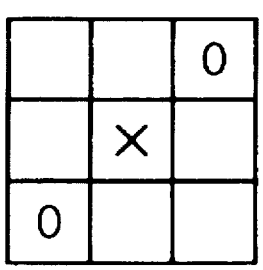
Figure 35:
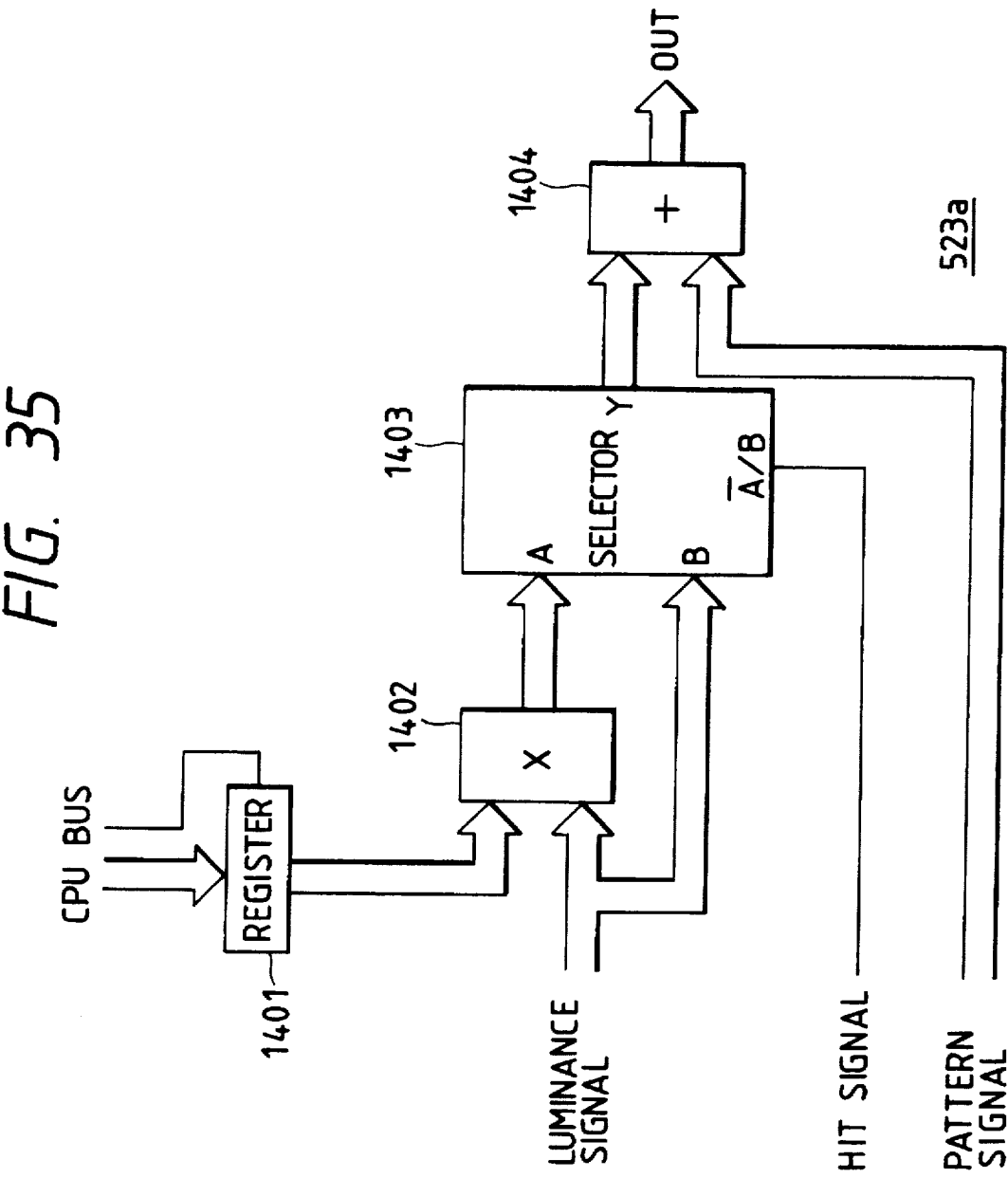
FIG. 35 is a detailed block diagram of pattern synthesis unit 523a as shown in FIG. 32.

Another embodiment will now be described with reference to FIG. 32 to FIG. 36. FIG. 32 is a block diagram of an image processing apparatus of the present embodiment; FIG. 33 is block diagram showing the detailed construction of a thin line detection unit 521a as shown in FIG. 32; FIG. 34 shows the operation of a thin line matrix circuit 608 as shown in FIG. 33; FIG. 35 is a block diagram showing the detailed construction of a pattern synthesis unit 523a as shown in FIG. 32; and FIG. 36 shows a synthesized result at the pattern synthesis unit 523a as shown in FIG. 35.

First, the detailed construction of the thin line detection unit 521a will be described with reference to FIG. 33 and FIG. 34. Referring to FIG. 33, a threshold for detecting a thin line is previously set in a register 602 by CPU, and the luminance signal Dout from the luminance signal generation unit 507 is compared with this threshold by a comparator 601 to be binarized and is input to the thin line matrix circuit 608. The thin line matrix circuit 608 recognizes a pattern consisting of thin lines by a 3×3 matrix (pixels a to i) as shown in FIG. 34A.

In the thin line matrix circuit 608, the binary signal from the comparator 601 is delayed by FIFO memories 603, .604 in the sub-scan direction sequentially by each line. Note that FIFO memories 603, 604 in this embodiment are each provided with a capacity of 5 kilobytes and are able to store an image data corresponding to one line in the longitudinal direction of an A4-size original with a resolution of 400 dpi.

Next, the binary signal from the comparator 601 and the binary signal delayed by FIFO memories 603, 604 are input to a flip-flop group 605 and are delayed in the main-scan direction by each pixel. The signals from the flip-flop group 605 are input to a gate group 606 to recognize: a pattern consisting of thin line in the sub-scan direction as shown in FIG. 34B; a pattern consisting of thin line in the main scan direction as shown in FIG. 34C; and patterns consisting of oblique lines as shown in FIGS. 34D, 34E. Accordingly, the output signal of an AND gate 607 becomes a judgment signal as expressed by the following formula, such judgment signal being input to a fatting process unit 522 as shown in FIG. 32.

$$\text{Judgment} = (a \cap h) \cup (d \cap f) \cup (a \cap i) \cup (c \cap g)$$

Figure 36A:
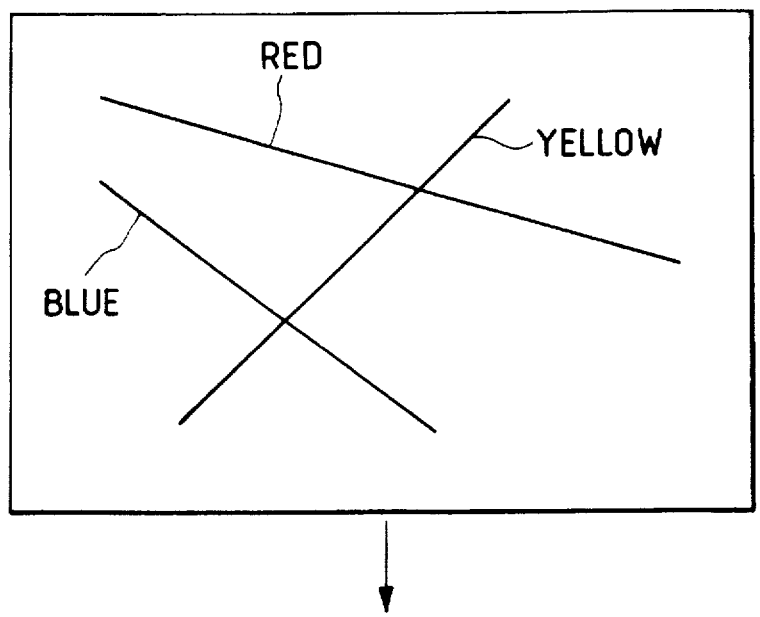
FIGS. 36A and 36B are views explaining an output image of an embodiment.
Figure 36B:
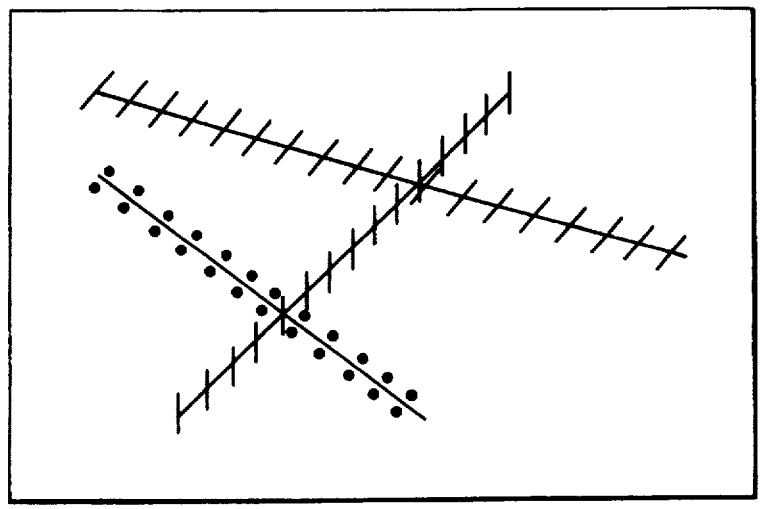

The detailed construction of the pattern synthesis unit 523a will now be described with reference to FIG. 35 and FIGS. 36A, 36B. A register 1401 is constituted for example by eight bits and is set previously by CPU with coefficients (0/128 to 255/128) for making the both sides of a thin line less vivid than its actual density. A multiplier 1402 multiplies the luminance signal Dout from the luminance signal generation unit 507 with such a coefficient and inputs the result to an input terminal A of a selector 1403. Further, the luminance signal Dout from the luminance signal generation unit 507 is input to an input terminal B of the selector 1403.

The selector 1403 selects the luminance signal from the multiplier 1402 when HIT signal from the pattern generation unit 520 is "1" and selects the luminance signal Dout from the luminance signal generation unit 507 when HIT signal is "0". An adder 1404 adds the luminance signal selected by the selector 1403 and the pattern signal from the pattern generation unit 520. Therefore, when processing thin lines of red, blue and yellow colors as shown in FIG. 36A, the output image may easily be recognized because as shown in FIG. 36B patterns which are less vivid than actual density are added to the both sides of the thin lines.

Figure 37:
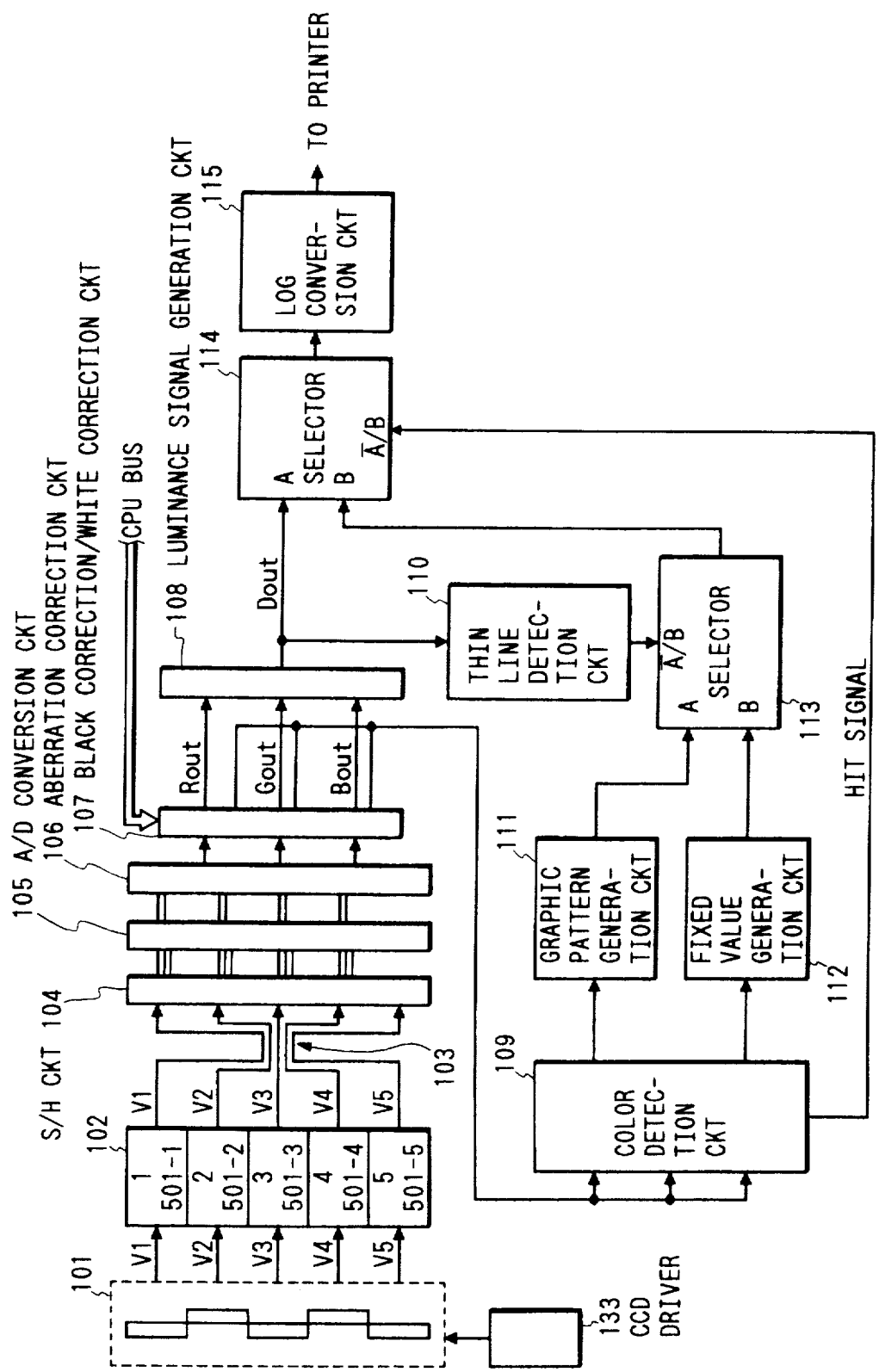
FIG. 37 is a block diagram of an image processing apparatus according to another embodiment of the present invention.
Figure 38:
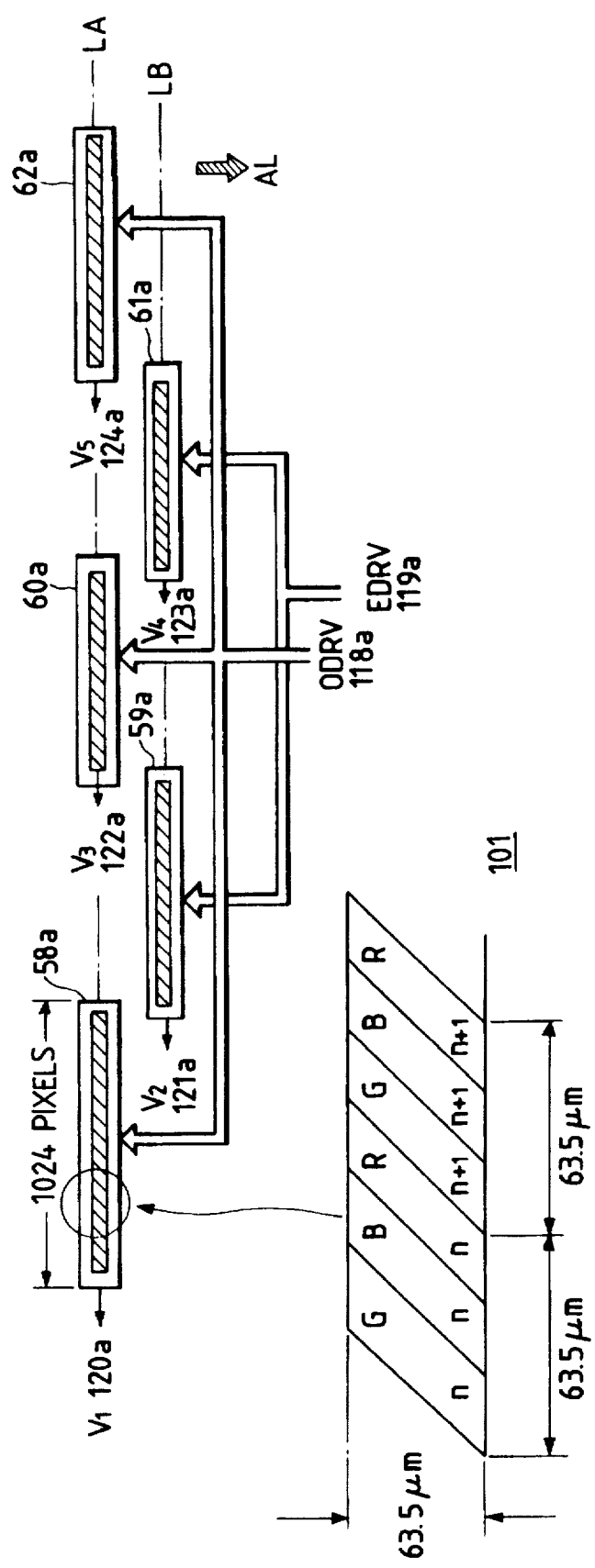
FIG. 38 is a view showing the detailed construction of color CCD image sensor 101 as shown in FIG. 37.
Figure 39:
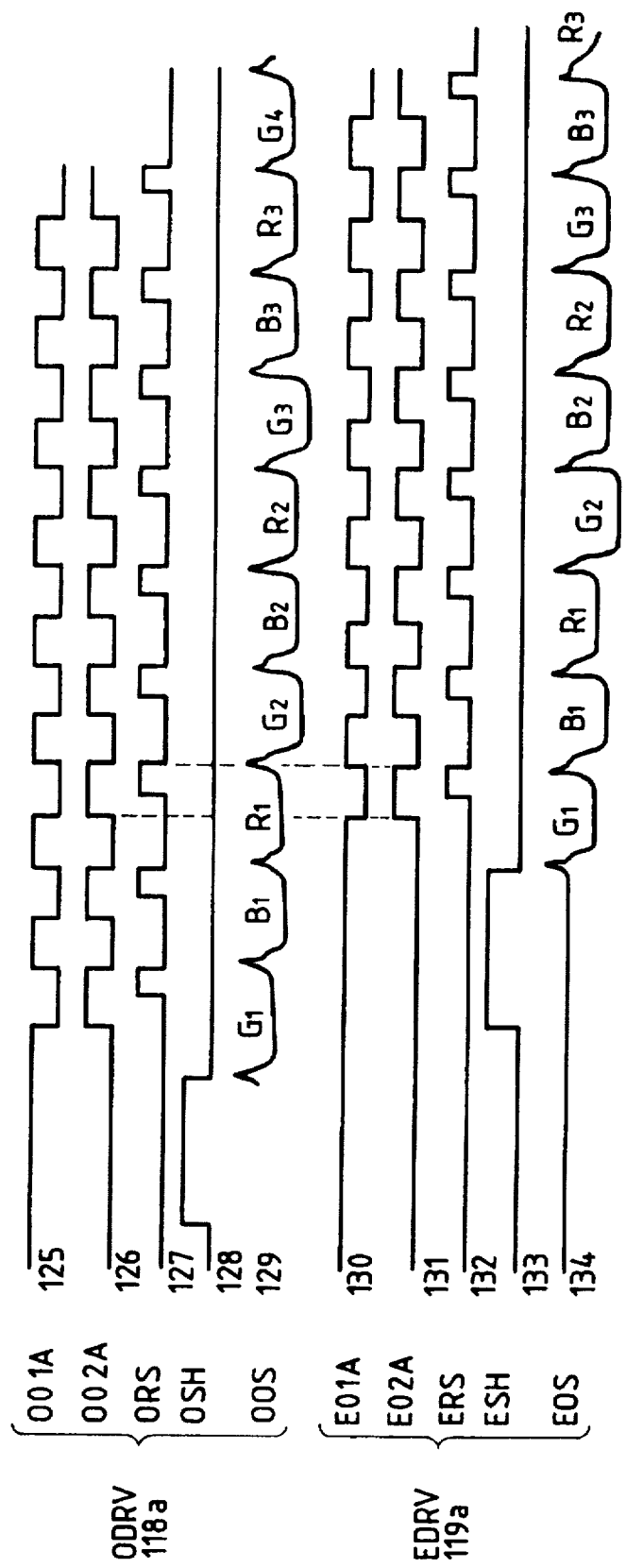
FIG. 39 is a timing chart showing driving pulses of color CCD image sensor 101 as shown in FIG. 38.
Figure 40:
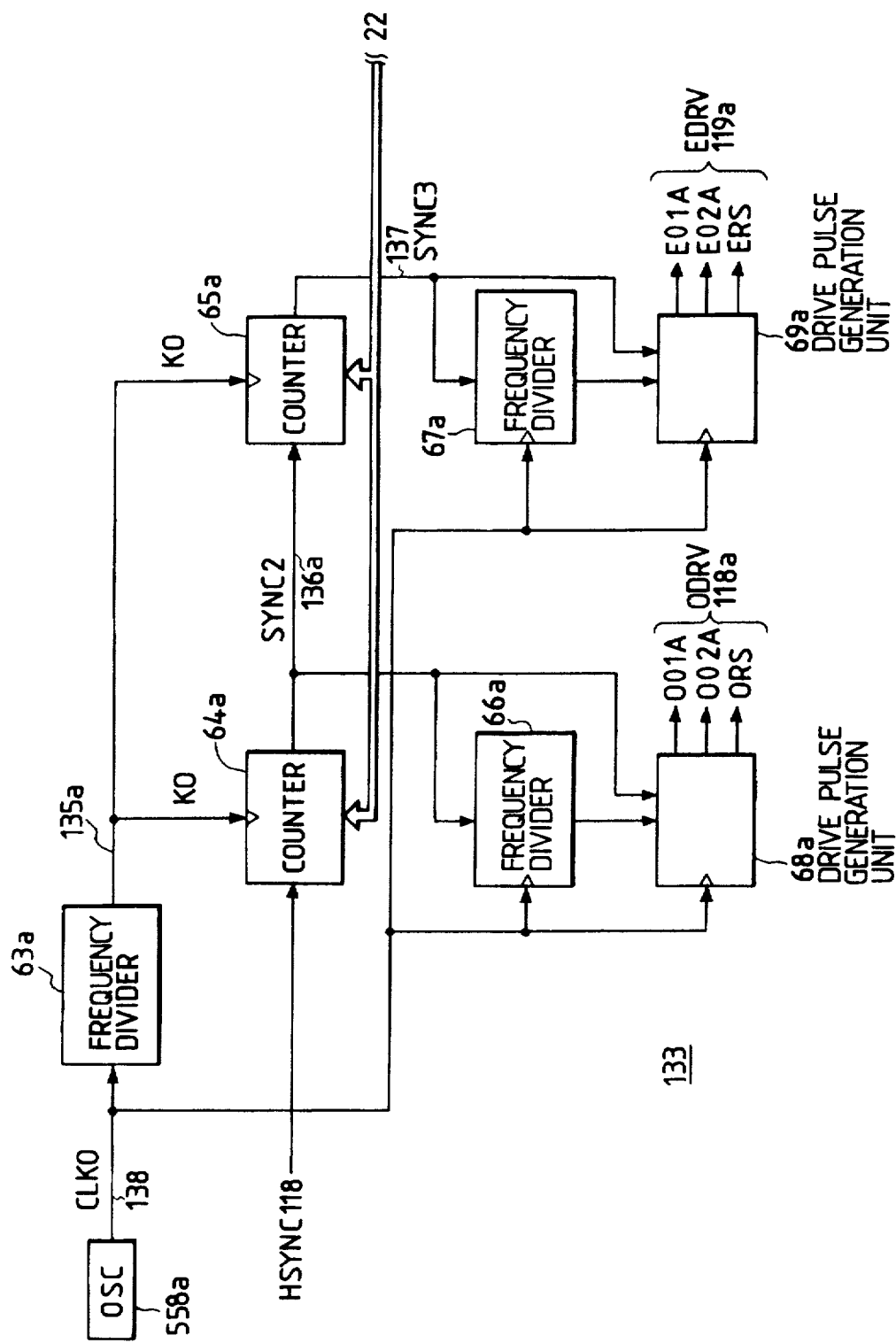
FIG. 40 is a detailed block diagram of CCD driver 133 as shown in FIG. 37.
Figure 41:
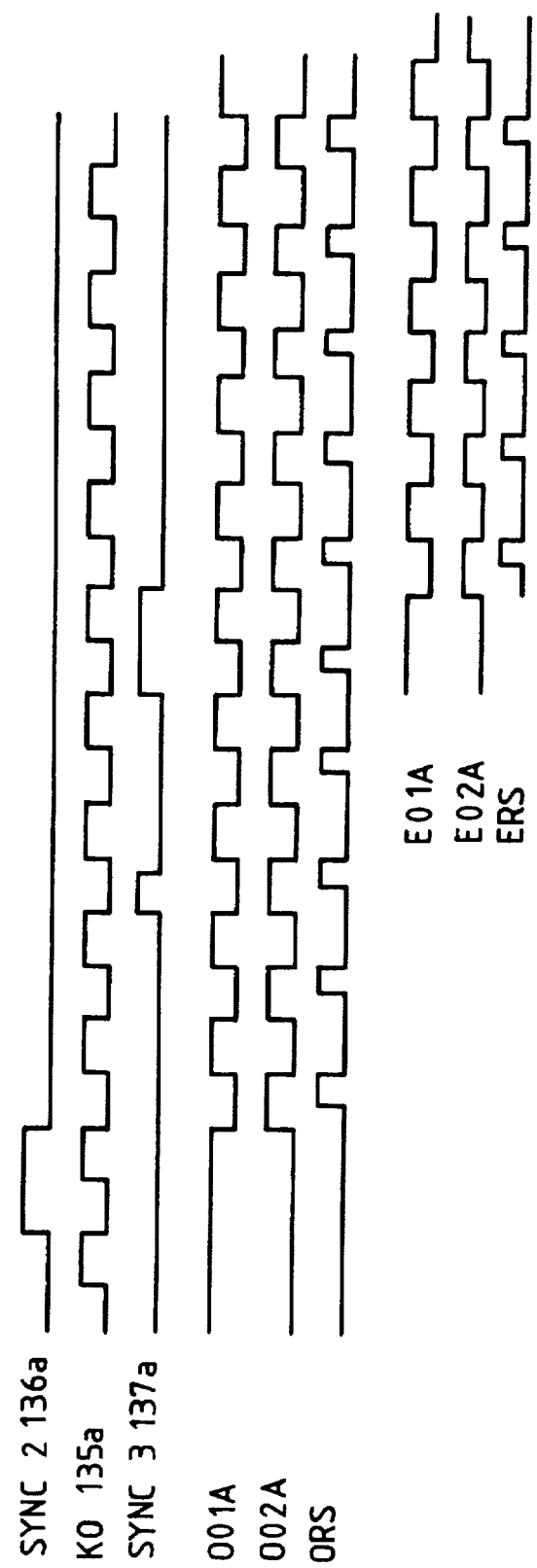
FIG. 41 is a timing chart showing the main signals of CCD driver 133.
Figure 42A:
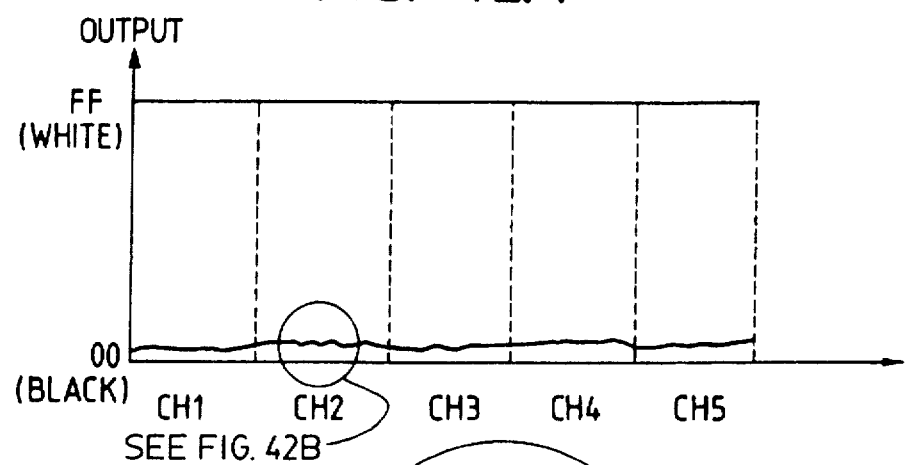
FIG. 42 is a view explaining the operation of black correction circuit 107 as shown in FIG. 37.
Figure 42B:
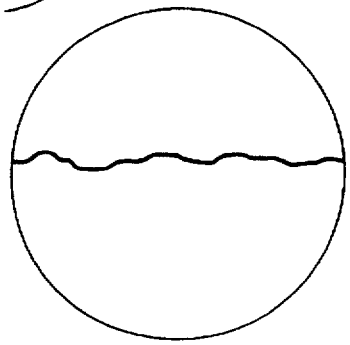
Figure 43:
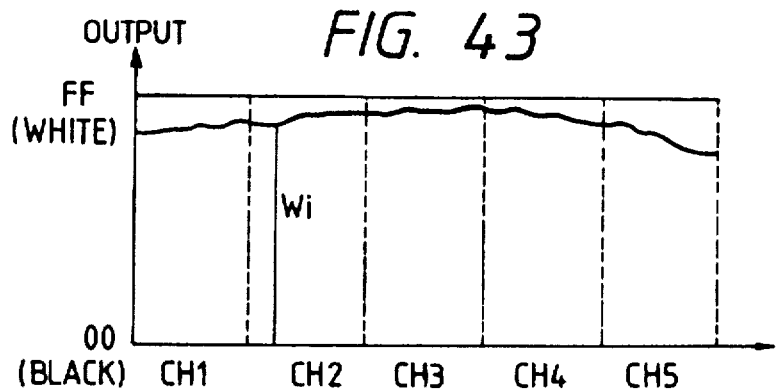
FIG. 43 i a view explaining the operation of white correction circuit 107 as shown in FIG. 37.
Figure 44:
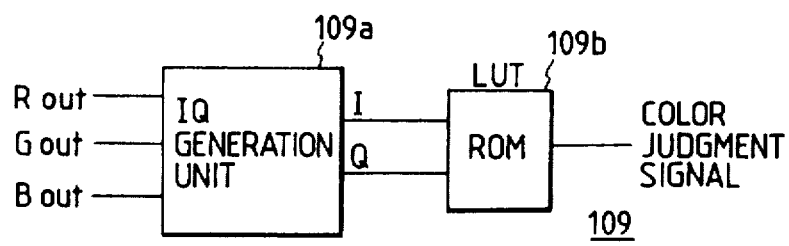
FIG. 44 is a detailed block diagram of color detection circuit 109 as shown in FIG. 37.

Another embodiment will now be described with reference to FIG. 37 to FIG. 47. FIG. 37 is a block diagram of an image processing apparatus of the present embodiment; FIG. 38 shows the detailed construction of a color CCD image sensor 101 of FIG. 37; FIG. 39 is a timing chart showing the drive pulses of the color CCD image sensor of FIG. 37; FIG. 40 is a block diagram showing the detailed construction of a color CCD driver 133 of FIG. 37; FIG. 41 is a timing chart 10 showing the main signals of CCD driver 133 of FIG. 40; FIG. 42 shows the operation of a black correction circuit 107 of FIG. 37; FIG. 43 shows the operation of a white correction circuit 107 of FIG. 37; FIG. 44 is a block diagram showing the detailed construction of a color detection circuit 109 of FIG. 37; FIG. 45 is a block diagram showing the detailed construction of a thin line detection circuit 110 of FIG. 37; FIG. 46 shows the operation of the thin line detection circuit 110 of FIG. 45; and FIG. 47 is a block diagram showing the detailed construction of a fixed value generation circuit 112 of FIG. 37;

First, the detailed construction of the color CCD image sensor 101 will be described with reference to FIG. 38. The sensor 101 is divided into five portions in the main-scan direction, and the pixels of RGB are placed repeatedly in this order. It should be noted that the sensor 101 is provided with 400 dpi, 1024 pixels when for example supposing 63.5 μm as a pixel for one color, i.e., the effective pixels in the total of 3072 (=1024×3 colors).

The five divided chips 58a to 62a are formed on the same ceramic board, where the first, third, fifth chips 58a, 60a, 62a located on line LA and the second, fourth chips 59a, 61a located on line LB are formed with a separation from each other in the subscan direction AL corresponding to four lines, i.e., 254 μm (=63.5 μm×4). In addition, the first, third, fifth chips 58a, 60a, 62a and the second, fourth chips 59a, 61a are driven independently from each other by a pulse group (ODRV) 118a and a pulse group (EDRV) 119a, respectively, as shown in detail in FIG. 39.

Referring to FIG. 39, pulses O01A and O02A, ORS in the drive pulse group (ODRV) 118a for the first, third, fifth chips 58a, 60a, 62a and pulses E01A and E02A, ERS in the drive pulse group (EDRV) 119a for the second, fourth chips 59a, 61a are a charge transfer clock, a charge reset pulse, respectively, of the sensor 101, which are completely synchronized with each other so as not cause a jitter against each other to prevent mutual interference and noise between lines LA, LB. Thus, the pulse group (ODRV) 118a and the drive pulse group (EDRV) 119a are formed by a single reference oscillation source (to be described later).

The detailed construction and operation of the CCD driver 133 as shown in FIG. 37 will now be described with reference to FIG. 40 and FIG. 41. A source clock (CLKO) 138 of a single reference oscillation source (OSC) 558a is divided in its frequency by a frequency divider 63a, and is also applied to frequency dividers 66a, 67a, a drive pulse generation unit 68a for the pulse group (ODRV) 118a, and a drive pulse generation unit 69a for the pulse group (EDRV) 119a. The signal (KO) 135 divided in frequency by the frequency divider 63a is used to generate a reference signal (SYNC2) 136a, a reference signal (SYNC3) 137a for determining the respective generation timing of the above described pulse group (ODRV) 118a and pulse group (EDRV) 119a.

A presettable counter 64a counts the horizontal synchronous signal (HSYNC) 118 using the frequencydivided signal (KO) 135a, and provides a reference signal (SYNC2) 136a. A presetable counter 65a counts the reference signal (SYNC2) 136a using the frequency-divided signal (KO) 135a, and provides a reference signal (SYNC3) 137a. The reference signal (SYNC2) 136a, the reference signal (SYNC3) 137a are respectively determined in their output timings in accordance with the set values of the presetable counters 64a, 65a which are previously set by CPU so as to initialize the frequency dividers 66a, 67a and the drive pulse generation units 68a, 69a.

Accordingly, the drive pulse generation units 68a, 69a are synchronized with the horizontal synchronous signal (HSYNC) 118 and with the source clock (CLKO) 138 of the single reference oscillation source (OSC) 558a. Thus, it is possible to generate a pulse group (ODRV) 118a, the pulse group (EDRV) 119a without a jitter, and irregularities due to interference are not caused among the chips 58a to 62a.

In the image processing apparatus as shown in FIG. 37, the chips 58a to 62a of the color CCD image sensor 101 outputs independent video signals V1 to V5 when driven by the above described pulses, the video signals V1 to V5 being amplified to predetermined voltages V1 to V5 by the amplifier 102 (501-1 to 505-5) provided for each of the channels CH1 to CH5, respectively. Voltages V1, V3, V5 for the line LA are output by timing signal (OOS) 129 as shown in FIG. 39 via a coaxial cable 103, and voltages V2, V4 for the line LB are output by timing signal (EOS) 134 as shown in FIG. 39.

The image signal which has been read in a manner divided into five portions in the main-scan direction is separated into three colors of R, G, B by a sample hold (S/H) circuit 104, the resulted 15 (=5×3) types of signals being digitized for each of the channels CH1 to CH5 by an A/D converter 105 to be input in parallel to an aberration correction circuit 106.

Since, as described in this embodiment, the first, third, fifth chips 58a, 60a, 62a (line LA) and the second, fourth chips 59a, 61a (line LB) are displaced from each other in the sub-scan direction AL by the amount corresponding to four lines, the data of the channels CH1, CH3, CH5 of the line LA and the data of the channels CH2, CH4 of the line LB are deviated from each other. Thus, the aberration correction circuit 106 is provided with a memory corresponding to a plurality of lines, and the data of the channels CH2, CH4 of the line LB which have been read four lines after the channels CH1, CH3, CH5 of the line LA are inserted therein.

Since, in FIG. 37, the black correction circuit and the white correction circuit of the black- correction/white-correction circuit 107 have identical constructions as the circuits of the above described white-correction/black-correction circuit 504, a detailed description thereof will be omitted. However, as shown in FIG. 42, FIG. 43, the data to be used is a synthetic data of the channels CH1 to CH5. Further, since the luminance signal generation circuit 108, graphic pattern generation circuit 111, LOG conversion circuit 115 are identical to the luminance signal generation unit 507, the pattern generation circuit 520, the LOG conversion circuit 524 of the foregoing embodiment, a detailed description thereof will be omitted.

The detailed construction of a color detection circuit 109 of FIG. 37 will now be described with reference to FIG. 44. In the present embodiment, color difference signals I, Q of the NTSC system which are used in TV broadcasting or the like to distinguish colors are used. These color difference signals I, Q may generally be obtained respectively as follows:

$$I=0.60R-0.28G-0.32B$$

$$Q=0.21R-0.52G+0.31B$$

Thus, an IQ generation unit 109a performs a calculation using the above formula by inputting the signals Rout, Gout, Bout which have been corrected by the black-correction/white-correction unit 107. The calculated results I, Q are outputted as read address of ROM 109b used as a look-up table. It should be noted that, "I" signal becomes red as increased in the negative direction and is achromatic in the vicinity of "0" while becomes bluish green as increased in the positive direction. Further, "Q" signal becomes yellow as increased in the negative direction, is achromatic in the vicinity of "0", and becomes purple as increased in the positive direction.

Coded data by which a chromaticity plane represented by the color difference signals I, Q is divided into are previously stored ROM 109b which is used as a LUT, and a code signal corresponding to the color difference signals I, Q is provided to the graphic pattern generation circuit 111 and the fixed value generation circuit 112 as a color judgement signal.

The detailed construction of the thin line detection circuit 111 as shown in FIG. 37 will now be described with reference to FIG. 45 and FIG. 46. It should be noted that, unlike the foregoing embodiment, the thin line detection circuit 111 is constructed to detect a thin line by means of a 5×5 matrix. First, in a similar manner as the foregoing embodiment, a threshold (for example of four pixels) for detecting a thin line is previously set in a register 402 by CPU, and the luminance signal Dout is compared with this threshold by a comparator 401 to be binarized.

The binarized luminance signal is delayed by a delay unit 403 for a predetermined time period and at the same time is delayed by FIFO memories 404 to 407 by the amount corresponding to 1 to 4 lines, respectively. Further, the binarized luminance signal and the signals delayed by FIFO memories 404 to 407 are respectively input to flip-flops 408 to 412. These filp-flops 408 to 412 and a flip-flop group 413 at the subsequent stages are constructed by 5×5 stages. Thus, as shown in FIG. 46, 5×5 binarized signals A to Y are output to an AND gate 414.

Therefore, when at least one "0" exists in the 5×5 binarized signals A to Y, i.e., if at least one bright signal exists, the AND gate 414 outputs a signal "0". When all of the binarized signals A to Y are "1", i.e., if all the pixels are dark, a signal "1" is output.

The output signal of the AND gate 414 is input to a thin line detection matrix circuit 415 having an identical construction as FIFO memories 404 to 407 and a flip-flop group 408 to 413 at the subsequent stage, the signals from the matrix circuit 415 being input to a 5×5-input OR gate 416. Thus, the OR gate 416 provides a signal "1" when at least one "1" exists in the 5×5 output signals of the AND gate 414. Here, if the output signal of the OR gate 416 is "1", it is judged that the pixel data which is inputted first has a dark region having its range wider than a predetermined width and is not a region less than a predetermined width. On the other hand, if the output signal of the OR gate 416 is "0", it is indicated that the dark regions of the input pixel data are all less than a predetermined width.

The output signal of the OR gate 416 and the delayed signal from the delay unit 403 are input to an EX-OR gate 427 for an EXCLUSIVE-OR operation. An AND signal of the output signal of the EX-OR gate 427 and the delayed signal from the delay unit 403 is then provided via the AND gate 418. Therefore, AND gate 418 provides a thin line detection signal "1" when the subject pixel is dark and the binary signal from the comparator 401 is "1" and at the same time when the output signal of OR gate 416 is "0".

The detailed construction of the fixed value generation circuit 112 as shown in FIG. 37 will now be described with reference to FIG. 47. Optional values corresponding to colors are previously set in registers 801 to 80n in a fixed manner by CPU so that a selector 810 selects each fixed value of the registers 801 to 80n in accordance with the color judgment signal from the color detection circuit 109 and outputs it to an input terminal B of a selector 113 as shown in FIG. 37.

Referring to FIG. 37, the selector 113 selects the fixed value signal from the fixed value generation circuit 112 when the thin line detection signal of the thin line detection circuit 110 is "1", or selects a pattern from the graphic pattern generation circuit 111 when the thin line detection signal is "0". Then a selector 114 at the subsequent stage outputs the fixed value signal or pattern signal selected by the selector 113 if HIT signal of the color detection circuit 109 is "1", or outputs the luminance signal Dout from the luminance signal generation circuit 108 if HIT signal is "0". The luminance signal selected by the selector 114 is converted into a density signal by a LOG conversion circuit 115 and will be output to a printer (not shown).

Therefore, in this embodiment, a thin line with its width less than the predetermined value is not made into a pattern but is outputted by varying the density according to each color. A region narrower than a pattern may thus be recognized.

Figure 48:
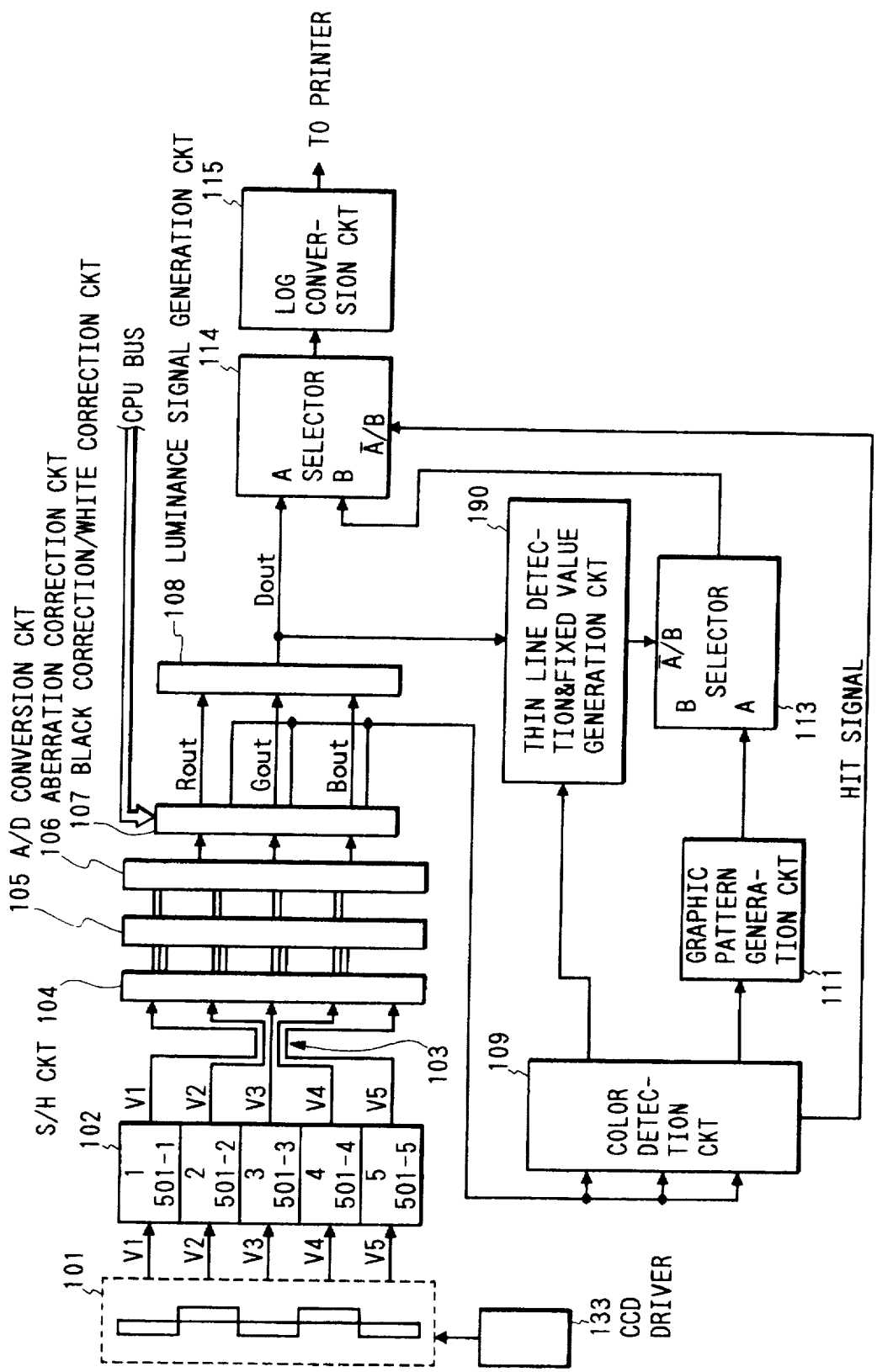
FIG. 48 is a block diagram of an image processing apparatus according to another embodiment of the present invention.
Figure 49:
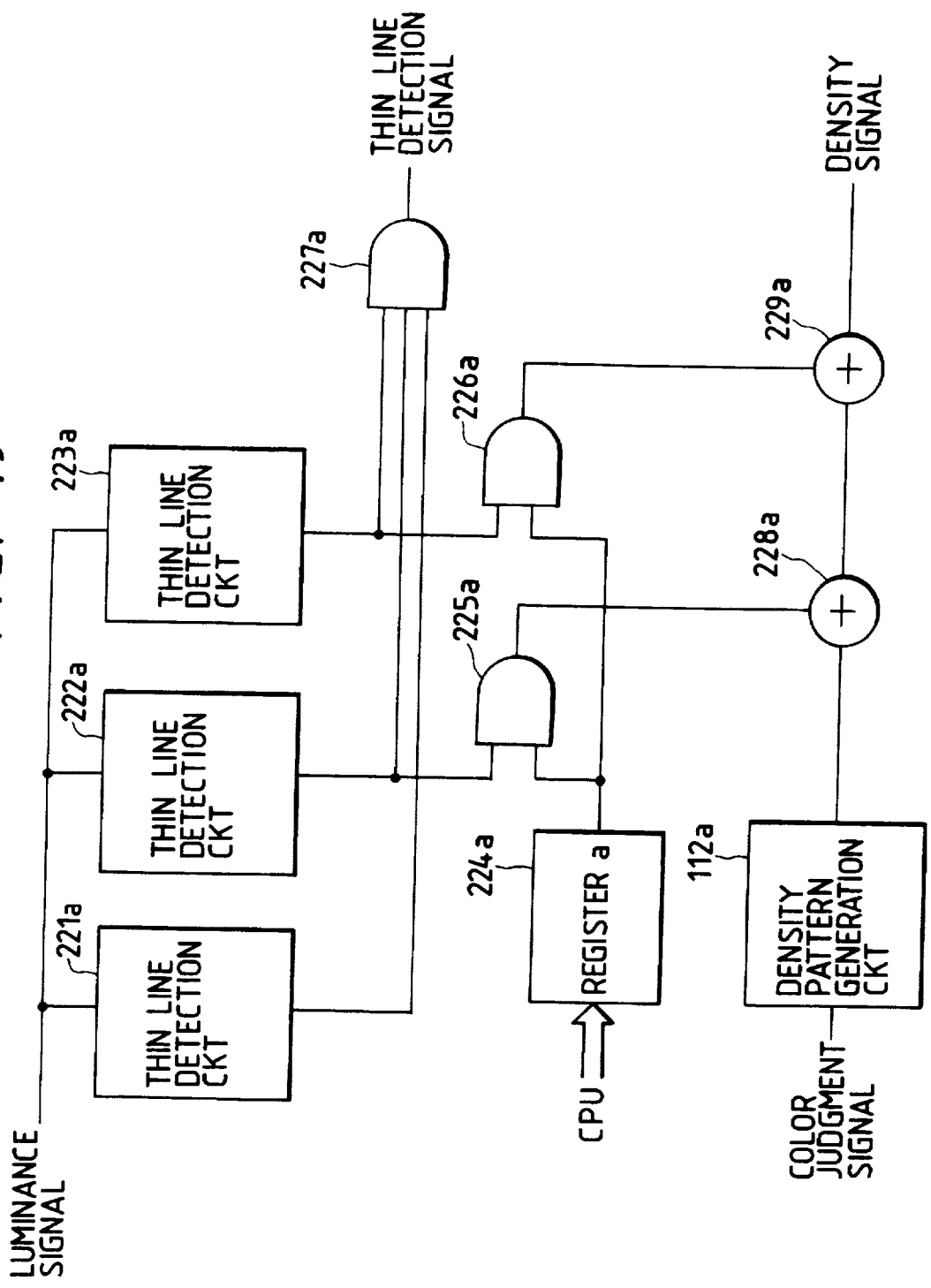
FIG. 49 is a detailed block diagram of a thin line detection and fixed value generation circuit 190 as shown in FIG. 48.

Another embodiment will now be described with reference to FIG. 48 and FIG. 49. FIG. 48 is a block diagram of an image processing apparatus of the present embodiment; and FIG. 49 is a block diagram showing the detailed construction of a thin line detection and fixed value generation circuit 190 as shown in FIG. 48. This embodiment is constructed such that the thin line detection circuit 110 and the fixed value generation circuit 112 in the foregoing embodiment are replaced by the thin line detection and fixed value generation circuit 190 which is shown in detail in FIG. 49 so that a thin line of a width less than a predetermined value will be changed in density according to its line width. Since the construction of the other components is identical, they are denoted by identical reference numerals and the description thereof will be omitted.

Referring to FIG. 49, although each of the thin line detection circuits 221a, 222a, 223a has a substantially identical structure as the thin line detection circuit 110 of the foregoing embodiment, they are different from each other in the detection width for a thin line, i.e., in their matrix size as shown in FIG. 46. This embodiment is designed such that: the thin line detection circuit 221a detects a relatively thicker thin line; the thin line detection circuit 222a detects a thin line of a medium degree; and the thin line detection circuit 223a detects a relatively thinner thin line. Thus, the thin line detection circuit 221a has a largest matrix size.

An optional value Δx corresponding to each color is previously set in a register 224 in a fixed manner 10 by CPU as in the foregoing embodiment. Further, a density pattern generation circuit 112a is designed to generate a sparse density pattern for a relatively thicker thin line on the basis of the color judgment from the color detection circuit 109.

The respective thin detection signals of the thin line detection circuits 221a, 222a, 223a are input to a 3-input AND gate 227a. Thus, AND gate 227a outputs a thin line detection signal "1" to an input terminal B of a selector 113 when all of the thin line detection circuits 221a, 222a, 223a have detected respective thin lines. Further, when the thin line detection circuit 222a has detected a thin line of the medium degree, the fixed value Δx in the register 223a is applied to an adder 228a via an AND gate 225a so that the fixed value Δx is added to a sparse density pattern from the density pattern generation circuit 112a. Furthermore, when the thin line detection circuit 223a has detected a relatively thinner thin line, the fixed value Δx in the register 224a is applied to an adder 229a via an AND gate 226a so that the fixed value Δx is added to the density pattern from the adder 228a.

According to this embodiment, therefore, the density may be changed in accordance with the judged color, and at the same time a change in density is possible in accordance with the width of a thin line. A region narrower than a pattern may thus easily be identified.

While the present embodiment has been described by taking a copying machine having a color reader as an example, it is applicable to a computer output printer, a video printer or the like. It is also applicable as an output unit not only to a printer such as an electrophotographic printer, an ink-jet printer or the like but also to an monochrome monitor such as of CRT, liquid crystal or the like.

Figure 51:
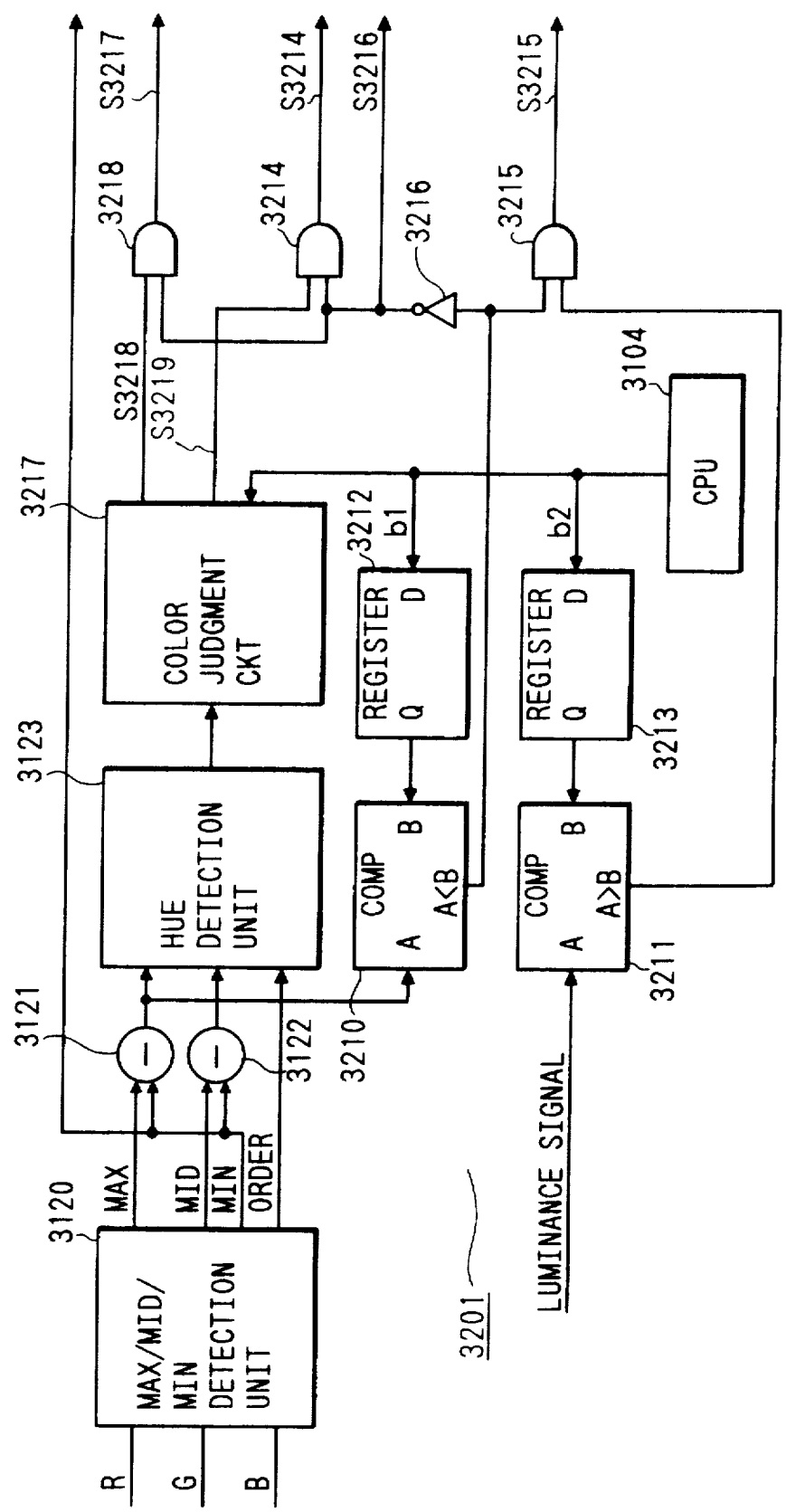
FIG. 51 is a block diagram of color judgement unit 3201 as shown in FIG. 50.

Another embodiment will now be described. FIG. 51 shows a portion corresponding to the image processing unit 500 as shown in FIG. 5.

Figure 50:
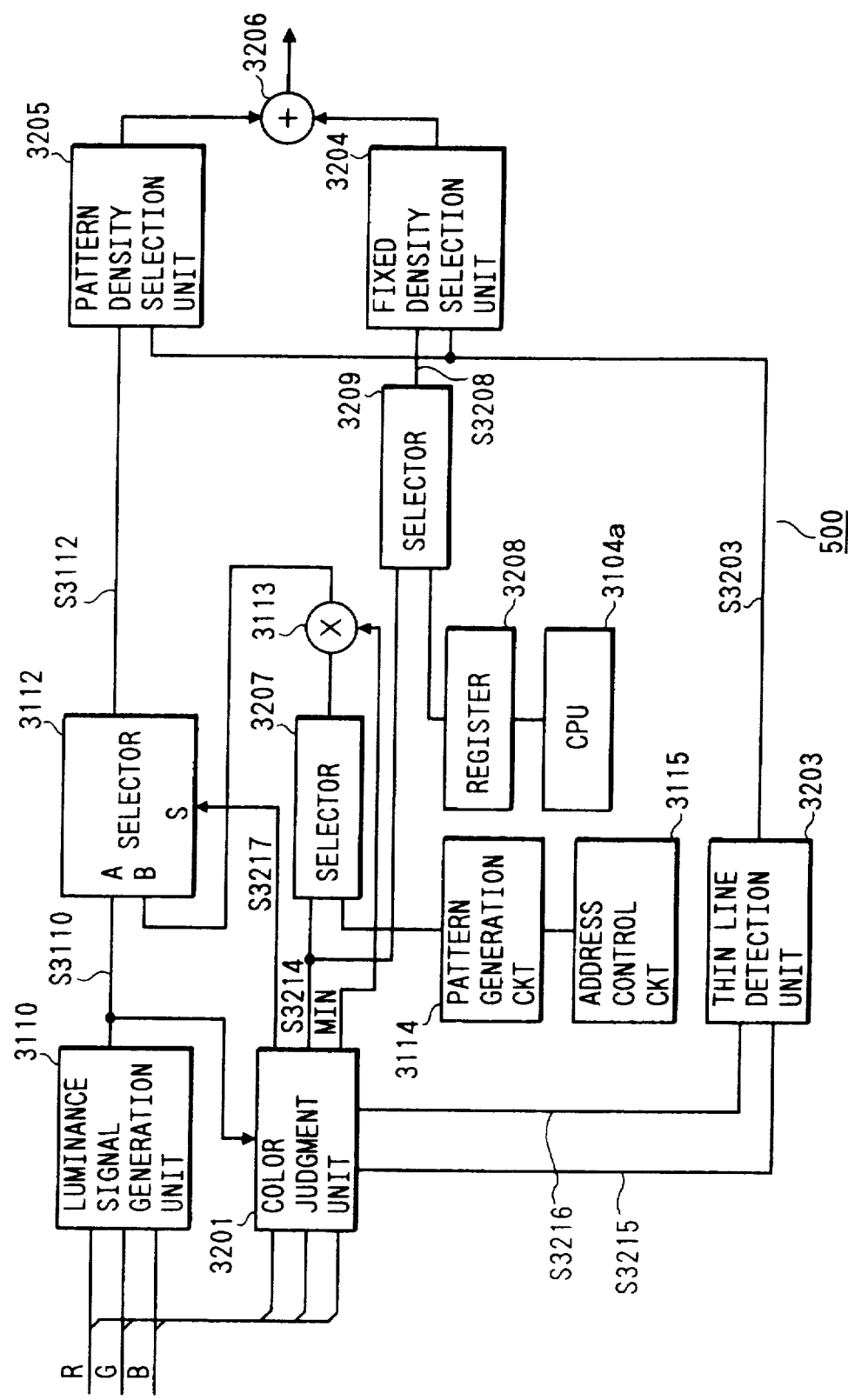
FIG. 50 is a block diagram of the image processing section of an image processing apparatus according to another embodiment of the present invention.

In FIG. 50, a luminance signal generation unit 3110 is identical to the ND signal generation unit 507 as shown in FIG. 507; an address control circuit 3115 is identical to the address control unit 510; and a pattern generation circuit 3114 is identical to the pattern generation unit 511. Further, in parallel with the luminance signal generation unit 3110, a color judgment unit 3201 for judging color is connected. In addition, on the output side of the color judgment unit 3201, a fixed density selection unit 3204 and a pattern density selection unit 3205 are connected, and the output sides of the fixed density selection unit 3204 and the pattern density selection unit 3205 are connected to an adder 3206. Furthermore, it is designed so that a luminance signal S3110 provided from the luminance signal generation unit 3110 is supplied to the color judgment unit 3201.

Further, the output of the pattern generation circuit 3114 and the output of the color judgment unit 3201 are connected to selectors 3207, 3209, and the output side of the selector 3207 is connected to a multiplier 3113. A graphic pattern output unit is constructed by the luminance signal generation unit 3110, a selector 3112, the multiplier 3113, the pattern generation circuit 3114, the address control circuit 115, and the selector 3207. Moreover, to the input side of the fixed density selection unit 3204, a CPU 3104a is connected via the selector 3209 and the register 3208, and the selector 3112 is connected to the input side of the pattern density selection unit 3205.

FIG. 51 is a block diagram showing the detail of the color judgment unit 3201 as shown in FIG. 50. Referring to FIG. 51, the color judgment unit 3201 is provided with a max/mid/min detection unit 3120, subtracters 3121, 3122, and a hue detection unit 3123 which are identical to the max/mid/min detection unit 201, the subtracters 202, 203, and the hue detection unit 204 as shown in FIG. 6, and in addition has comparators 3210, 3211, registers 3212, 3213, AND gates 3214, 3215, AND gate 3218, color judgment circuit 3217, and an inverter 3216. Further, it is designed so that the luminance signal S3110 which is the output of the luminance signal generation unit 3110 as shown in FIG. 50 is supplied to the comparator 3211.

Figure 55:
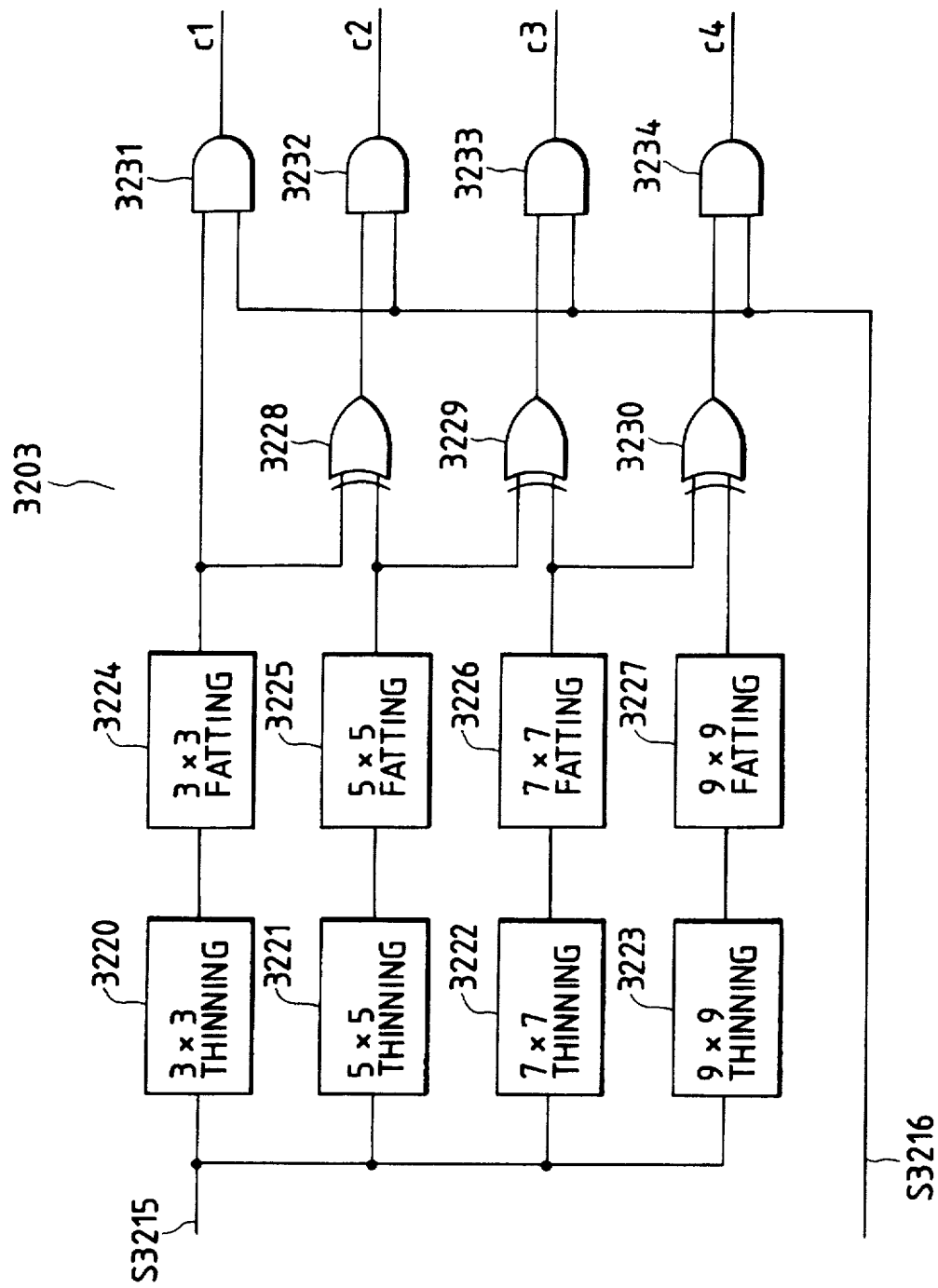
FIG. 55 is a block diagram of thin line detection unit 3203 as shown in FIG. 50.

FIG. 55 is a block diagram showing the detail of the thin line detection unit 3203 as shown in FIG. 50.

Figure 56:
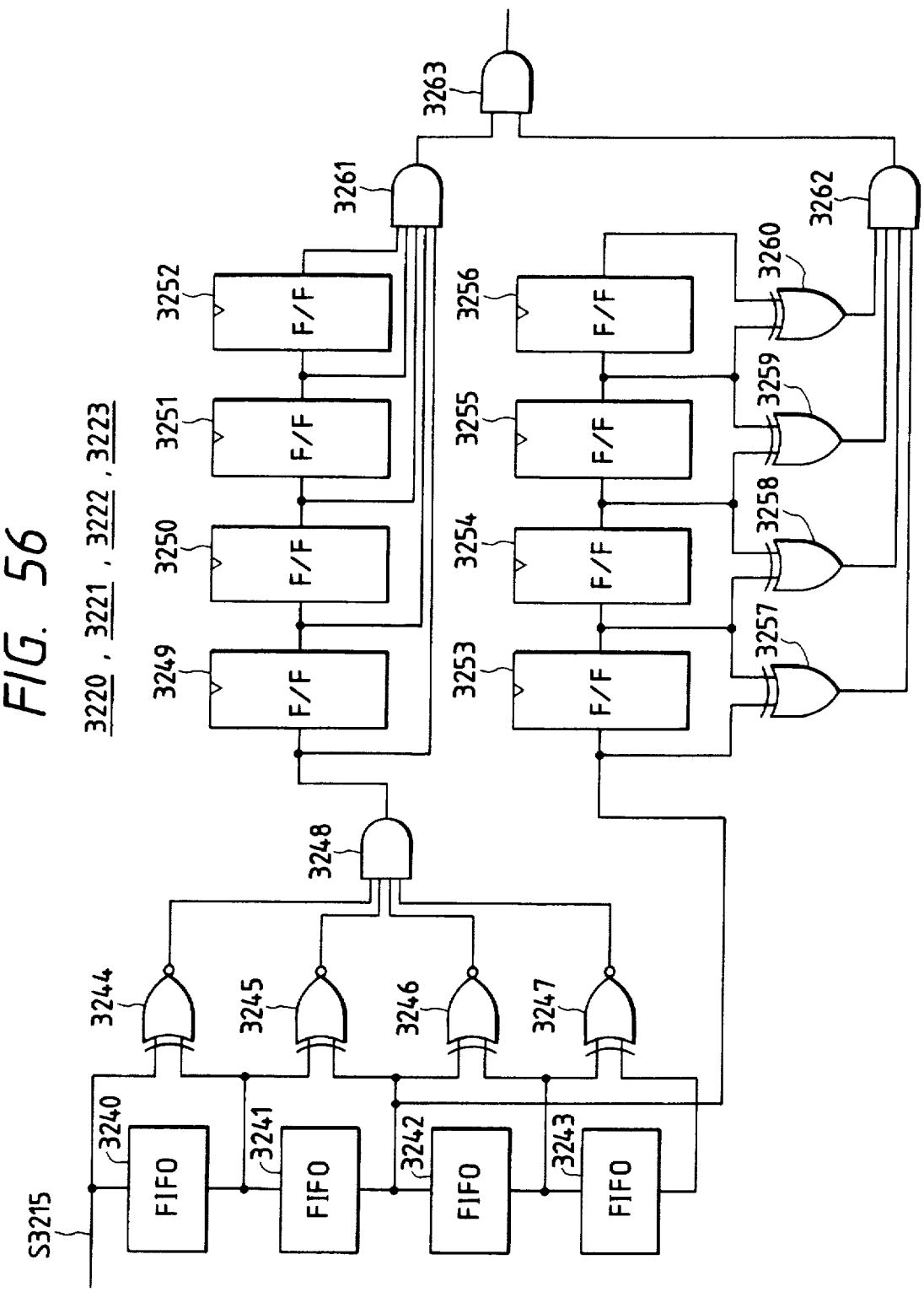
FIG. 56 is a block diagram of thinning circuit as shown in FIG. 55.
Figure 57:
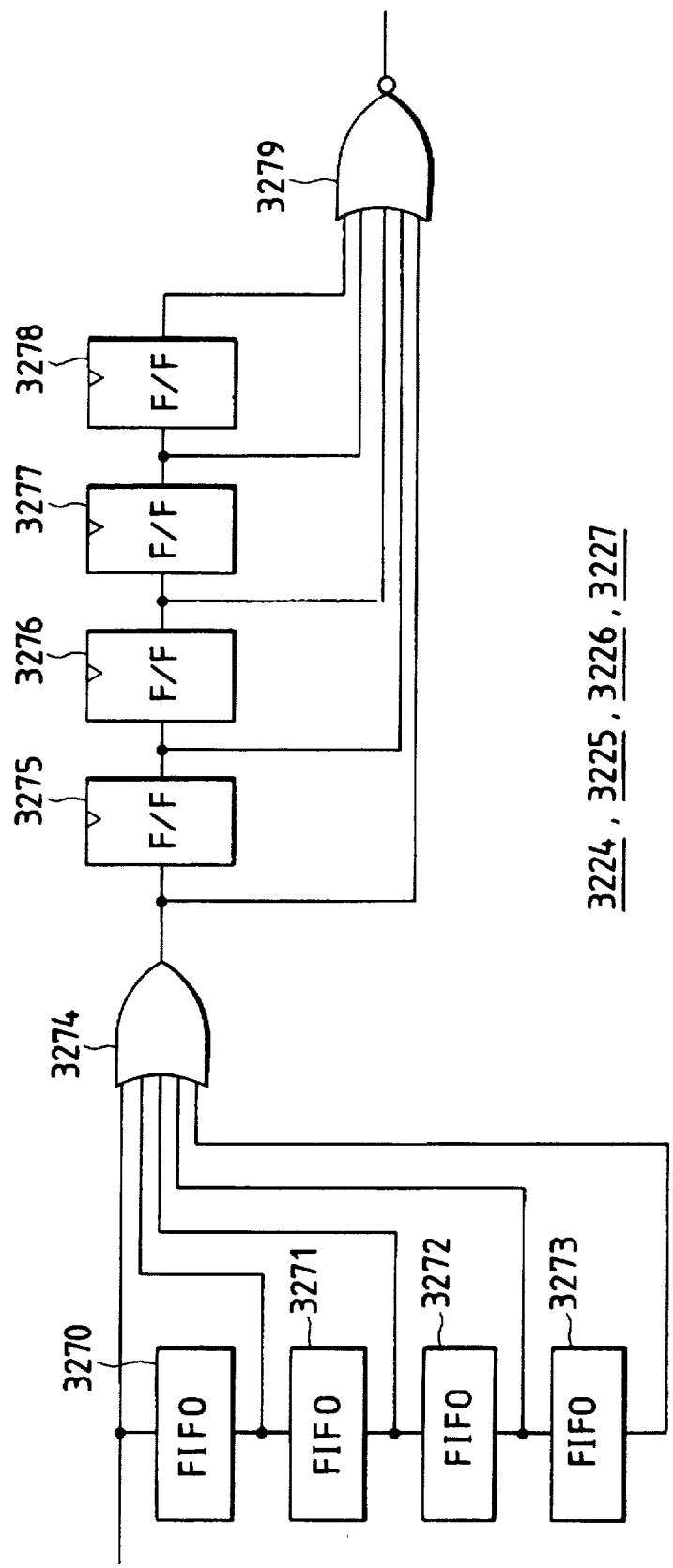
FIG. 57 is a block diagram of fatting circuit as shown in FIG. 55.

That is, it takes in the outputs of AND gate 3215 and the inverter 3216 as shown in FIG. 51 and comprises a 3×3 thinning circuit 3220, a 5×5 thinning circuit 3221, a 7×7 thinning circuit 3222, a 9×9 thinning circuit 3223, a 3×3 fatting circuit 3224, a 5×5 fatting circuit 3225, a 7×7 fatting circuit 3226, a 9×9 fatting circuit 3227, EXCLUSIVE-OR circuits (hereinafter referred to as XOR gates) 3228 to 3230, and AND gates 3231 to 3234. Of these components, as shown in FIG. 56, the thinning circuits 3220 to 3223 take in white signal S3215 which is the output of AND gate 3215 as shown in FIG. 51 and are provided with FIFO memories 3240 to 3243, XAND gates 3244 to 3247, an AND gate 3248, flip-flops 3249 to 3256, XOR gates 3247 to 3260, and AND gates 3261 to 3263. Further, as shown in FIG. 57, the fatting circuits 3224 to 3227 comprise FIFO memories 3270 to 3273, an OR gate 3274, flip-flops 3275 to 3278, and a NOR gate 79.

Figure 58:
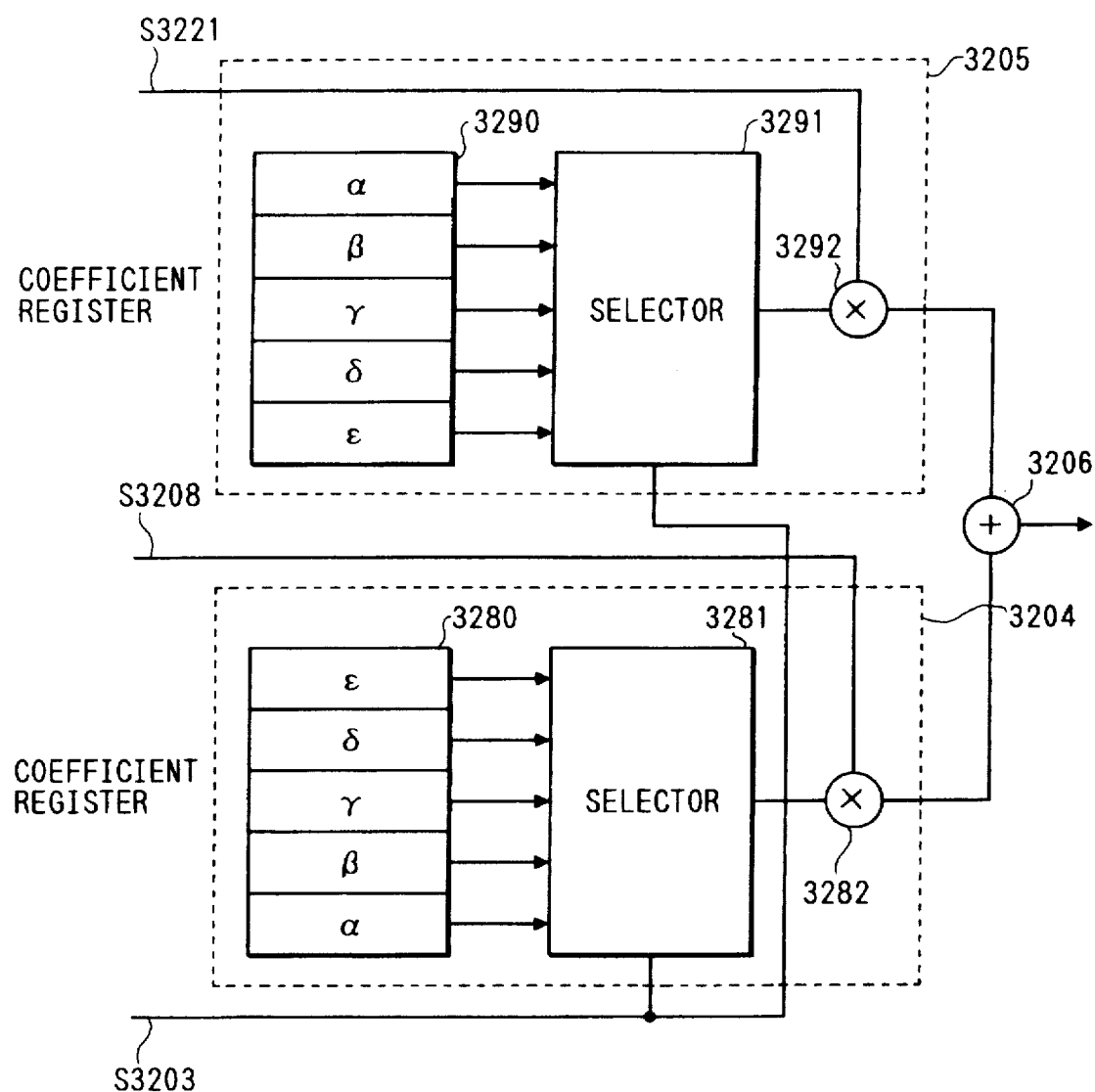
FIG. 58 is a block diagram of fixed density selection unit 3204 and pattern density selection unit 3205 as shown in FIG. 50.

FIG. 58 shows the construction of the fixed density selection unit 3204 and the pattern density selection unit 3205.

Referring to FIG. 58, the fixed density selection unit 3204 takes in a fixed density signal S3208 which is the output of the selector 3209 as shown FIG. 50 and a coefficient selection signal S3203 which is the output of the thin line detection unit 3203, and it comprises a coefficient register 3280, a selector 81, and a multiplier 3282. The pattern density selection unit 3205 takes in a graphic pattern signal S3112 which is the output of the selector 3112 and the above described coefficient selection signal S3203, and it comprises a coefficient register 3290, a selector 3291, and a multiplier 3292.

The operation of an image processing apparatus constructed in the above manner will now be described especially with reference to the operation of the data processing unit thereof.

As can be seen from FIG. 5, each 8-bit data of R, G, B provided from the A/D converter is supplied to the luminance signal generation circuit 3110 and the color judgment unit 3201 as shown in FIG. 50. In the luminance signal generation unit 3110, a luminance signal S3110 which is an image not color-separated and extending over the entire wavelength regions, i.e., a black-and-white image is generated from a picture image which has been read by the color CCD image sensor 34 and separated into colors. This is because the printer 2 of the present embodiment only performs monochromatic printing.

Further, the color judgment unit 3201 judges predetermined color components (chromatic color/achromatic color, white/other colors) on the original to perform image processing in the present embodiment. The color judgment unit 3201 uses a hue signal for the color detection processing. The reason for this is to render an accurate judgment even when chroma and luminosity in the same color are different. It should be noted that chromatic color/achromatic color, and white is detected by using the fact that chroma is lower as the values (max-min) of R, G, B of the input data are smaller and that luminosity is higher as the level of the luminance signal S3110 ((R,G,B)/3) is increased.

Color detection processing in the color judgment unit 3201 of the present embodiment is performed as follows.

Each of the data of R, G, B which are input from the A/D converter 503 is an 8-bit data, and information on a total of 224 colors is provided. Since, because of its size, it becomes expensive, this is taken into account in the present embodiment and the following hue processing is performed by using the above described hue.

Each data of R, G, B to be input is input to the max/mid/min detection unit 120 as shown in FIG. 51, and max value, mid value, min value, and an order signal are outputted. Further, in the present embodiment, when converting the data of R, G, B into two dimensional data, by using the fact that the common portion of R, G, B, i.e., min (R,G,B) which is the minimum value of R, G, B is achromatic color component, min (R,G,B) is subtracted from each of the R, G, B data and the remaining information is used as the chromatic color component. In this way, conversion into a two dimensional color space may be achieved by a simple construction.

For such conversion processing, in the present embodiment, min value which is the minimum value is subtracted from max value and mid value, and the result is input to the hue detection unit 3123 together with an order signal. The hue detection unit 3123 is preferably constituted by a memory element such as RAM or ROM or the like which is capable of random access. In the present embodiment, it is constructed by a look-up table using ROM.

Values corresponding to the angles on the plane indicated by FIG. 7 are previously stored in the hue detection unit 3123, and a corresponding hue value is provided based on the input order signal, (max-min) value and (mid-min) value. Thus, the inputted three dimensional color space is converted into a two dimensional color space to obtain a corresponding hue by using a simple construction where a look-up table or the like is used on the basis of the order of magnitude of the inputted R, G, B, and the maximum value and the middle value of the inputted R, G, B.

Figure 52:
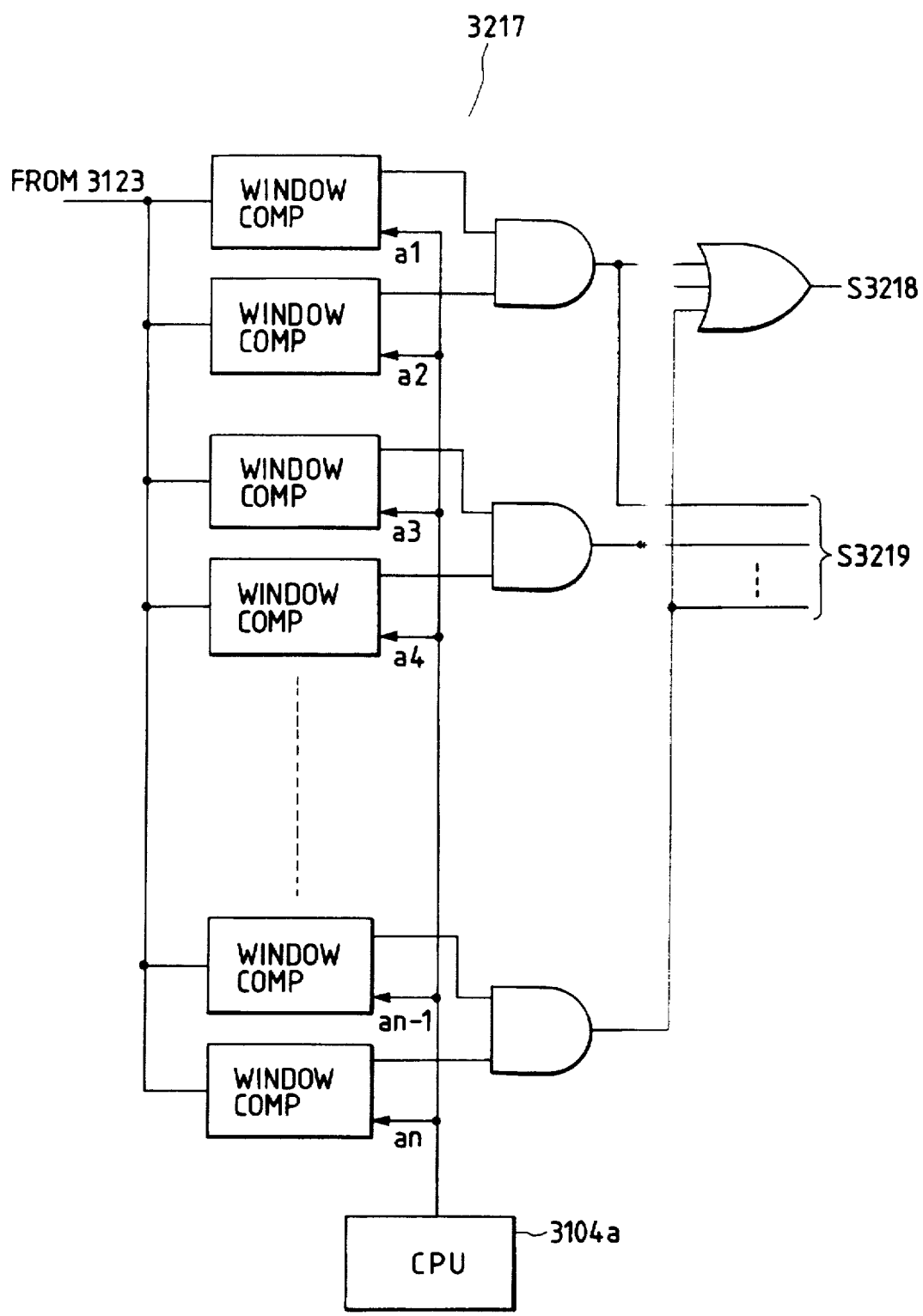
FIG. 52 is a circuit diagram of color judgement circuit 3217 as shown in FIG. 51.

The hue value thus outputted is input to the color judgment circuit 3217. As shown in FIG. 52, the color judgment circuit 3217 is constituted by n window comparators, and "1" is provided from an AND gate n/2 when the window comparators are (an-1)<(input hue value)<(an). Further, the output of AND gates 1 to n/2 is input to OR gate (FIG. 52). If any of the AND gates outputs "1", the OR gate will also output "1".

Figure 53:
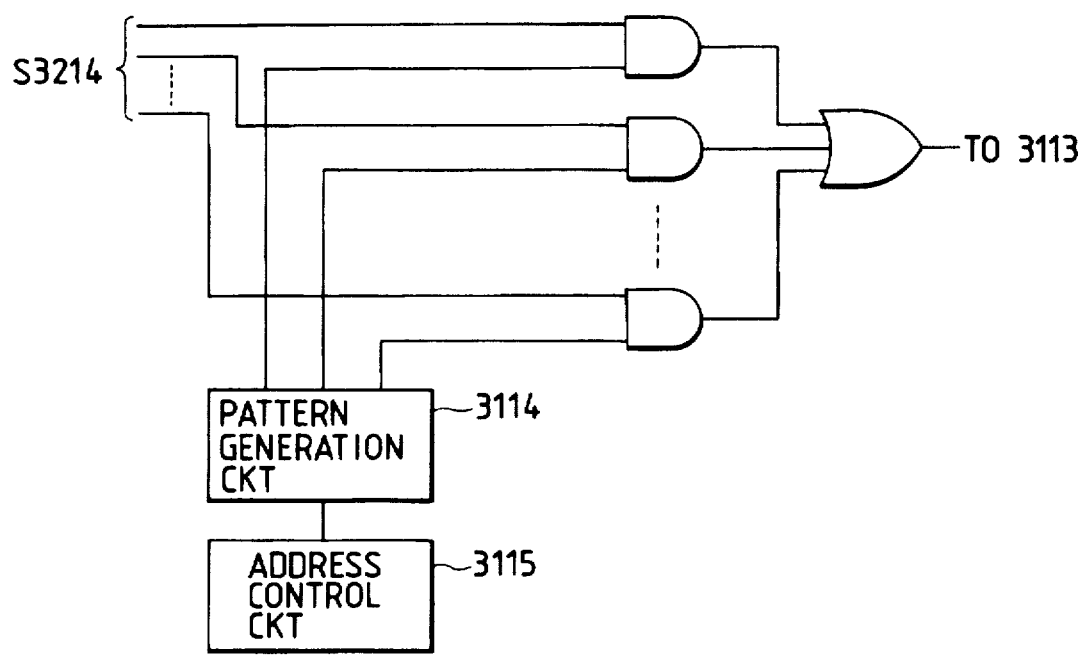
FIG. 53 is a circuit diagram of pattern generation circuit 3114, address control circuit 3115 and others as shown in FIG. 50.

The (max-min) value from the subtracter 3121 as shown in FIG. 51 is input to the comparator 3210. It is compared at the comparator 3210 with a reference value b1 which has been set in the register 3212 by CPU 3104. The comparator 3210 provides "1" when ((max-min) value)< (b1) . That is, "1" is provided when achromatic color is detected. Accordingly, the AND gate 3214 outputs the select signal S3214 indicated by "1" to the selector 3112 as shown in FIG. 50 when chromatic and specific detected color. The inverter 3216 as shown in FIG. 50 outputs chromatic color signal S3216 indicated by "1" to the thin line detection unit 3203 as shown in FIG. 50 when chromatic color is detected. Further, if the color judgment signal S3214 from the color judgment circuit 3217 is judged as chromatic at the AND gate 3214, the color judgment signal S3214 is output to the selectors 3207, 3209 as shown in FIG. 50. When the color judgment signal S3214 is inputted to the selector 3207, a pattern generated in the pattern generation circuit 3114 is selected. FIG. 53 shows the detail of the selector 3207, the pattern generation circuit 3114, and the address control circuit 3115.

Figure 54:
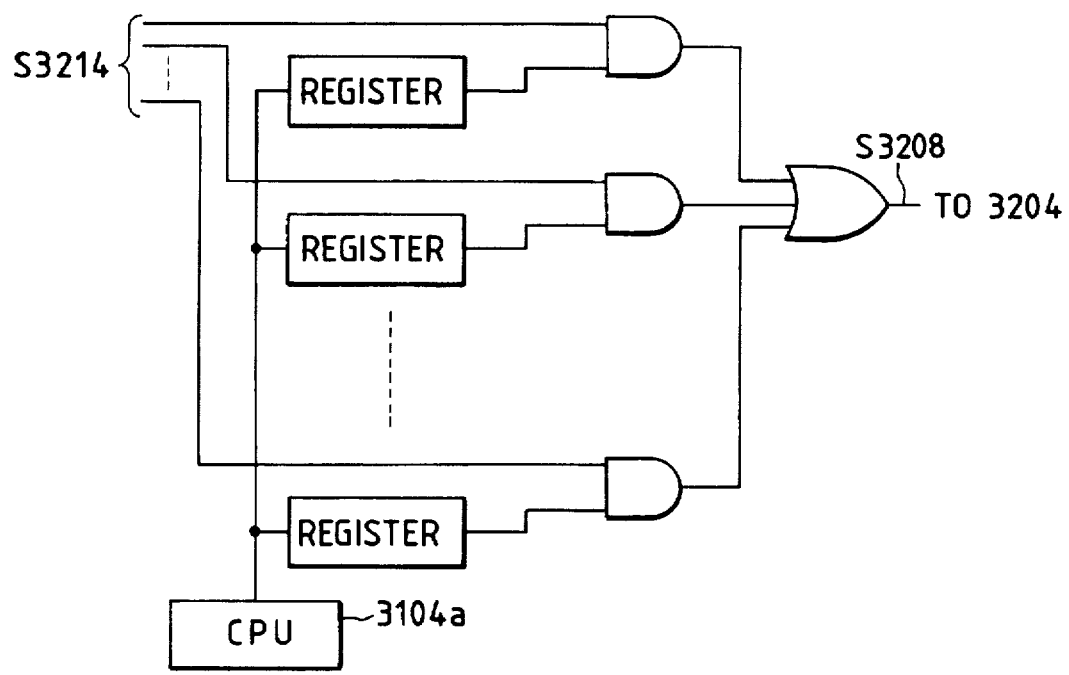
FIG. 54 is a circuit diagram of selector 3209, register 3208 and others as shown in FIG. 50.

Each of the different patterns generated in the pattern generation circuit 3114 is selected by the signal S3214 at an AND gate and is outputted via an OR gate. On the other hand, the color judgment signal S3214 is input to the selector 3209. The detailed construction of the selector 3209 and the register 3208, and CPU 3103 are shown in FIG. 54. A respective value is set in each register by CPU 3104 and is selected at an AND gate by the signal S3214 to be outputted via an OR gate.

On the other hand, the comparator 3211 takes in the luminance signal S3110 (=(R,G,B)/3) from the luminance signal generation unit 3110 and compares it with the reference value b2 which has been set in the register 3213. A "1" is outputted when the luminance signal S3110>b2. As a result, the AND gate 3215 at the subsequent stage will provide the white color signal S3215 indicated by "1" to the thin line detection unit 3203 when it is achromatic and its luminosity is higher than the set level, i.e., it is judged as white.

Next, the thin line detection processing of the thin line detection unit 3203 will be described.

The thin line detection unit 3203 receives the white color signal S3215 from the color judgment unit 3201 and chromatic color signal S3216. The width of a thin line is detected by the thinning circuits 3220 to 3223 and the fatting circuit 3224 to 3227 respectively having different mask sizes as shown in FIG. 55 around the subject pixel. Here, a description will be given by taking 5×5 thinning circuit 3221 and fatting circuit 3225 as an example.

The 5×5 thinning circuit 3221 judges if all of the pixels within the 5×5 mask are identical. An input white color signal ("1" when the pixel is white or "0" for the other cases) S3215 is delayed in the sub-scan direction by the amount corresponding to one line to four lines by FIFO memories 3240 to 3243 as shown in FIG. 56, and is input to an AND gate 3248 via XAND gates 3244 to 3247. The output signal of AND gate 3248 is delayed by each pixel in the main-scan direction by flip-flops 3249 to 3252 and is supplied to AND gate 3161. Also, the signal delayed by two lines in the sub-scan direction by the FIFO memories 3240, 3241 is further delayed by each pixel in the main-scan direction by flip-flops 3253 to 3256 and is input to AND gate 3262 via XOR gates 3257 to 3260.

Accordingly, the output signal of AND gate 3263 will output "1" when all the signals within the 5×5 mask are identical, while it will output "0" when a boundary between white and another portion exists within the 5×5 mask.

The output signal from AND gate 3263 in the thinning circuit 3221 is delayed in the sub-scan direction by the amount corresponding to one line to four lines by FIFO memories 3270 to 3273 of the fatting circuit 3225 and is inputted to OR gate 3274. The output of OR gate 3274 is delayed by each pixel in the main-scan direction by flip-flops 3275 to 3278 and is inputted to NOR gate 3279. That is, NOR gate 3279 will output "0" when at least one "1" exists within the 5×5 mask. Here, if the output signal from NOR gate 3279 is "0", the pixel data inputted at first is judged to be an area with width equal to or more than five pixels. Further, when the output from NOR gate 3279 is "1", the area of the image data is judged to be an area smaller than 5-pixel width.

Referring to FIG. 55, if for example the 3×3 fatting circuit 3224 outputs "1" and chromatic color signal S3216 is "1", AND gate 3231 will output "1". Thus, the area of the input picture image is judged to be of chromatic and less than 3-pixel width. Further, if the 3×3 fatting circuit 3224 outputs "0" while the 5×5 fatting circuit 3225 outputs "1", XOR gate 3228 will output "1". In this case, the area of the inputted pixel is judged to be equal to or more than 3-pixel width and less than 5-pixel width. Furthermore, when XOR gate 3228 outputs "1" and the chromatic color signal S3216 outputs "1", AND gate 3232 will output "1".

In a similar manner, the outputs of the fatting circuits 3225 to 3227 are supplied to XOR gates 3229, 3230. Furthermore, the line width of the inputted pixel is judged by AND gates 3233, 3234 and chromatic color signal S3216, the judged results being shown in FIG. 59.

As described above, a thin line detection processing is performed in the thin line detection circuit 3203, and the output of which will be supplied as a coefficient selection signal S3203 to the pattern density selection unit 3205 and the fixed density selection unit 3204 as shown in FIG. 50. On the other hand, the value of fixed density for each color for example consisting of eight bits which is set in the register 3208 by CPU 3104 is supplied to the fixed density selection unit 3204, while the graphic pattern signal S3203 of the selector 3112 is supplied to the pattern density selection unit 3205.

Density selection processing in the pattern density selection unit 3205 and the fixed density selection unit 3204 is performed as follows.

Figure 65A:
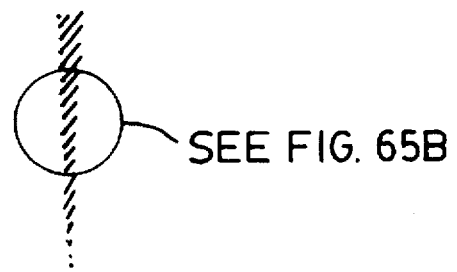
FIG. 65 is a view illustrating an output image.
Figure 65B:
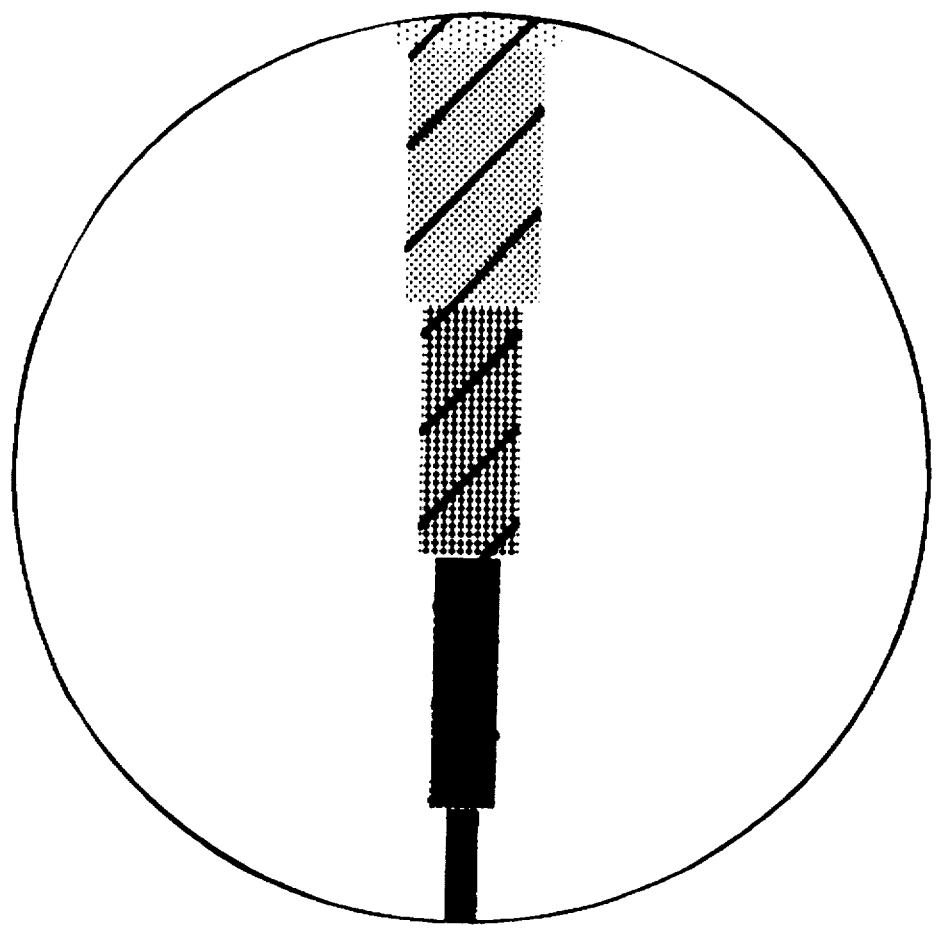

A coefficient selection signal S3203 from the thin line detection unit 3203 is supplied to selectors 3281, 3191 in FIG. 58, and the values set in coefficient registers 3280, 3290 are selected by CPU 3104. Such set values are shown in FIG. 60. The output of the selector 3291 is supplied to a multiplier 3292 and is multiplied with a graphic pattern signal S3112 from the selector 3112 as shown in FIG. 50. In a similar manner, the output of the selector 3281 is supplied to a multiplier 3282 and is multiplied with a fixed density signal S3208 which is the output of the selector 3209 as shown in FIG. 50. Further, the outputs of the multipliers 3282, 3292 are added together at an adder 3206 and is output to the side of a printer 3103. Patterned picture image as shown in FIG. 65 is thus obtained.

As described above, in the present embodiment, in accordance with the line-width of color area, an output is made by a fixed density set for each color when the line width is thin, and the ratio of the fixed density is caused to be less as the line-width becomes larger so as to increase the density ratio of pattern. A thin line may thus be easily identified because it is outputted such that the ratio of fixed density set for each color is high.

Figure 61:
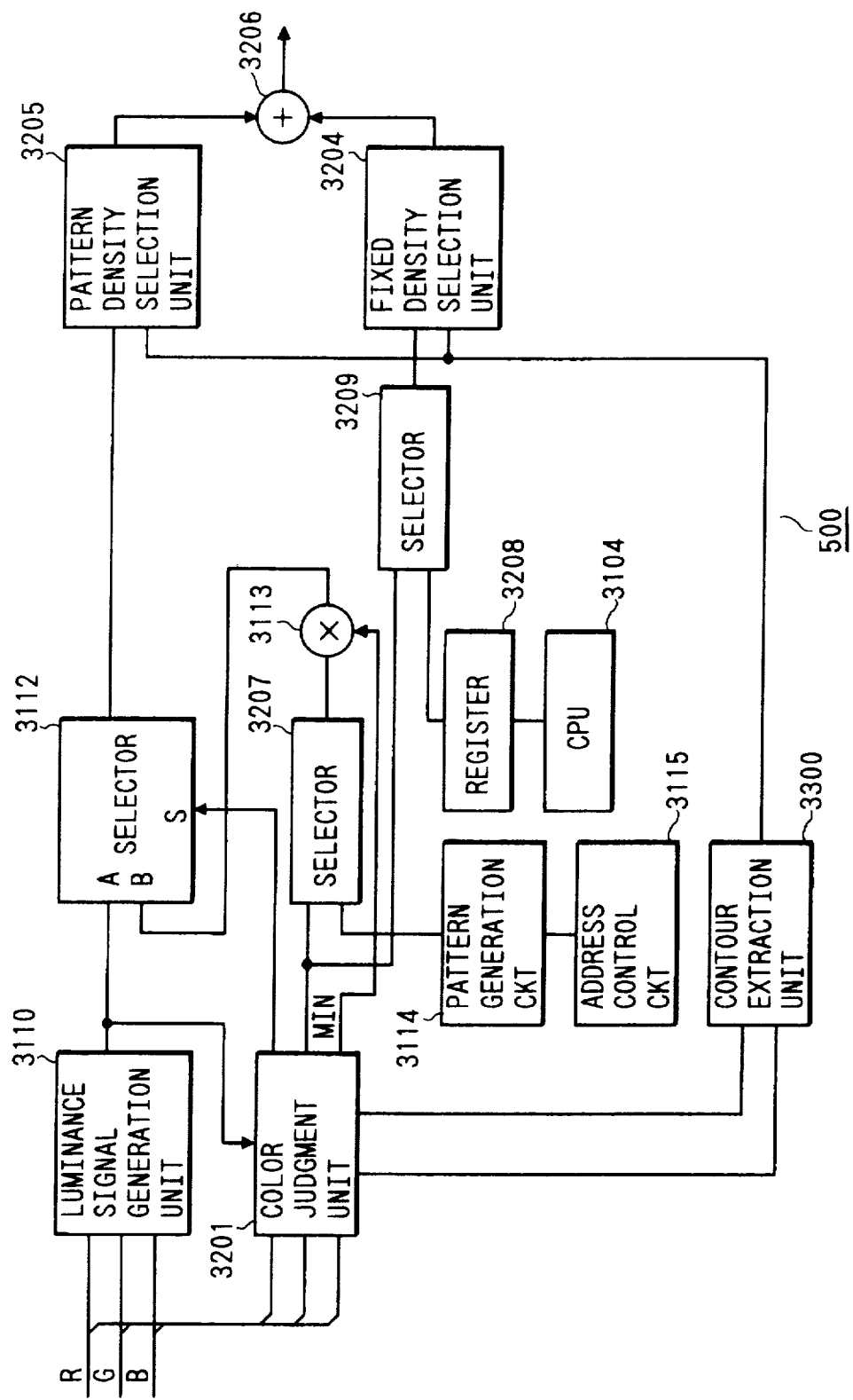
FIG. 61 is a block diagram of the image processing section of an image processing apparatus according to another embodiment of the present invention.

FIG. 61 is a block diagram of an image processing unit 500 of an image processing apparatus according to another embodiment, where those common components as in FIG. 50 are denoted by identical reference numerals.

The present embodiment differs from the foregoing embodiment in that a contour extraction unit 330 is provided in place of the thin line detection unit 3203.

Figure 62:
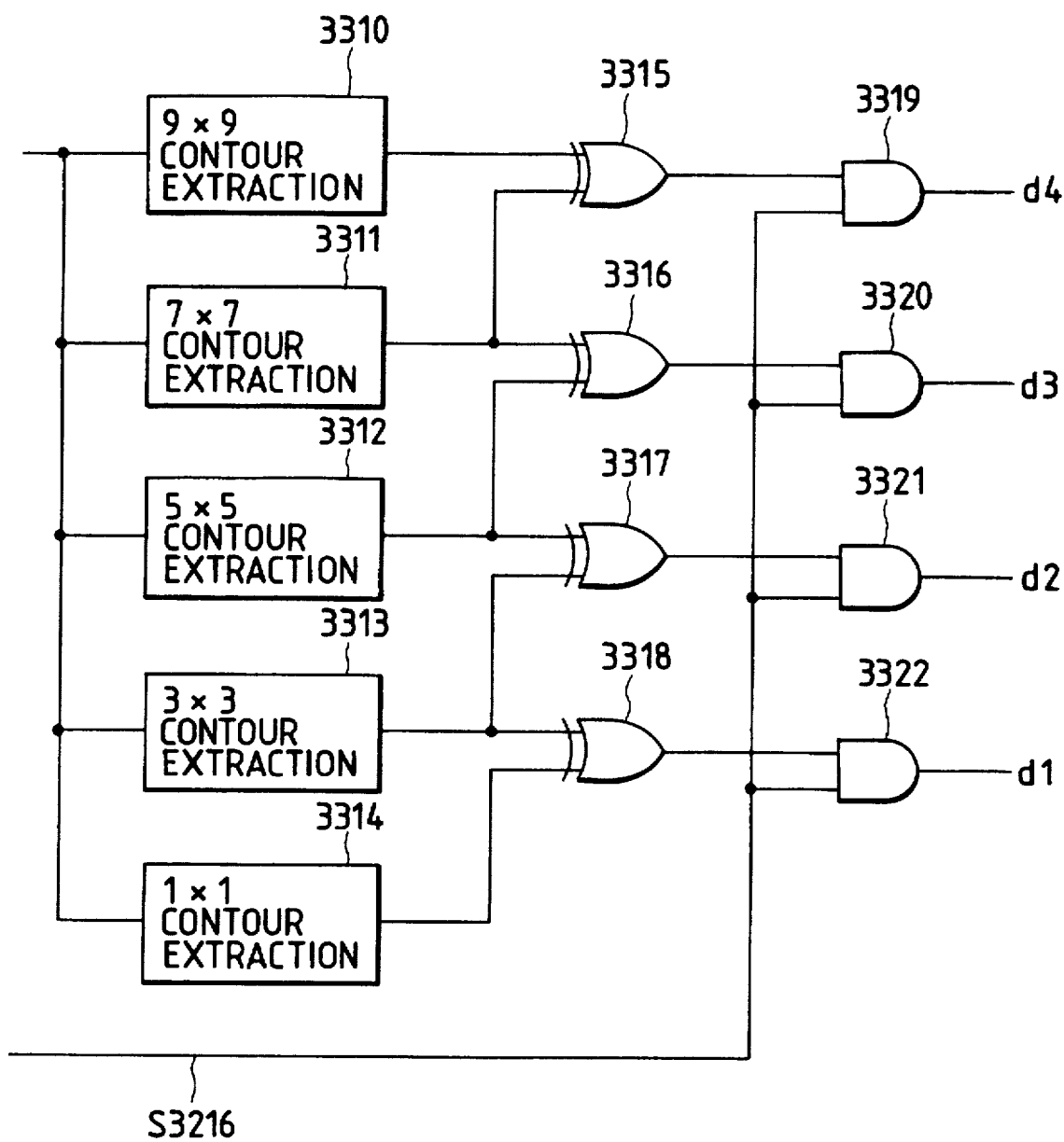
FIG. 62 shows the construction of contour extraction unit 3300 as shown in FIG. 61.

As shown in FIG. 62, the contour extraction unit 3300 comprises contour extraction circuits 3310 to 3314, XOR gates 3315 to 3318, and AND gates 3319 to 3312, and detects how many pixels there are to the input pixel from the contour in a color area. This will be explained by taking a 5×5 contour extraction circuit as an example.

The 5×5 contour extraction circuit 3312 is of the same construction as the 5×5 thinning circuit 3221 as shown in FIG. 55. It judges if all the pixels within the 5×5 mask are identical and outputs "0" when all the pixel signals within the mask are identical. Accordingly, "1" will be outputted if a contour is detected with the mask.

Since the 1×1 contour extraction circuit 3314 outputs "0" at all times, XOR gate 3318 provides "1" when the 3×3 contour extraction circuit 3313 outputs "1". In addition, AND gate 3322 outputs "1" when the chromatic color signal S3216 is "1". In this case, the input pixel is judged to be a first pixel from a contour in a color area. In a similar manner, when the 3×3 contour extraction circuit 3313 outputs "0" while the 5×5 contour extraction circuit 3312 outputs "1", XOR gate 3317 will output "1". In addition, AND gate 3321 will provide "1" when the chromatic color signal outputs "1". In this case, the input pixel is judged to be a second pixel from the contour in a color area. Further, the outputs of the contour extraction circuits 3310 to 3312 are input to XOR gates 3315 to 3317. The outputs of XOR gates 3315 to 3316 and the chromatic color signal are then input to AND gates, 3319, 3320. Here, the judged result is shown in FIG. 3.

Figure 66A:
FIG. 66 is a view illustrating an output image.
Figure 66B:
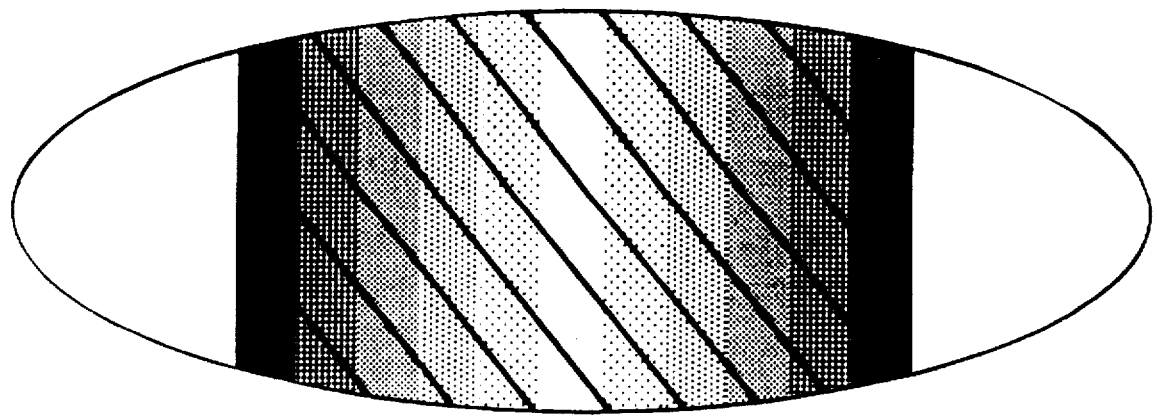

These output signals are input to the pattern density selection unit 3205 and the fixed density selection unit 3204. In accordance with the judged result as shown in FIG. 63, the ratio by which fixed density and pattern density are mixed is varied. The ratio of mixing is determined so that the ratio of fixed density is higher toward the contour in a manner as shown in FIG. 64. A patterned picture image as shown in FIG. 66 may thus be obtained.

As described above, in the present embodiment, in accordance with the position of contour in a color area, an output for the contour portion is made by a fixed density set for each color, while the ratio of the fixed density is caused to be less as getting toward inside from the contour portion so as to increase the density ratio of pattern. A thin line may thus easily be identified because the ratio of fixed density set for each color is high when it is outputted, preventing a case where the thin line portion is hard to be seen and cannot be identified such as when it is simply patterned.

A description will now be given with respect to an image processing apparatus according to another embodiment. The construction of the image processing apparatus of the present embodiment is identical to that as shown in FIG. 1.

Figure 67:
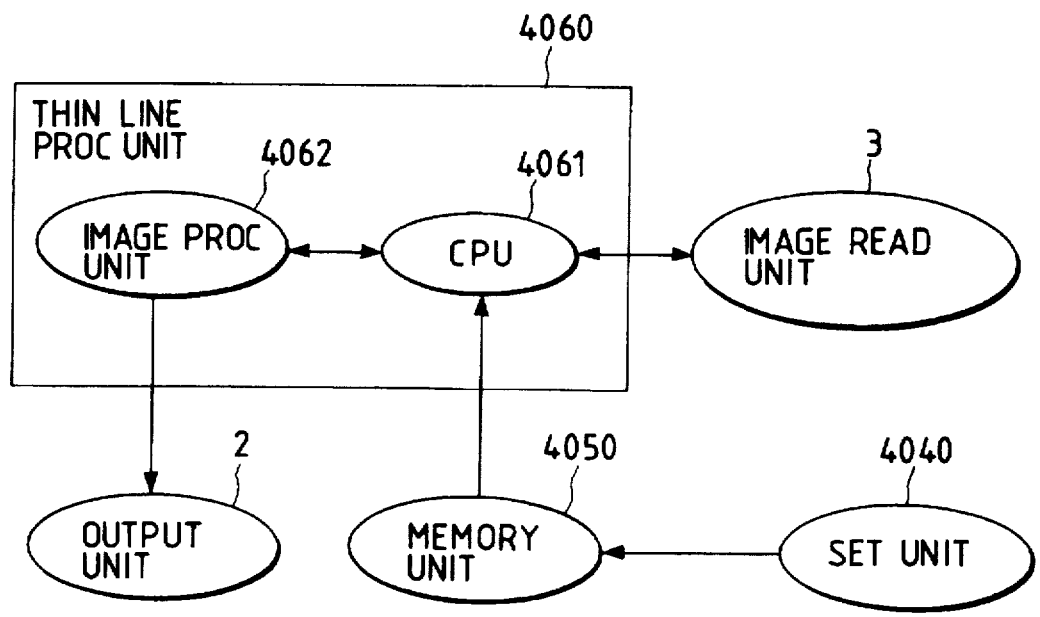
FIG. 67 is a block diagram of another embodiment of the present invention.

FIG. 67 is a block diagram of the present embodiment.

Referring to FIG. 67, numeral 3 denotes an image read unit for detecting various lines, numeral 4040 denotes a set unit for setting a reference line width or the like, and numeral 4050 denotes a memory unit. Numeral 4060 denotes a thin line processing unit which contains CPU 4061 and an image processing unit 4062. The thin line processing unit 4060 judges if the width of a line detected by the image read unit is narrower than a reference line width, and, when it is, a color pattern conversion processing will not be performed. Numeral 2 denotes an output unit which provides processed picture images.

Figure 68:
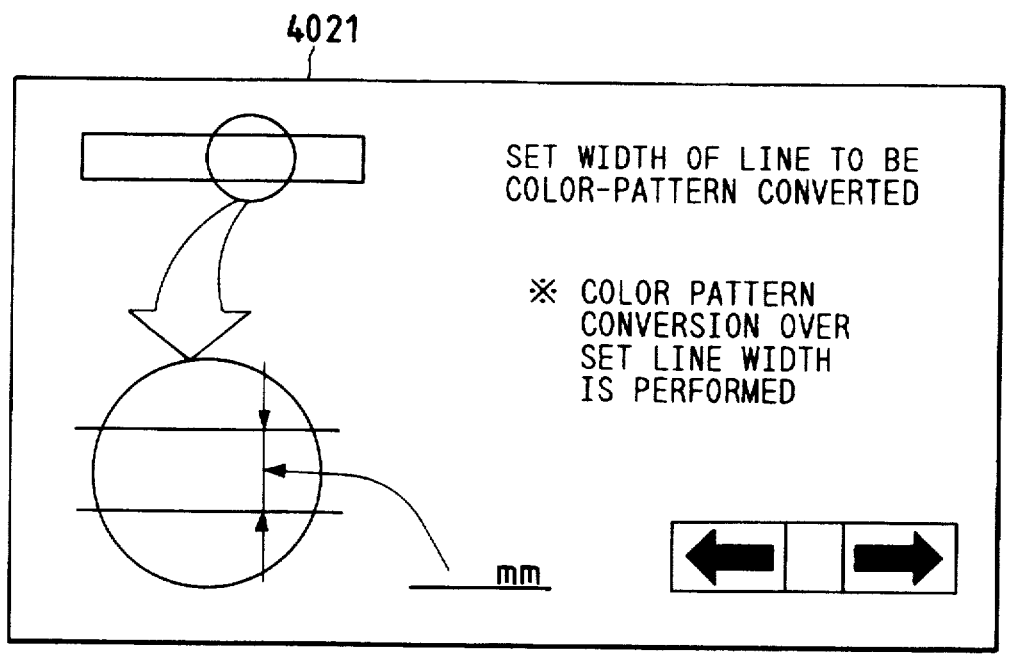
FIG. 68 shows message display 4021 of the set unit.
Figure 69A:
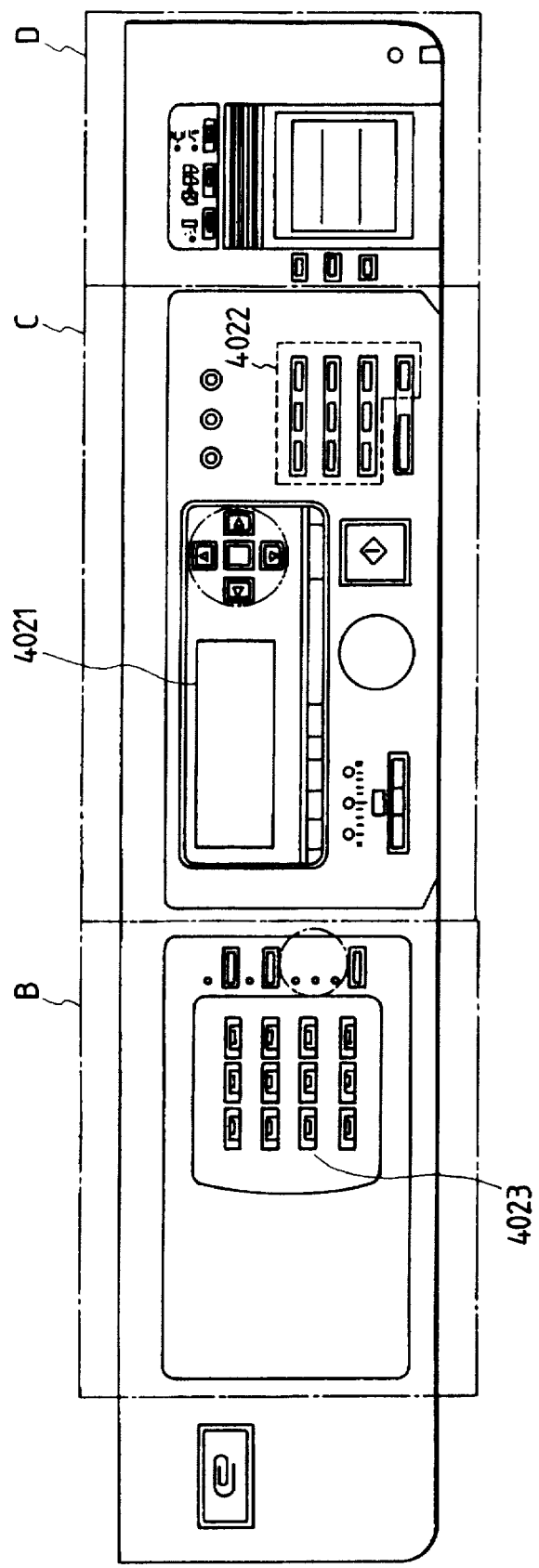
FIG. 69A shows the operation panel of set unit 4040.
Figure 69B:
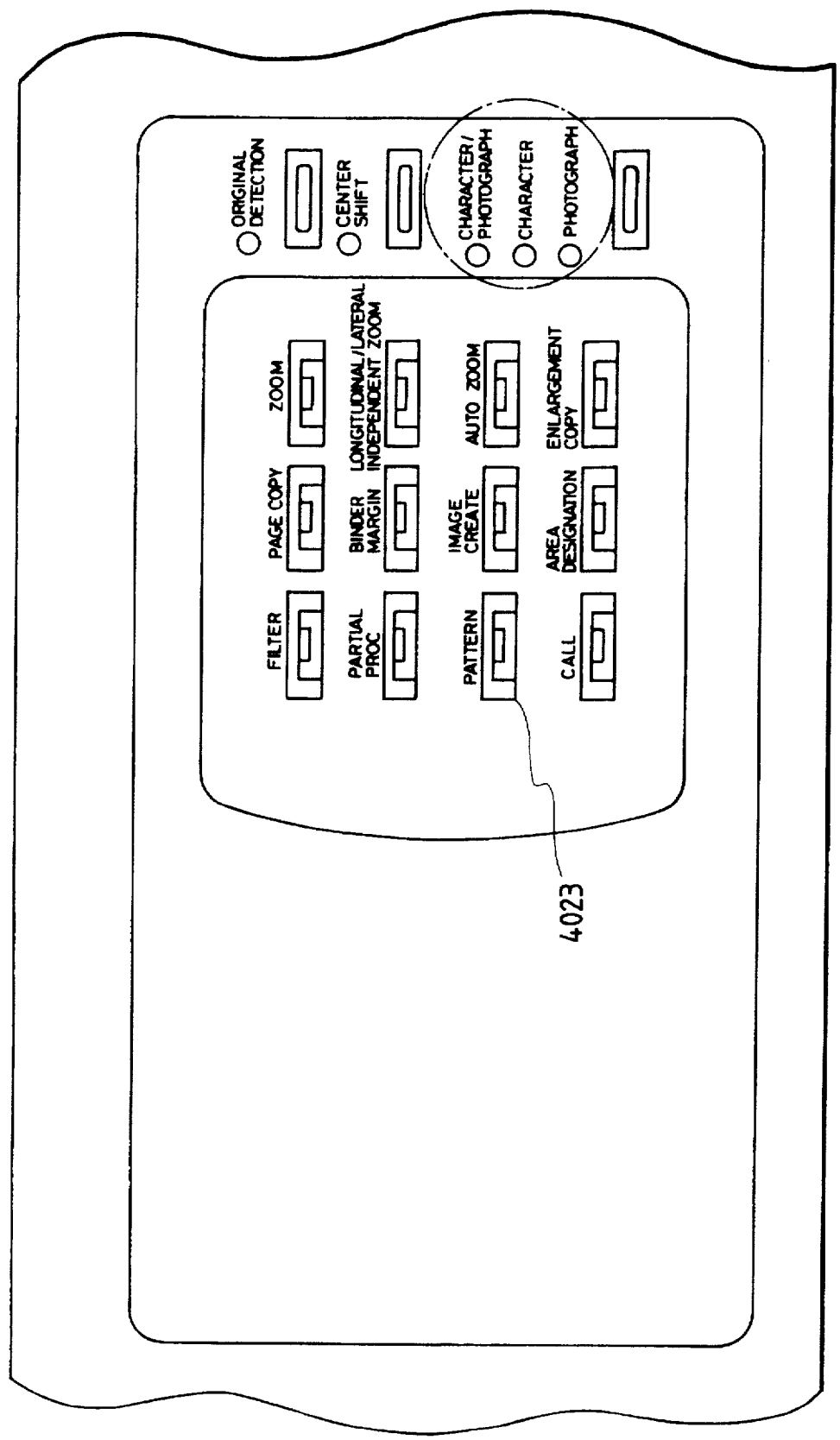
FIG. 69B is an enlarged view showing a portion corresponding to B of the operation panel as shown in FIG. 69A.
Figure 69C:
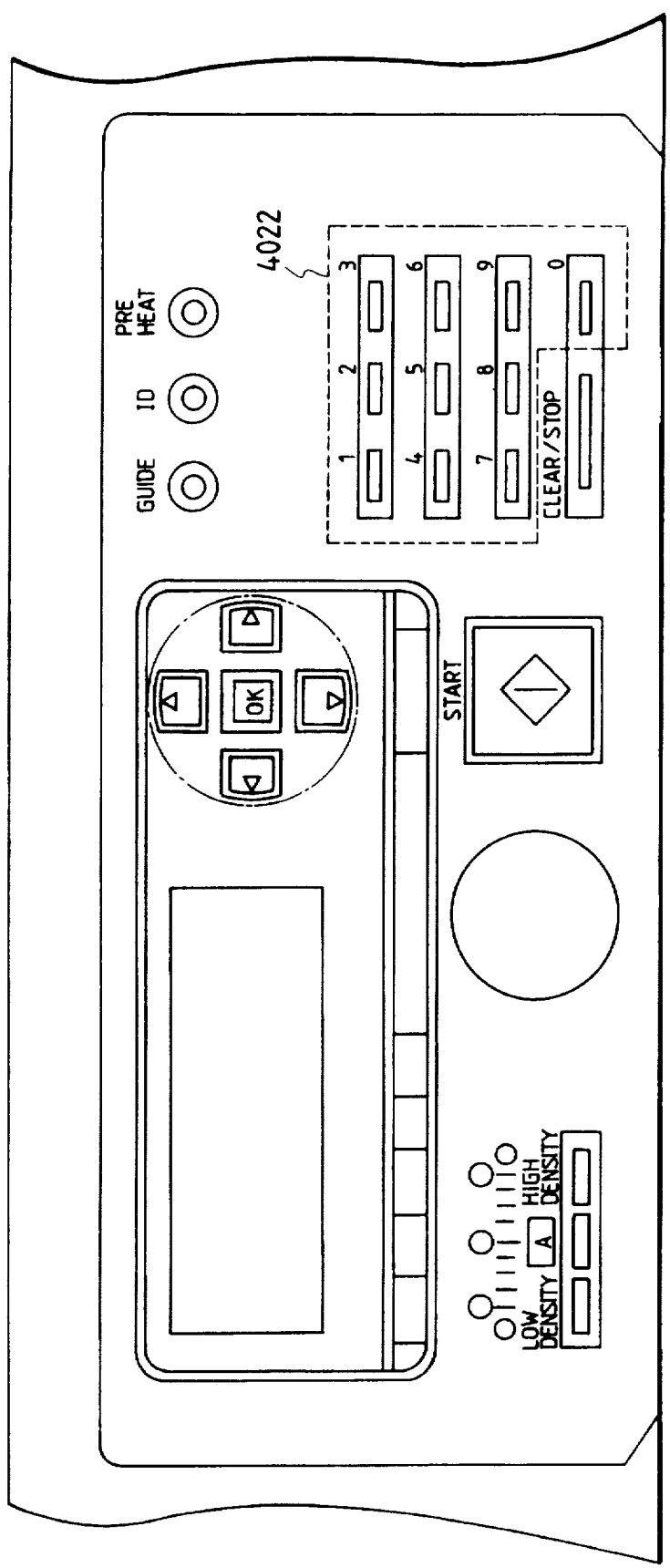
FIG. 69C is an enlarged view showing a portion corresponding to C of the operation panel as shown in FIG. 69A.
Figure 69D:
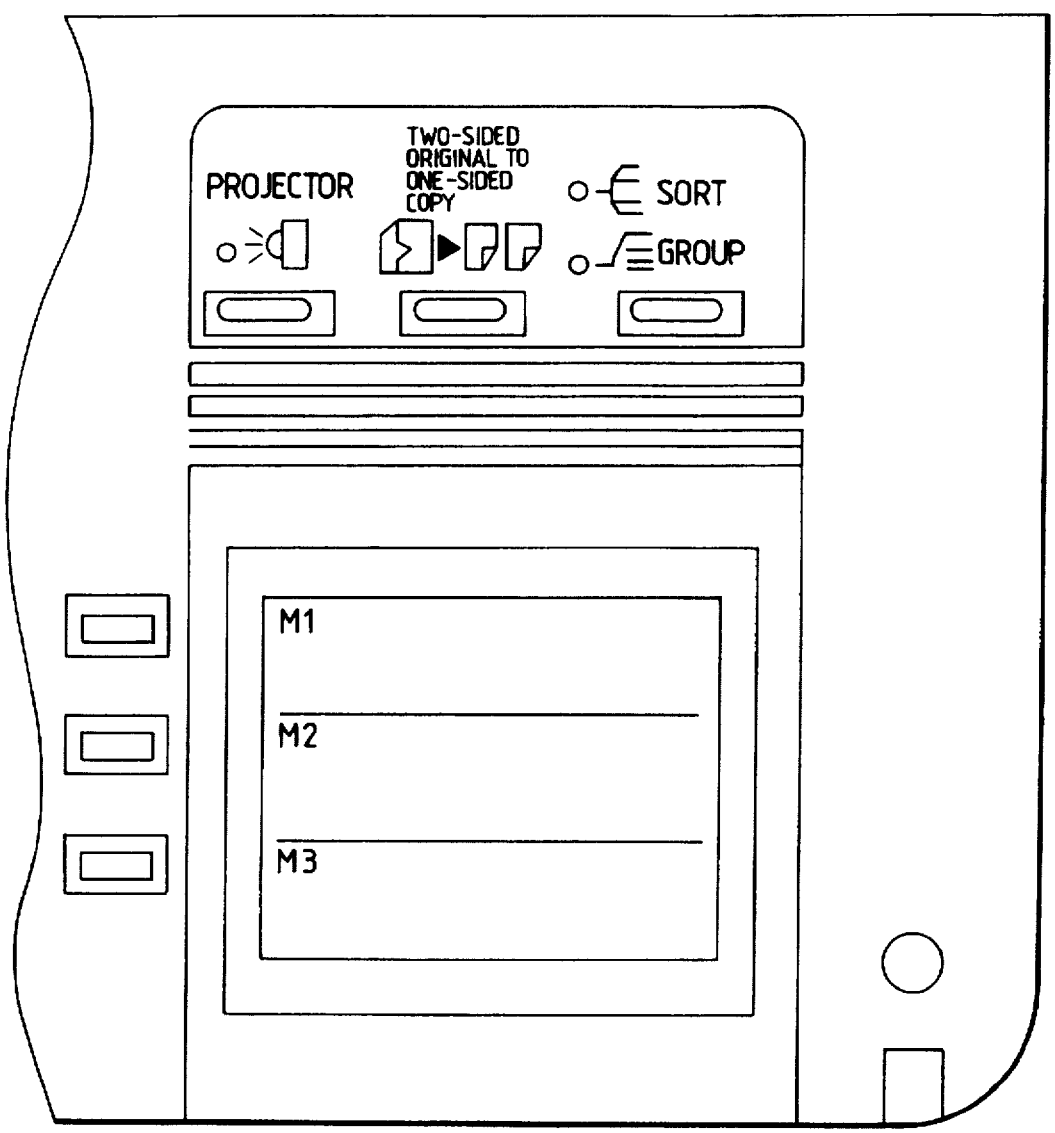
FIG. 69D is an enlarged view showing a portion corresponding to D of the operation panel as shown in FIG. 69A.

FIG. 69A shows the portion of an operation panel of the set unit 4040 as shown in FIG. 67. FIG. 71 is a flowchart of color pattern processing. A display 4021 as shown in FIG. 68 is a message dispaly 4021 on the operation panel of FIG. 69A (FIG. 69B, FIG. 69C, FIG. 69D being enlarged views of portions B, C, D of FIG. 69A, respectively), and the shown display image indicates one of those appearing in the setting mode for color pattern conversion. As a setting method in the setting mode for color pattern conversion, inputting methods such as input by an arrow key on the display 4021 or a direct input by ten key 4022 on the operation unit may be provided in combination.

Figure 70A:
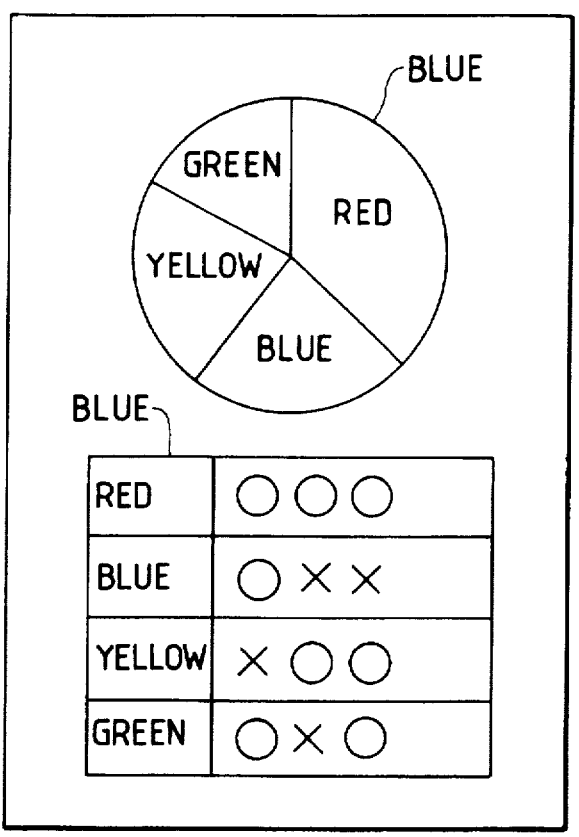
FIGS. 70A and 70B are views illustrating a processed result in the present embodiment.
Figure 70B:
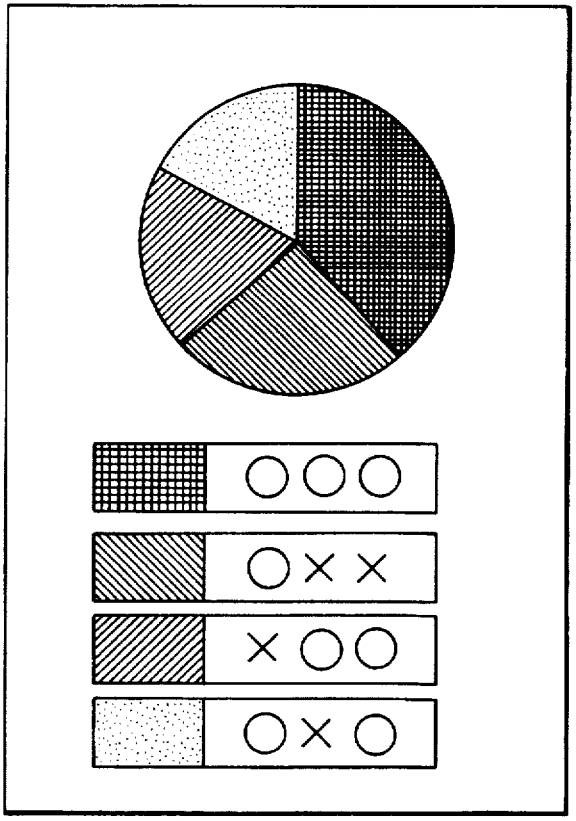

The operation of the present embodiment will now be described by way of FIG. 71. After turning on the power switch of the apparatus, when a color pattern processing key 4023 is turned on (step S1), a display for color pattern conversion processing such as shown in FIG. 68 appears. Processing area is then specified by a setting tool such as digitizer (step S2); a set value is inputted by the set unit 4040 if it is necessary to set a reference line width (steps S3, S4); the set value is stored (step S5); and then copying is started (step S6). If it is not necessary to set the reference line width, the copying is immediately started (step S6). Next, the picture image original on the platen glass 26 as shown in FIG. 1 is read by the image read unit 4030 (step S7); the width of each line of the read original is detected by CPU 4061 in the thin line detection unit 4060 (step S8); and a judgment is made based on the width as to whether color information on the read original should be corrected (step S9). When the line width of the read original is smaller than the reference line width, the color information on that line is recognized and a corresponding correction is made (steps S10, S11), while, when it is larger than the reference line width, only the color is recognized (step S12). That is, when the line width is larger than the reference line width, the color information on the picture image is subjected as it is to a color pattern conversion so as to be outputted as the picture image original (steps S13, S14). However, if it is smaller than the reference line width, the subject line is treated for example as a black and white information instead of a color information, and such black and white information is subjected to color pattern conversion processing. Thus, the subject line is to be outputted in the form of that line as it is (for example by treating a red thin line as a black thin line). According to the construction as described, an image after processing an original picture image on which as shown in FIG. 70A a circular chart portion is represented by red, blue, green, and yellow and the thin line portions are represented by blue will be an image as shown in FIG. 70B processed into patterns of black and white where the thin line portions are represented by black lines.

In this way, a boundary line, an underline or the like is not subjected to a pattern conversion irrespective of whether it is of chromatic color or of achromatic color if it is a thin line with a width less than a reference line width. It is thus possible to prevent a case where the contour gets blurred because patterning makes an area obscure as to whether it is a boundary line or as to whether it is an underline. The role of thin lines on the original serving as a source of the picture image may be retained.

Figure 72:
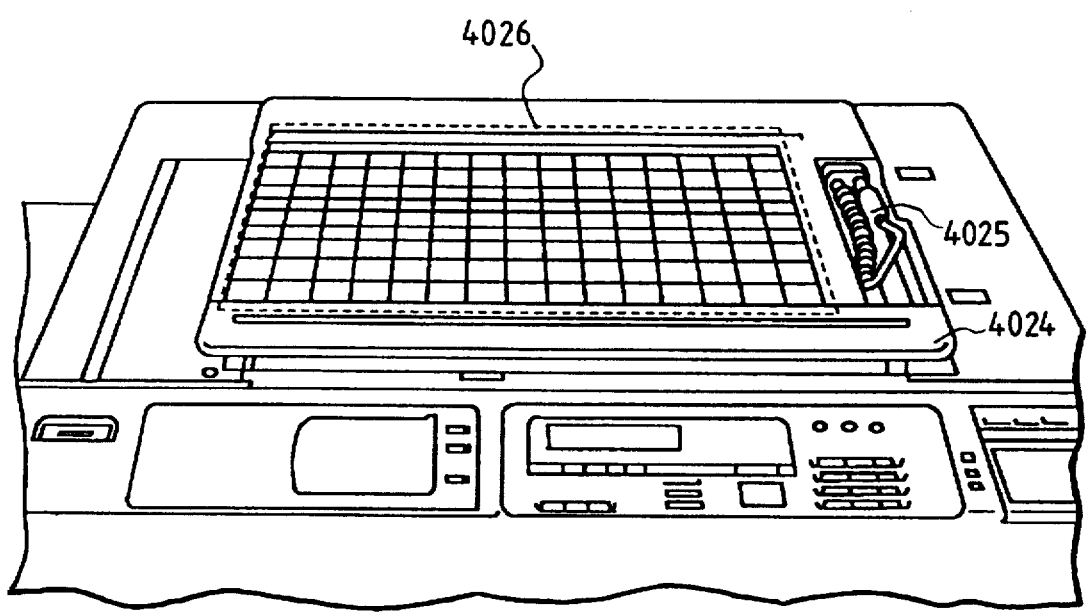
FIG. 72 is a view showing an editor serving as set unit 4040 as shown in FIG. 67.

While in the above described embodiment a reference line width is set by the message display 4021, an editor 4024 as shown in FIG. 72 may be used. Points and areas are designated by a point pen 4025 over the original placed on a mode set surface 4026 of the editor 4024. When the original image is read by the image read unit 3 and color pattern conversion processing is to be performed with respect to that image, the color pattern conversion may be processed in accordance with the line width set by the editior 4024.

Figure 73A:
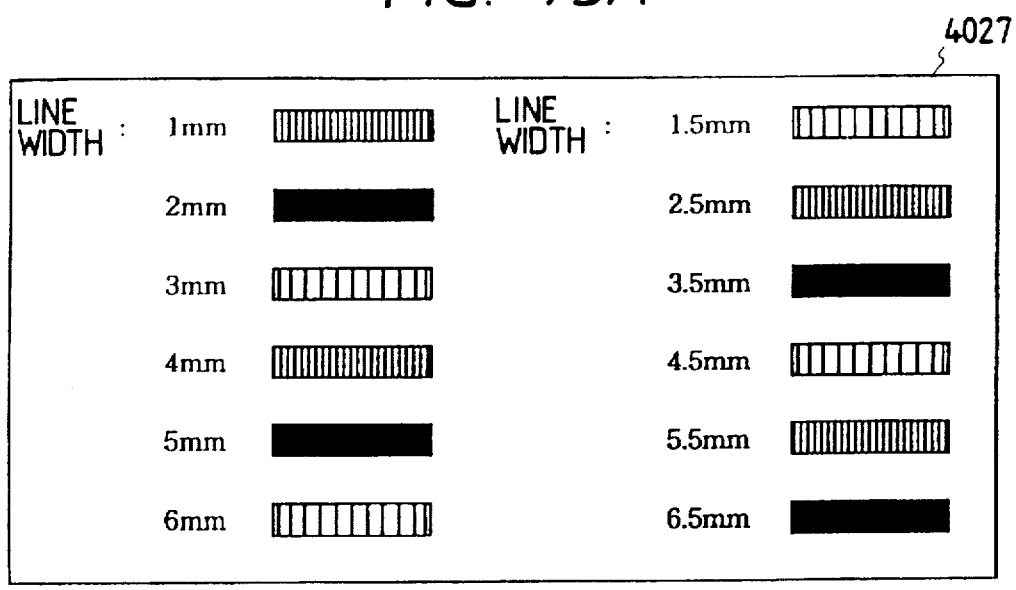
FIGS. 73A and 73B are views showing bar codes and a bar code reader serving together as set unit 4040 as shown in FIG. 67.
Figure 73B:
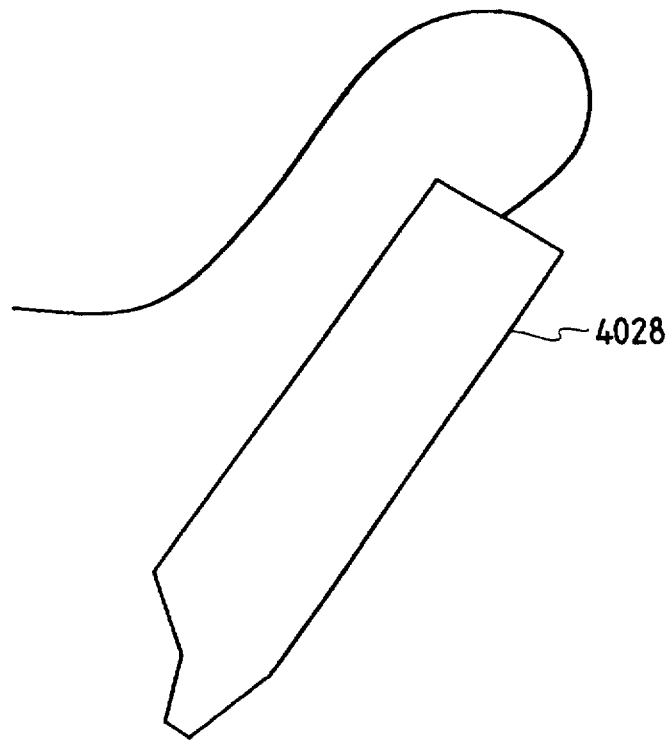

Further, such setting may be performed by a bar code reader by providing, as shown in FIG. 73, a bar code reader 4028 for reading bar codes 4027 which vary in pattern according to each line width. Also, it is possible that an interface unit for inputting color image signal and outputting data to a printer is provided with the function as described above. Furthermore, a dense black pattern may also be made into a pattern.

As described above, in the case of a thin line having line width smaller than a reference line width, its form as it is may be used. A loss of component image in the picture image output may thus be prevented when color pattern conversion processing is to be performed. The original image may be represented without damaging the image such as of the frame of a table, a boundary line, an underline in document or without causing a blur of the contour.

What is claimed is:

1. An image processing apparatus comprising:

converting means for converting an input color image into a pattern image; and synthesizing means for synthesizing a gradation image onto a contour portion of the pattern image converted by said converting means, wherein the closer the gradation image is to the contour portion of the pattern image, the higher a density of the gradation image which is to be synthesized by said synthesizing means becomes.

2. An apparatus according to claim 1, further comprising density controlling means for controlling a density of the pattern image converted by said converting means, wherein said density controlling means causes the density of the pattern image to decrease in proportion to how close the pattern image is to the contour portion of the pattern image.

3. An apparatus according to claim 1, wherein said converting means converts the color image into the pattern image having a pattern corresponding to a color.

4. An apparatus according to claim 1, wherein the pattern image and the gradation image are monochrome.

5. An apparatus according to claim 1, further comprising image forming means for forming on a sheet the image synthesized by said synthesizing means.

6. An image processing method comprising:

a converting step of converting an input color image into a pattern image; and a synthesizing step of synthesizing a gradation image onto a contour portion of the pattern image converted in said converting step, wherein the closer the gradation image is to the contour portion of the pattern image, the higher a density of the gradation image which is to be synthesized by said synthesizing means becomes.

7. A method according to claim 6, further comprising a density controlling step of controlling a density of the pattern image converted in said converting step, wherein said density controlling step causes the density of the pattern image to decrease in proportion to how close the pattern image is to the contour portion of the pattern image.

8. A method according to claim 6, wherein said converting step converts the color image into the pattern image having a pattern corresponding to a color.

9. A method according to claim 6, wherein the pattern image and the gradation image are monochrome.

10. A method according to claim 6, further comprising an image forming step of forming on a sheet the image synthesized in said synthesizing step.

* * * * *

UNITED STATES PATENT AND TRADEMARK OFFICE
CERTIFICATE OF CORRECTION

PATENT NO. : 5,485,288

DATED : January 16, 1996

INVENTOR(S) : MASAFUMI KAMEI ET AL.

It is certified that error appears in the above-indentified patent and that said Letters Patent is hereby corrected as shown below:

IN THE DRAWINGS

Sheet 6, Figure 8, "NAIN-SCAN" should read --MAIN-SCAN--.
Sheet 11, Figure 14, "NAIN-SCAN" should read --MAIN-SCAN--.
Sheet 60, Figure 71, "STRAT" should read --START--.

COLUMN 1

Line 27, "are" should read --is--.

COLUMN 3

Line 14, "i" should read --is--.

COLUMN 4

Line 30, "apparatus-according" should read --apparatus according--.

COLUMN 5

Line 29, "is" should read --are--.
Line 37, "an" should read --a--.

UNITED STATES PATENT AND TRADEMARK OFFICE
CERTIFICATE OF CORRECTION

PATENT NO. : 5,485,288
DATED : January 16, 1996
INVENTOR(S) : MASAFUMI KAMEI ET AL.

It is certified that error appears in the above-indentified patent and that said Letters Patent is hereby corrected as shown below:

COLUMN 7

Line 1, "an" should read --in an--.

COLUMN 8

Line 16, "area." should read --area--.

COLUMN 12

Line 33, "unit 2202" should read --circuit 2203--.

COLUMN 13

Line 9, ".604" should read --604--.
Line 61, "10" should be deleted.

COLUMN 14

Line 4, "FIG. 37;" should read --FIG. 37.--.
Line 48, "frequencydivided" should read --frequency-divided--.

UNITED STATES PATENT AND TRADEMARK OFFICE
CERTIFICATE OF CORRECTION

PATENT NO. : 5,485,288
DATED : January 16, 1996
INVENTOR(S) : Masafumi Kamei et al It is certified that error appears in the above-indentified patent and that said Letters Patent is hereby corrected as shown below:

COLUMN 17

Line 38, "10" should be deleted.

COLUMN 18

Line 2, "to an" should read --to a--.
Line 27, "circuit 115," should read --circuit 3115,--.

COLUMN 19

Line 5, "selector 81," should read --selector 3281,--.

UNITED STATES PATENT AND TRADEMARK OFFICE
CERTIFICATE OF CORRECTION

PATENT NO. : 5,485,288
DATED : January 16, 1996
INVENTOR(S) : Masafumi Kamei et al It is certified that error appears in the above-indentified patent and that said Letters Patent is hereby corrected as shown below:

COLUMN 23

Line 22, "dispaly" should read --display--.

COLUMN 24

Line 26, "editior" should read --editor--.

Signed and Sealed this

Ninth Day of July, 1996

Attest:

BRUCE LEHMAN

Attesting Officer

Commissioner of Patents and Trademarks